(12) United States Patent
Wang et al.

(10) Patent No.: US 12,229,631 B2
(45) Date of Patent: Feb. 18, 2025

(54) METHOD FOR RECOGNIZING TWO-DIMENSIONAL CODE AND RELATED APPARATUS

(71) Applicant: HUAWEI TECHNOLOGIES CO., LTD., Guangdong (CN)

(72) Inventors: Haoren Wang, Shanghai (CN); Dequan Yu, Hangzhou (CN); Yi Ren, Jinan (CN); Haosheng Gao, Shanghai (CN); Chunliang Liu, Shanghai (CN); Ping Song, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/264,551

(22) PCT Filed: Jan. 21, 2022

(86) PCT No.: PCT/CN2022/073210
§ 371 (c)(1),
(2) Date: Aug. 7, 2023

(87) PCT Pub. No.: WO2022/166619
PCT Pub. Date: Aug. 11, 2022

(65) Prior Publication Data
US 2024/0046055 A1    Feb. 8, 2024

(30) Foreign Application Priority Data
Feb. 7, 2021    (CN) .......................... 202110169337.5

(51) Int. Cl.
G06K 7/14        (2006.01)
(52) U.S. Cl.
CPC ................................. G06K 7/1417 (2013.01)

(58) Field of Classification Search
CPC .......... G06K 7/1417; G06K 19/06037; G06K 19/06046; G06K 19/06168
See application file for complete search history.

(56) References Cited

U.S. PATENT DOCUMENTS

2005/0269412 A1* 12/2005 Chiu ................. G06K 19/06028
235/462.03

FOREIGN PATENT DOCUMENTS

| CN | 106951812 A | 7/2017 |
|----|-------------|--------|
| CN | 107590522 A | 1/2018 |

(Continued)

OTHER PUBLICATIONS

Extended European Search Report in European Appln No. 22748898.8, dated Jun. 10, 2024, 7 pages.

(Continued)

*Primary Examiner* — Jamara A Franklin
(74) *Attorney, Agent, or Firm* — Fish & Richardson P.C.

(57) ABSTRACT

Methods and apparatuses for recognizing a two-dimensional code are disclosed. In an implementation, a method comprises: identifying, by an electronic device, a two-dimensional code, wherein the two-dimensional code comprises an image region in the center and a ring region surrounding the image region, wherein the ring region comprises a code region including a first code region and a second code region, a first spacing region, and a second spacing region, wherein the first spacing region and the second spacing region are arranged between the first code region and the second code region, determining values corresponding to a plurality of code elements in the code region, and recognizing, by the electronic device based on the values, first information corresponding to the two-dimensional code.

20 Claims, 37 Drawing Sheets

(56) References Cited

FOREIGN PATENT DOCUMENTS

| CN | 207051946 U | 2/2018 |
|---|---|---|
| CN | 110969042 A | 4/2020 |
| CN | 111275152 A | 6/2020 |
| CN | 112926715 A | 6/2021 |

OTHER PUBLICATIONS

International Search Report and Written Opinion in International Appln. No. PCT/CN2022/073210, mailed on Apr. 20, 2022, 22 pages (with English translation).

* cited by examiner

Version 1

Version 2

Version 3

METHOD FOR RECOGNIZING TWO-DIMENSIONAL CODE AND RELATED APPARATUS

CROSS-REFERENCE TO RELATED APPLICATIONS

This application is a national stage of International Application No. PCT/CN2022/073210, filed on Jan. 21, 2022, which claims priority to Chinese Patent Application No. 202110169337.5, filed on Feb. 7, 2021. Both of the aforementioned applications are hereby incorporated by reference in their entireties.

TECHNICAL FIELD

This application relates to the field of electronic technologies, and in particular, to a method for recognizing a two-dimensional code and a related apparatus.

BACKGROUND

In recent years, with increasing maturity of two-dimensional code technologies, an increasing quantity of vendors start to focus on research and commercialization of non-standard customized two-dimensional codes, for example, a WeChat mini program code.

However, a conventional square two-dimensional code does not have appealing appearance and does not include guidance information. For a two-dimensional code with special guidance, a surrounding logo is added to a middle two-dimensional code. In this manner, large space usually needs to be occupied. Alternatively, a small trademark is placed in the center of a two-dimensional code. In this manner, some data regions are covered, affecting recognition of the two-dimensional code. In addition, due to universality of decoding, the square two-dimensional code is read by a standard decoding program, and therefore confidentiality is poor. Content obtained by scanning the square two-dimensional code may be a website including insecure content, for example, a link including a Trojan virus. Security and user experience are poor.

SUMMARY

Embodiments of this application provide a method for recognizing a two-dimensional code and a related apparatus, to improve diversity of a two-dimensional code and recognize the two-dimensional code.

According to a first aspect, an embodiment of this application provides a method for recognizing a two-dimensional code. The two-dimensional code includes an image region in the middle and a ring region surrounding the image region. The ring region includes a code region, a first spacing region, and a second spacing region. The code region includes a plurality of code elements. The code region includes a first code region and a second code region. The first spacing region and the second spacing region are arranged between the first code region and the second code region. The method includes:

An electronic device obtains a to-be-recognized two-dimensional code, and determines values corresponding to a plurality of code elements in a code region of the to-be-recognized two-dimensional code.

The electronic device recognizes, based on the values corresponding to the plurality of code elements in the code region, first information corresponding to the to-be-recognized two-dimensional code.

In this embodiment of this application, the electronic device obtains the to-be-recognized two-dimensional code, and recognizes the first information corresponding to the to-be-recognized two-dimensional code. The code region, the first spacing region, and the second spacing region in the to-be-recognized two-dimensional code form a ring, and the code region is divided by the first spacing region and the second spacing region into the first code region and the second code region. That is, this embodiment of this application provides a two-dimensional code pattern in which a code region is divided by a spacing region.

With reference to the first aspect, in a possible implementation, the first spacing region and the second spacing region are partial rings with a same width, Herein, the partial ring is a part of a complete ring.

With reference to the first aspect, in a possible implementation, areas occupied by the first code region and the second code region are the same. The first code region and the second code region are regions with a same area size. Symmetrical distribution improves appearance.

With reference to the first aspect, in a possible implementation, a ratio of a width of the image region in a horizontal direction to a width of the two-dimensional code in the horizontal direction is 1:3. A value of the ratio of the image region is not limited in this embodiment of this application.

With reference to the first aspect, in a possible implementation, the plurality of code elements in the code region are distributed on at least two concentric circles, centers of the at least two concentric circles are a center of the two-dimensional code, and the code elements include a dot-shaped code element.

With reference to the first aspect, in a possible implementation, an arc distance between centers of adjacent dot-shaped code elements on a same concentric circle of the code region is $(2r+b) \times k$, where k is a positive integer, r is a radius of the dot-shaped code element, and b is a fixed value; and a circumference of the same concentric circle is $N \times (2r+b)$, where N is a positive integer greater than k. Herein, a distance between centers of dot-shaped code elements is limited, and a minimum distance between adjacent dot-shaped code elements is $2r+b$. In this case, a distance between any two dot-shaped code elements is an integer multiple of $2r+b$.

In a possible implementation, an arc distance between centers of three consecutive dot-shaped code elements on a same concentric circle of the code region is greater than $(2r+b) \times 2$. In other words, for example, a case that distances between three consecutive dot-shaped code elements are all a minimum distance $2r+b$ is avoided, so that the two-dimensional code can have appealing appearance.

In a possible implementation, dot-shaped code elements a and b respectively exist on two different concentric circles of the two-dimensional code, and a connection line between a center of the dot-shaped code element a and a center of the dot-shaped code element h passes through the center of the two-dimensional code. Herein, a possible pattern, namely, a radial pattern, is provided.

In a possible implementation, radii of dot-shaped code elements on different concentric circles of the two-dimensional code are different.

In a possible implementation, a radius of a dot-shaped code element on an outer concentric circle of the two-dimensional code is greater than a radius of a dot-shaped code element on an inner concentric circle of the two-dimensional code.

In a possible implementation, the code elements further include an arc-shaped code element, an arc length of the arc-shaped code element on a concentric circle is (2r+b)×M, and M is a positive integer. In the descriptions herein, a plurality of dot-shaped code elements may connected into an arc-shaped code element. If the arc-shaped code element is obtained by connecting M+1 dot-shaped code elements, a length of the arc-shaped code element is (2r+b)×M.

In a possible implementation, an arc distance between an arc-shaped code element and an adjacent code element on a same concentric circle is greater than or equal to (2r+b)×2. The arc-shaped code element is obtained by connecting continuous dot-shaped code elements. Therefore, the arc-shaped code element is spaced apart from an adjacent code element (a dot-shaped code element or an arc-shaped code element) by at least one dot-shaped code element.

With reference to the first aspect, in a possible implementation, that an electronic device obtains a to-be-recognized two-dimensional code, determines values corresponding to a plurality of code elements in a code region of the to-be-recognized two-dimensional code, and recognizes first information corresponding to the to-be-recognized two-dimensional code includes: The electronic device obtains the to-be-recognized two-dimensional code. The electronic device determines a target version of the to-be-recognized two-dimensional code, where the target version indicates coordinate information of each storage location in the code region of the to-be-recognized two-dimensional code. The electronic device determines, based on the coordinate information of each storage location, that a storage location occupied by each of the plurality of code elements in the code region of the to-be-recognized two-dimensional code is correspondingly a first value; and recognizes, based on the first value, the first information corresponding to the to-be-recognized two-dimensional code. Herein, a specific implementation of recognizing the two-dimensional code by the electronic device is described. After recognizing the target version of the two-dimensional code, the electronic device obtains coded information based on location coordinates included in the target version, and decodes the coded information according to a decoding rule. In this way, the two-dimensional code with a two-dimensional code structure of the target version is decoded.

In a possible implementation, each storage location is in a dot shape, and the coordinate information includes center coordinate information and radius information of the storage location.

In a possible implementation, before the electronic device determines the target version of the to-be-recognized two-dimensional code, the method includes: The electronic device determines a location of a locator in a to-be-recognized image. The electronic device determines a vertex location of a two-dimensional code in the to-be-recognized image based on the location of the locator. The electronic device calibrates the two-dimensional code in the to-be-recognized image based on the vertex location, to obtain the to-be-recognized two-dimensional code. Herein, a process of locating and calibrating the two-dimensional code by the electronic device is described.

With reference to the first aspect, in a possible implementation, a type of the first information includes one or more of the following: a character, text, a picture, audio, a video, or a link address.

According to a second aspect, an embodiment of this application provides a method for generating a two-dimensional code. The method includes:

An electronic device obtains first information.

The electronic device generates a two-dimensional code based on the first information, where the two-dimensional code indicates the first information.

The two-dimensional code includes an image region in the middle and a ring region surrounding the image region. The ring region includes a code region, a first spacing region, and a second spacing region. The code region includes a plurality of code elements. The code region includes a first code region and a second code region. The first spacing region and the second spacing region are arranged between the first code region and the second code region.

In this embodiment of this application, the electronic device obtains the first information, and generates the two-dimensional code based on the first information. The code region, the first spacing region, and the second spacing region in the two-dimensional code form a ring, and the code region is divided by the first spacing region and the second spacing region into the first code region and the second code region. That is, this embodiment of this application provides a two-dimensional code pattern in which a code region is divided by a spacing region.

With reference to the second aspect, in a possible implementation, the plurality of code elements in the code region are distributed on at least two concentric circles, centers of the at least two concentric circles are a center of the two-dimensional code, and the plurality of code elements include a dot-shaped code element.

With reference to the second aspect, in a possible implementation, that the electronic device generates a two-dimensional code based on the first information includes: The electronic device encodes the first information into a binary character string. The electronic device determines a target version of the to-be-generated two-dimensional code based on a length of the binary character string, where the target version indicates coordinate information of each storage location in the code region. The electronic device allocates the binary character string to a storage location in the code region based on the coordinate information of each storage location, where the storage location includes a first storage location and a second storage location, the first storage location stores a first value in the binary character string, and the second storage location stores a second value in the binary character string. The electronic device draws a first code element based on coordinate information of the first storage location, and generates the two-dimensional code based on the first code element, where the first code element is one of the plurality of code elements in the code region of the two-dimensional code. In this manner, the electronic device binarizes the first information of the to-be-generated two-dimensional code to first obtain the corresponding binary character string; and determines the target version of the to-be-generated two-dimensional code based on the length of the binary character string, where different volumes of data can be stored in different versions. After determining the target version, the electronic device allocates the binary character string to storage locations in the code region of the target version, and then draws a code element.

With reference to the second aspect, in a possible implementation, the coordinate information of the storage location includes center coordinate information and radius information of the storage location, the first code element is a dot-shaped code element, and the dot-shaped code element is drawn based on center coordinate information and radius information of the first storage location.

With reference to the second aspect, in a possible implementation, quantities of concentric circles in code regions in different target versions are different. Different volumes of data can be stored based on different quantities of concentric circles.

With reference to the second aspect, in a possible implementation, that the electronic device draws a first code element at the first storage location based on coordinate information of the first storage location includes: The electronic device determines a value range of the first code element on a Y-axis based on the center coordinate information and the radius information of the first storage location, where a minimum value of the value range of the first code element on the Y-axis is equal to a vertical coordinate of a center in the center coordinate information minus a radius, and a maximum value of the value range is equal to the vertical coordinate of the center in the center coordinate information plus the radius. The electronic device determines a left-end X value and a right-end X value for each Y value within the value range by using a preset formula, and draws a pixel between the left-end X value and the right-end X value in a first color, to complete drawing of the first code element, where all pixels of the first code element are in the first color. Herein, a process of drawing a dot-shaped code element is described. Two endpoints of an X-axis may be determined by using a Y-axis as an independent variable, and two endpoints of the Y-axis may also be determined by using the X-axis as an independent variable.

With reference to the second aspect, in a possible implementation, the method further includes: The first code element further includes an arc-shaped code element, the arc-shaped code element occupies at least two adjacent first storage locations, and the at least two adjacent first storage locations are on a same concentric circle. When a preset condition is met, an arc-shaped code element may be further drawn. This improves diversity and appearance of a two-dimensional code.

With reference to the second aspect, in a possible implementation, the first code element occupies at least two storage locations. A left-end storage location and a right-end storage location of the at least two storage locations are a third storage location and a fourth storage location. Center points of the third storage location and the fourth storage location are on a same side of a center line of the two-dimensional code. The center line of the two-dimensional code is a straight line that passes through a center point of the two-dimensional code and that is perpendicular to an X-axis. That the electronic device draws a first code element based on coordinate information of the first storage location includes: The electronic device determines a value range of the first code element on a Y-axis based on center coordinate information and radius information of the third storage location and the fourth storage location, where when a vertical coordinate of a center of the third storage location is greater than a vertical coordinate of a center of the fourth storage location, a minimum value of the value range of the first code element on the Y-axis is a vertical coordinate of a point that is at the third storage location and that is closest to the center of the two-dimensional code, and a maximum value of the value range of the first code element on the Y-axis is a vertical coordinate of a point that is at the fourth storage location and that is farthest away from the center of the two-dimensional code. The electronic device determines a left-end X value and a right-end X value for each Y value within the value range by using a preset formula, and draws a pixel between the left-end X value and the right-end X value in a first color, to complete drawing of the first code element, where all pixels of the first code element are in the first color. Herein, a process of drawing an arc-shaped code element is described.

With reference to the second aspect, in a possible implementation, the first code element occupies at least two storage locations. A left-end storage location and a right-end storage location of the at least two storage locations are a third storage location and a fourth storage location. Center points of the third storage location and the fourth storage location are respectively on two sides of a center line of the two-dimensional code. The center line of the two-dimensional code is a straight line that passes through a center point of the two-dimensional code and that is perpendicular to an X-axis. A part of the first code element on a left side of the center line is a first part. A part of the first code element on a right side of the center line is a second part. That the electronic device draws a first code element based on coordinate information of the first storage location includes: The electronic device separately draws the first part and the second part of the first code element. A minimum value of a value range of the first part on a Y-axis is a vertical coordinate of a point that is at the third storage location and that is closest to the center of the two-dimensional code, and a maximum value of the value range of the first part on the Y-axis is a maximum vertical coordinate in a concentric circle to which the third storage location belongs. A minimum value of a value range of the second part on the Y-axis is a vertical coordinate of a point that is at the fourth storage location and that is closest to the center of the two-dimensional code, and a maximum value of the value range of the second part on the Y-axis is a maximum vertical coordinate in a concentric circle to which the fourth storage location belongs. Herein, a process of drawing another arc-shaped code element is described.

According to a third aspect, this application provides an electronic device, including one or more processors and one or more memories. The one or more memories are coupled to the one or more processors. The one or more memories are configured to store computer program code, and the computer program code includes computer instructions. When the computer instructions run on the processor, the electronic device is enabled to perform the method for recognizing a two-dimensional code in any one of the possible implementations of the first aspect.

According to a fourth aspect, this application provides an electronic device, including one or more processors and one or more memories. The one or more memories are coupled to the one or more processors. The one or more memories are configured to store computer program code, and the computer program code includes computer instructions. When the computer instructions run on the processor, the electronic device is enabled to perform the method for generating a two-dimensional code in any one of the possible implementations of the second aspect.

According to a fifth aspect, an embodiment of this application provides a computer storage medium, including computer instructions. When the computer instructions run on an electronic device, a communication apparatus is enabled to perform the actions in any one of the possible implementations of any one of the foregoing aspects.

According to a sixth aspect, an embodiment of this application provides a computer program product. When the computer program product runs on a computer, the computer is enabled to perform the actions in any one of the possible implementations of any one of the foregoing aspects.

DESCRIPTION OF EMBODIMENTS

Figure 1:
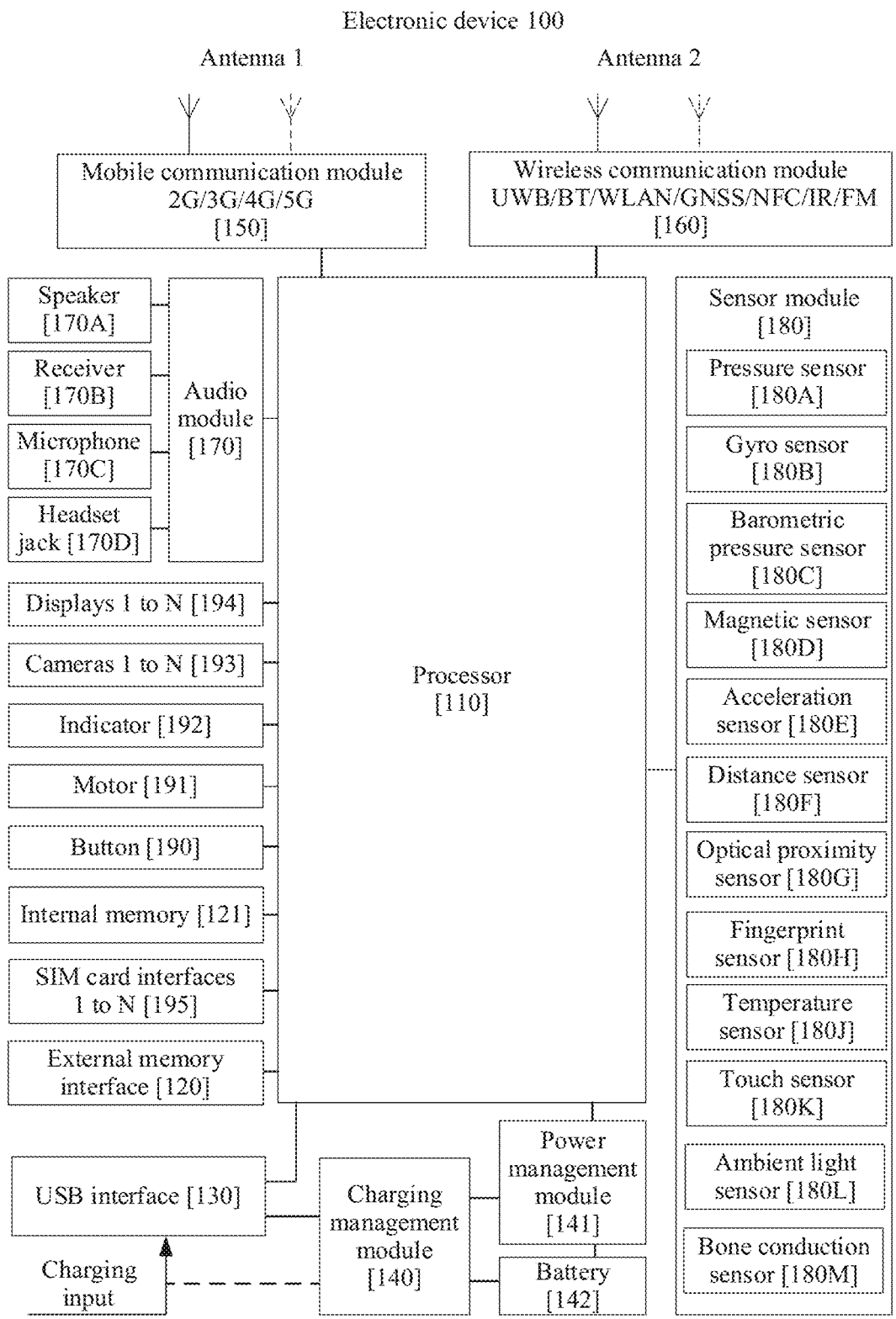
FIG. 1 is a schematic diagram of a structure of an electronic device according to an embodiment of this application.

The following describes technical solutions in embodiments of this application with reference to accompanying drawings. In descriptions of embodiments of this application, "/" indicates "or", unless otherwise specified. For example, A/B may indicate A or B. The term "and/or" in this specification describes only an association relationship between associated objects, and indicates that three relationships may exist. For example. A and/or B may indicate the following three cases: Only A exists, both A and B exist, and only B exists. In addition, in descriptions of embodiments of this application. "a plurality of" means two or more than two.

The terms "first" and "second" used below are merely intended for a purpose of description, and shall not be construed as an indication or an implication of relative importance or an implicit indication of a quantity of indicated technical features. Therefore, a feature limited by "first" or "second" may explicitly or implicitly include one or more features. In descriptions of embodiments of this application. "a plurality of" means two or more than two, unless otherwise specified. Terms such as "middle", "left", "right", "upper", and "lower" indicate an orientation or a location relationship based on an orientation or a location relationship shown in accompanying drawings, and are merely intended to facilitate description of this application and simplify description, but not to indicate or imply that an indicated apparatus or element needs to have a specific orientation or be constructed or operated in a specific orientation. Therefore, the terms cannot be construed as a limitation on this application.

An embodiment of this application provides a method for generating a two-dimensional code. The method is applied to an electronic device 100. In the method, a circular two-dimensional code may be generated, where a code region of the circular two-dimensional code includes at least two concentric circle regions, and a code element includes a dot-shaped code element and an arc-shaped code element. In this embodiment of this application, a quantity of circles in a concentric circle region and a quantity of code elements may be increased to increase a data storage capacity of the two-dimensional code. In addition, the electronic device 100 encrypts a character string during encoding, and a complete character string can be obtained during decoding only by using a decryption algorithm corresponding to an encryption algorithm. This improves security of the two-dimensional code.

In this method, the electronic device 100 binarizes a character string of a to-be-generated two-dimensional code to first obtain a corresponding binary character string; and determines a target version of the to-be-generated two-dimensional code based on a length of the binary character string, where different volumes of data can be stored in different versions. After determining the target version, the electronic device 100 allocates the binary character string to each concentric circle region in a code region of the target version, to obtain two-dimensional code information; and performs mask superposition on the two-dimensional code information by using a mask, to adjust a layout of the two-dimensional code information, and finally draw a final two-dimensional code. In this way, encoding of a two-dimensional code that complies with a two-dimensional code structure of the target version can be completed, and code elements in the generated two-dimensional code are evenly distributed, with more appealing appearance.

The following first describes an electronic device 100 in embodiments of this application.

A type of the electronic device 100 is not specifically limited in this application. The electronic device 100 may be a mobile phone, a tablet computer, a desktop computer, a laptop computer, a handheld computer, a notebook computer, an ultra-mobile personal computer (ultra-mobile personal computer, UMPC), a netbook, a cellular phone, a personal digital assistant (personal digital assistant, PDA), an augmented reality (augmented reality, AR) device, a virtual reality (virtual reality, VR) device, an artificial intelligence (artificial intelligence, AI) device, a wearable device, a vehicle-mounted device, a smart home device, and/or a smart city device. The electronic device 100 may alternatively be a network device such as a cloud server, a virtual server, a background server, a component server, or a data processing server. A specific type of the electronic device is not particularly limited in embodiments of this application.

FIG. 1 is a schematic diagram of a structure of an example electronic device 100 according to an embodiment of this application.

The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It can be understood that the structure shown in this embodiment of this application does not constitute a specific limitation on the electronic device 100. In some other embodiments of this application, the electronic device 100 may include more or fewer components than those shown in the figure, some components may be combined, some components may be split, or there may be a different component layout. The components shown in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent devices, or may be integrated into one or more processors.

The controller may be a nerve center and a command center of the electronic device 100. The controller may generate an operation control signal based on an instruction operation code and a time sequence signal, to control instruction reading and instruction execution.

A memory may be further disposed in the processor 110 to store instructions and data. In some embodiments, the memory in the processor 110 is a cache memory. The memory may store instructions or data that has been used or is cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The charging management module 140 is configured to receive charging input from a charger. The charger may be a wireless charger or a wired charger. In some embodiments in which wired charging is used, the charging management module 140 may receive charging input from a wired charger through the USB interface 130. In some embodiments in which wireless charging is used, the charging management module 140 may receive wireless charging input through a wireless charging coil of the electronic device 100. The charging management module 140 may further supply power to the electronic device through the power management module 141 while charging the battery 142.

The power management module 141 is connected to the battery 142, the charging management module 140, and the processor 110. The power management module 141 receives input from the battery 142 and/or the charging management module 140, and supplies power to the processor 110, the internal memory 121, an external memory, the display 194, the camera 193, the wireless communication module 160, and the like. The power management module 141 may be further configured to monitor parameters such as a battery capacity, a battery cycle count, and a battery state of health (electric leakage and impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented by the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may be further multiplexed to improve antenna utilization. For example, the antenna 1 may be multiplexed as a diversity antenna in a wireless local area network. In some other embodiments, an antenna may be used in combination with a tuning switch.

The mobile communication module 150 may provide a solution applied to the electronic device 100 for wireless communication such as 2G/3G/4G/5G. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules of the mobile communication module 150 may be disposed in the processor 110. In some embodiments, at least some functional modules of the mobile communication module 150 may be disposed in a same device as at least some modules of the processor 110.

The modem processor may include a modulator and a demodulator. The modulator is configured to modulate a to-be-sent low-frequency baseband signal into a medium- or high-frequency signal. The demodulator is configured to demodulate a received electromagnetic wave signal into a low-frequency baseband signal. Then the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (which is not limited to the speaker 170A, the receiver 170B, and the like), or displays an image or a video on the display 194. In some embodiments, the modem processor may be an independent device. In some other embodiments, the modem processor may be independent of the processor 110, and is disposed in a same device as the mobile communication module 150 or another functional module.

The wireless communication module 160 may provide a solution applied to the electronic device 100 for wireless communication such as UWB, a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, or an infrared (infrared, IR) technology. The wireless communication module 160 may be one or more devices integrating at least one communication processor module. The wireless communication module 160 receives an electromagnetic wave through the antenna 2, performs frequency modulation and filtering on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, in the electronic device 100, the antenna 1 is coupled to the mobile communication module 150, and the antenna 2 is coupled to the wireless communication module 160, so that the electronic device 100 can communicate with a network and another device by using a wireless communication technology. The wireless communication technology may include a global system for mobile communications (global system for mobile communications, GSM), a general packet radio service (general packet radio service. GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite-based augmentation system (satellite-based augmentation system. SBAS).

The electronic device 100 implements a display function through the GPU, the display 194, the application processor, and the like. The GPU is a microprocessor for image processing, and is connected to the display 194 and the application processor. The GPU is configured to perform mathematical and geometric computation, and render an image. The processor 110 may include one or more GPUs that execute program instructions to generate or change display information.

The display 194 is configured to display an image, a video, or the like. The display 194 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flex light-emitting diode, FLED), a mini-LED, a micro-LED, a micro-OLED, a quantum dot light-emitting diode (quantum dot light-emitting diode, QLED), or the like. In some embodiments, the electronic device 100 may include one or N displays 194, where N is a positive integer greater than 1.

In some embodiments of this application, the display 194 displays interface content currently output by a system. For example, the interface content is an interface provided by an instant messaging application.

The electronic device 100 may implement a photographing function through the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format, for example, RGB or YUV. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transform on frequency energy.

The video codec is configured to compress or decompress a digital video. The electronic device 100 may support one or more types of video codecs. In this way, the electronic device 100 may play or record videos in a plurality of encoding formats, for example, moving picture experts group (moving picture experts group, MPEG)-1. MPEG-2, MPEG-3, and MPEG-4.

The NPU is a neural-network (neural-network, NN) computing processor. The NPU quickly processes input information with reference to a structure of a biological neural network, for example, a transfer mode between human brain neurons, and may further continuously perform self-learning. Applications such as intelligent cognition of the electronic device 100, for example, image recognition, facial recognition, speech recognition, and text understanding, may be implemented through the NPU.

The internal memory 121 may include one or more random access memories (random access memory, RAM) and one or more non-volatile memories (non-volatile memory, NVM).

The random access memory may include a static random access memory (static random access memory, SRAM), a dynamic random access memory (dynamic random access memory, DRAM), a synchronous dynamic random access memory (synchronous dynamic random access memory, SDRAM), a double data rate synchronous dynamic random access memory (double data rate synchronous dynamic random access memory, DDR SDRAM, for example, a fifth-generation DDR SDRAM is usually referred to as a DDR5 SDRAM), and the like.

The non-volatile memory may include a magnetic disk storage device and a flash memory (flash memory).

The flash memory may include a NOR flash, a NAND flash, a 3D NAND flash, and the like through division according to an operation principle; may include a single-level cell (single-level cell, SLC), a multi-level cell (multi-level cell, MLC), a triple-level cell (triple-level cell, TLC), a quad-level cell (quad-level cell, QLC), and the like through division based on a potential order of a storage unit; may include a universal flash storage (English: universal flash storage, UFS), an embedded multimedia card (embedded multimedia card, eMMC), and the like through division based on storage specifications; and so on.

The processor 110 may directly perform a read or write operation on the random access memory. The random access memory may be configured to store an operating system or an executable program (for example, machine instructions) of another running program, and may be further configured to store data of a user and an application program, and the like.

The non-volatile memory may also store an executable program, data of a user and an application program, and the like, and may be loaded to the random access memory in advance, so that the processor 110 directly performs a read or write operation.

The external memory interface 120 may be connected to an external storage card, for example, a microSD card, to extend a storage capability of the electronic device 100. The external storage card communicates with the processor 110 through the external memory interface 120, to implement a data storage function. For example, files such as music and videos are stored in the external storage card.

The electronic device 100 may implement an audio function, for example, music playing and recording, through the audio module 170, the speaker 170A, the receiver 170B, the microphone 170C, the headset jack 170D, the application processor, and the like.

The audio module 170 is configured to convert digital audio information into analog audio signal output, and is also configured to convert analog audio input into a digital audio signal. The audio module 170 may be further configured to encode and decode an audio signal. In some embodiments, the audio module 170 may be disposed in the processor 110, or some functional modules of the audio module 170 are disposed in the processor 110.

The speaker 170A, also referred to as a "loudspeaker", is configured to convert an electrical audio signal into a sound signal. The electronic device 100 may listen to music or answer a hands-free call through the speaker 170A.

The receiver 170B, also referred to as an "earpiece", is configured to convert an electrical audio signal into a sound signal. When a call is answered or audio information is listened to by using the electronic device 100, the receiver 170B may be put close to a human ear to listen to a voice.

The microphone 170C, also referred to as a "mike" or a "mic", is configured to convert a sound signal into an electrical signal. When making a call or sending a voice message, a user may make a sound near the microphone 170C through the mouth of the user, to input a sound signal to the microphone 170C. At least one microphone 170C may be disposed in the electronic device 100. In some other embodiments, two microphones 170C may be disposed in the electronic device 100, to capture a sound signal and further implement a noise reduction function. In some other embodiments, three, four, or more microphones 170C may alternatively be disposed in the electronic device 100, to capture a sound signal, implement noise reduction, and recognize a sound source, to implement a directional recording function and the like.

The headset jack 170D is used for connecting a wired headset. The headset jack 170D may be the USB interface 130, or may be a 3.5 mm open mobile terminal platform (open mobile terminal platform, OMTP) standard interface or a cellular telecommunications industry association of the USA (cellular telecommunications industry association of the USA, CTIA) standard interface.

The pressure sensor 180A is configured to sense a pressure signal, and may convert the pressure signal into an electrical signal. The gyro sensor 180B may be configured to determine a motion posture of the electronic device 100. The barometric pressure sensor 180C is configured to measure barometric pressure. The magnetic sensor 180D includes a Hall effect sensor. The acceleration sensor 180E may detect accelerations in various directions (usually on three axes) of the electronic device 100, may detect a magnitude and a direction of gravity when the electronic device 100 is still, and may be further configured to recognize a posture of the electronic device and used in applications such as landscape/portrait mode switching and a pedometer. The distance sensor 180F is configured to measure a distance. The optical proximity sensor 180G may include, for example, a light-emitting diode (LED) and an optical detector, for example, a photodiode. The ambient light sensor 180L is configured to sense ambient light brightness. The fingerprint sensor 180H is configured to capture a fingerprint. The temperature sensor 180J is configured to detect temperature. The touch sensor 180K is also referred to as a "touch panel". The touch sensor 180K may be disposed on the display 194, and the touch sensor 180K and the display 194 constitute a touchscreen, which is also referred to as a "touch control screen". The bone conduction sensor 180M may obtain a vibration signal.

The button 190 includes a power button, a volume button, and the like. The button 190 may be a mechanical button or a touch button. The electronic device 100 may receive input on the button, and generate button signal input related to user settings and function control of the electronic device 100.

The motor 191 may generate a vibration prompt. The motor 191 may be configured to provide an incoming call vibration prompt or a touch vibration feedback. For example, touch operations performed on different applications (for example, photographing and audio playing) may correspond to different vibration feedback effect. The motor

191 may also correspond to different vibration feedback effect for touch operations performed on different regions of the display 194. Different application scenarios (for example, a time reminder, information receiving, an alarm clock, and a game) may also correspond to different vibration feedback effect. Touch vibration feedback effect may be further customized.

The indicator 192 may be an indicator light, and may be configured to indicate a charging status and a battery level change, or may be configured to indicate a message, a missed call, a notification, and the like.

The SIM card interface 195 is used for connecting a SIM card.

A software system of the electronic device 100 may use a hierarchical architecture, an event-driven architecture, a microkernel architecture, a micro service architecture, or a cloud architecture. In embodiments of the present invention, an Android system with a hierarchical architecture is used as an example to illustrate a software structure of the electronic device 100.

Figure 2:
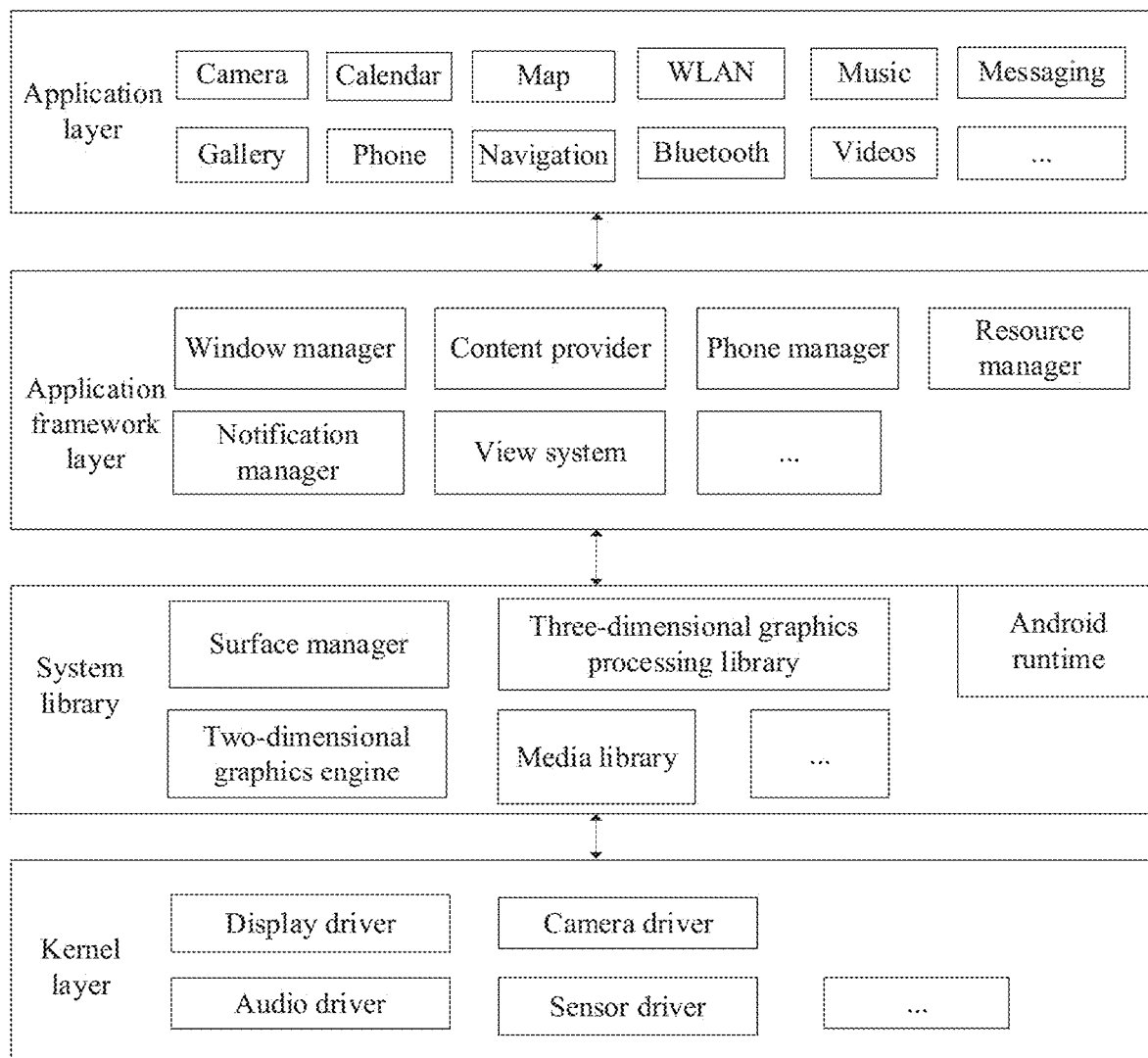
FIG. 2 is a diagram of a software architecture of an electronic device according to an embodiment of this application.

FIG. 2 is a block diagram of a software structure of an electronic device 100 according to an embodiment of the present invention.

In a hierarchical architecture, software is divided into several layers, and each layer has a clear role and task. The layers communicate with each other through a software interface. In some embodiments, the Android system is divided into four layers: an application layer, an application framework layer, an Android runtime (Android runtime) and system library, and a kernel layer from top to bottom.

The application layer may include a series of application packages.

As shown in FIG. 2, the application packages may include applications such as Camera, Gallery, Calendar, Phone, Map, Navigation, WLAN, Bluetooth, Music, Videos, and Messages.

The application framework layer provides an application programming interface (application programming interface, API) and a programming framework for an application at the application layer. The application framework layer includes some predefined functions.

As shown in FIG. 2, the application framework layer may include a window manager, a content provider, a view system, a phone manager, a resource manager, a notification manager, and the like.

The window manager is configured to manage a window program. The window manager may obtain a size of a display, determine whether there is a status bar, perform screen locking, take a screenshot, and the like.

The content provider is configured to store and obtain data, and enable the data to be accessed by an application. The data may include a video, an image, audio, calls that are made and answered, a browsing history, a bookmark, an address book, and the like.

The view system includes visual controls, such as a control for displaying text and a control for displaying a picture. The view system may be configured to construct an application. A display interface may include one or more views. For example, a display interface including an SMS message notification icon may include a text display view and a picture display view.

The phone manager is configured to provide a communication function for the electronic device 100, for example, management of a call status (including answering, hanging up, or the like).

The resource manager provides various resources such as a localized character string, an icon, a picture, a layout file, and a video file for an application.

The notification manager enables an application to display notification information in a status bar, and may be configured to convey a notification message. The notification manager may automatically disappear after a short pause without user interaction. For example, the notification manager is configured to indicate download completion or provide a message notification. The notification manager may alternatively be a notification that appears in a top status bar of the system in a form of a graph or scroll bar text, for example, a notification for an application running in the background, or may be a notification that appears on the screen in a form of a dialog window. For example, text information is prompted in the status bar, a prompt tone is played, the electronic device vibrates, or an indicator blinks.

The Android runtime includes a kernel library and a virtual machine. The Android runtime schedules and manages the Android system.

The kernel library includes two parts: a function that needs to be invoked in Java language and a kernel library of Android.

The application layer and the application framework layer run on the virtual machine. The virtual machine executes Java files at the application layer and the application framework layer as binary files. The virtual machine is configured to perform functions such as object lifecycle management, stack management, thread management, security and exception management, and garbage collection.

The system library may include a plurality of functional modules, for example, a surface manager (surface manager), a media library (Media Libraries), a three-dimensional graphics processing library (for example, OpenGL ES), and a 2D graphics engine (for example, SGL).

The surface manager is configured to manage a display subsystem, and provide fusion of 2D and 3D layers for a plurality of applications.

The media library supports playing and recording of a plurality of commonly used audio and video formats, static image files, and the like. The media library may support a plurality of audio and video encoding formats, for example, MPEG-4, H.264, MP3, AAC. AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

Figure 3A:
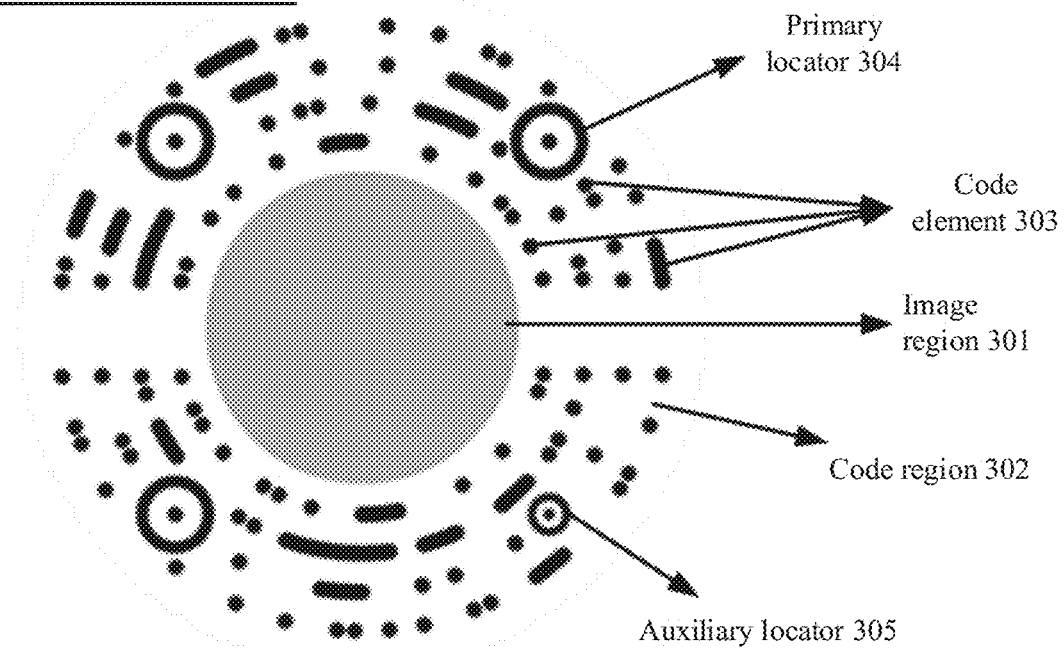
FIG. 3A is a schematic diagram of a structure of a two-dimensional code according to an embodiment of this application.
Figure 3B:
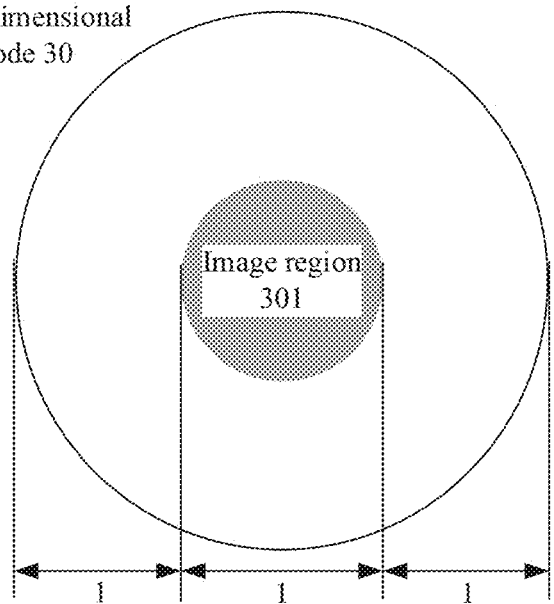
FIG. 3B is a schematic diagram of a structure of an image region and a code region of a two-dimensional code according to an embodiment of this application.

FIG. 3A is a schematic diagram of a structure of a two-dimensional code 30 according to an embodiment of this application. As shown in FIG. 3A, the two-dimensional code 30 is generally in a circular shape, and the two-dimensional code 30 includes an image region 301 in the middle and a code region 302 surrounding the image region 301. For example, as shown in FIG. 3B, a ratio of a width of the image region in a horizontal direction to a width of the two-dimensional code in the horizontal direction may be 1:3. A ratio of a location of the image region to a location of the code region is not limited in this embodiment of this application.

The image region 301 is used for placing a user-defined image. For example, the user-defined image may be an official identification picture of an application platform that uses the two-dimensional code technology, or an image defined by a user registered with an application platform that uses the two-dimensional code technology. In this way, in a middle part of the two-dimensional code 30, that is, the most important visual sensitive region of the two-dimensional code, a picture is set for an application platform user, so that recognizability of a two-dimensional code user can be improved.

In this embodiment of this application, the image region in the middle part of the two-dimensional code 30 may be a ring region, a rectangular region, or in another shape. A shape of the image region is not specifically limited in this embodiment. In some embodiments, an electronic device 100 performs circularization on an input image in the image region 301. To be specific, when a third-party image is input, a region (an edge part) beyond a circle becomes transparent.

The code region 302 is formed by gathering code elements 303 of the two-dimensional code 30. The code elements 303 are distributed on at least two concentric circles, and the code elements 303 are configured to record or store codewords (codeword). The codeword is a bit sequence obtained by encoding raw data. The codeword may include a data code (data code) or an error correction code (error correction code). Common encoding schemes for two-dimensional codes include digital encoding and character encoding.

A concentric circle region of the code region 302 includes a plurality of locations for storing codewords. A first value (for example, a binary value 1 or 0) is stored at a location occupied by the code element 303. A second value (for example, a binary value 0 or 1) is stored at a location not occupied by the code element 303 in the concentric circle region. The electronic device 100 may obtain a binary character string by recognizing the code region 302, and then decode the binary character string by using a decoding algorithm to obtain corresponding information.

In this embodiment of this application, the code element 303 includes an arc-shaped code element and a dot-shaped code element. In some embodiments, radii of all dot-shaped code elements are the same. In some embodiments, each arc-shaped code element includes two, three, or more dot-shaped code elements. In other words, the arc-shaped code element is constituted by two, three, or more dot-shaped code elements. A capacity of information that can be stored in an arc-shaped code element is an integer multiple of a capacity of information that can be stored in a dot-shaped code element.

Figure 12A:
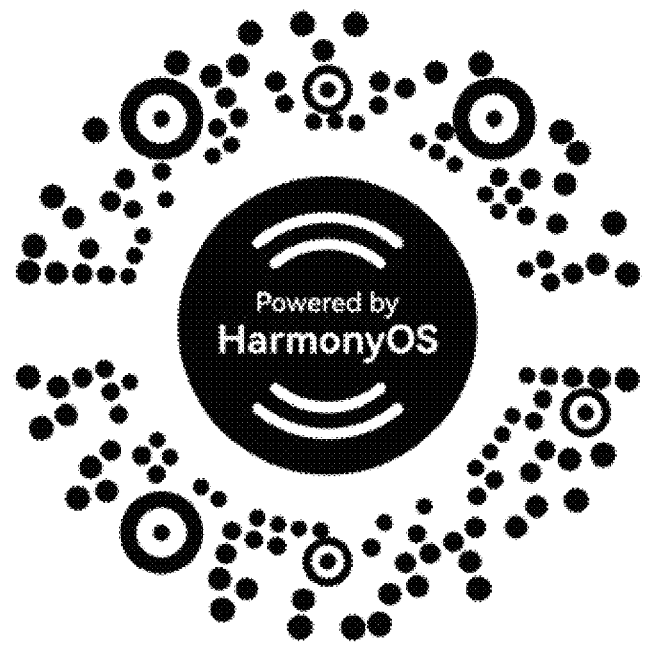
FIG. 12A and FIG. 12B are schematic diagrams of a structure of another two-dimensional code according to an embodiment of this application.

In some embodiments, radii of dot-shaped code elements in the code region of the two-dimensional code may be different, for example, as shown in FIG. 12A. In FIG. 12A, radii of dot-shaped code elements in a same concentric circle region are the same, and radii of dot-shaped code elements in different concentric circle regions are different.

Figure 12B:
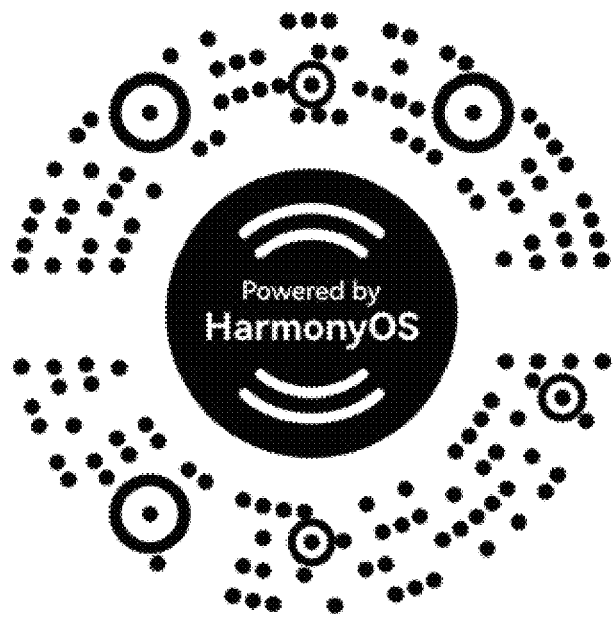

In some embodiments, the code region of the two-dimensional code may include only a dot-shaped code element, as shown in FIG. 12B.

In some embodiments, the code region of the two-dimensional code may include only an arc-shaped code element.

In this embodiment of this application, a quantity of concentric circle regions included in the code region 302 may be adjusted based on a data volume of the two-dimensional code. An information capacity of the two-dimensional code may be expanded by increasing the quantity of concentric circle regions in the code region 302 and a quantity of code elements in the concentric circle region. In FIG. 1, only an example in which the code region 302 of the two-dimensional code includes four concentric circle regions is used for description. The quantity of concentric circle regions in the code region is not specifically limited in this embodiment.

In some embodiments, each concentric circle region in the code region 302 may be divided into an upper-half region and a lower-half region, and the upper-half region and the lower-half region are spaced apart by a specific distance. In this embodiment of this application, the upper-half region and the lower-half region may also be referred to as a first code region and a second code region. A spacing region between the upper-half region and the lower-half region is divided into a left spacing region and a right spacing region. The left spacing region and the right spacing region may also be referred to as a first spacing region and a second spacing region.

Figure 5A:
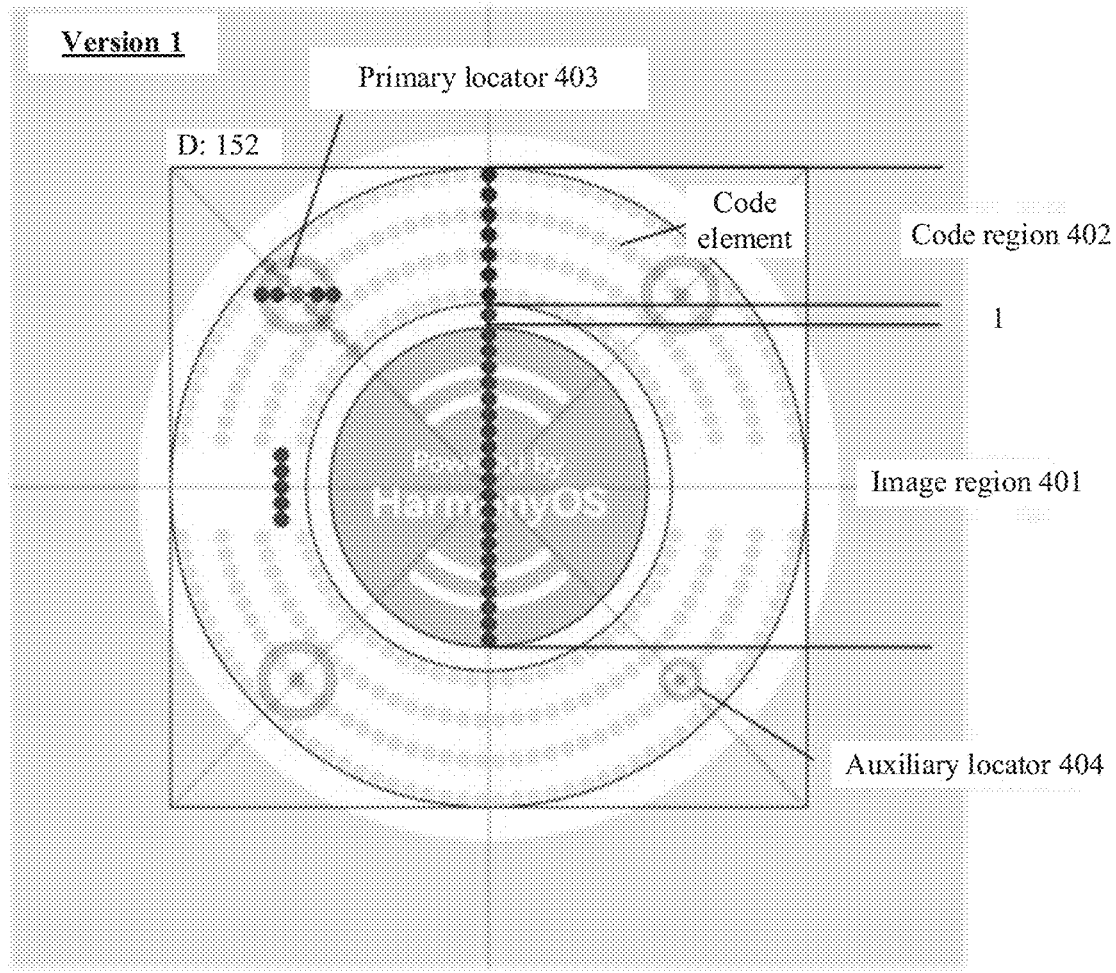
FIG. 5A to FIG. 5H are schematic diagrams of structures of different versions of two-dimensional codes according to an embodiment of this application.
Figure 5B:
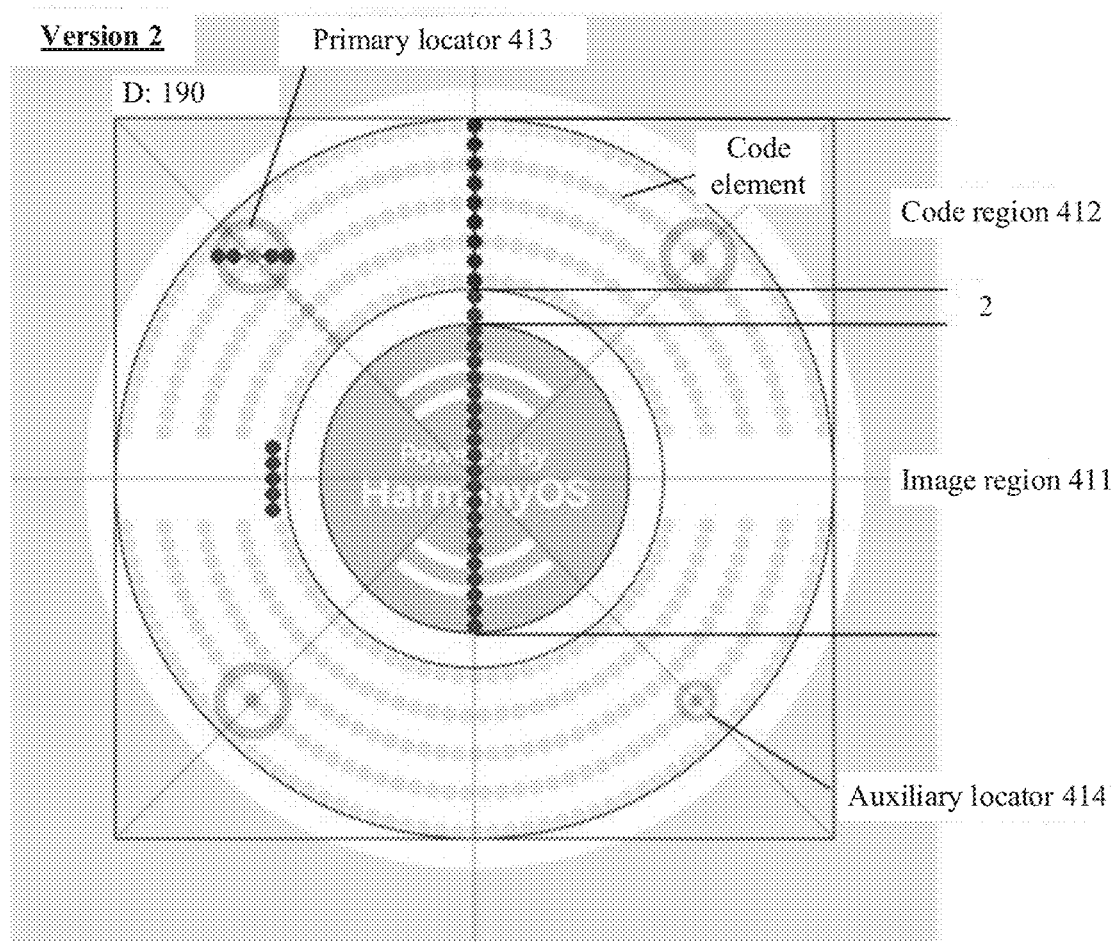
Figure 5C:
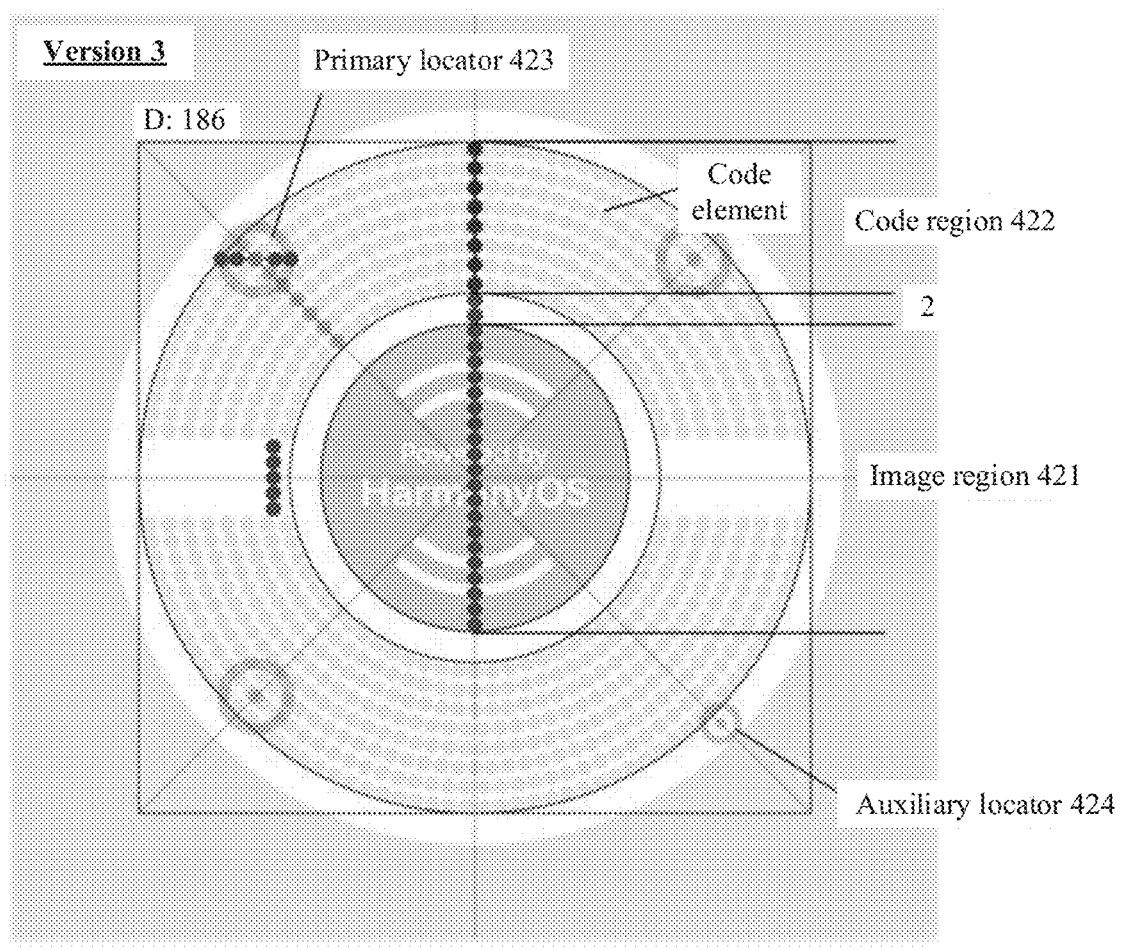
Figure 5D:
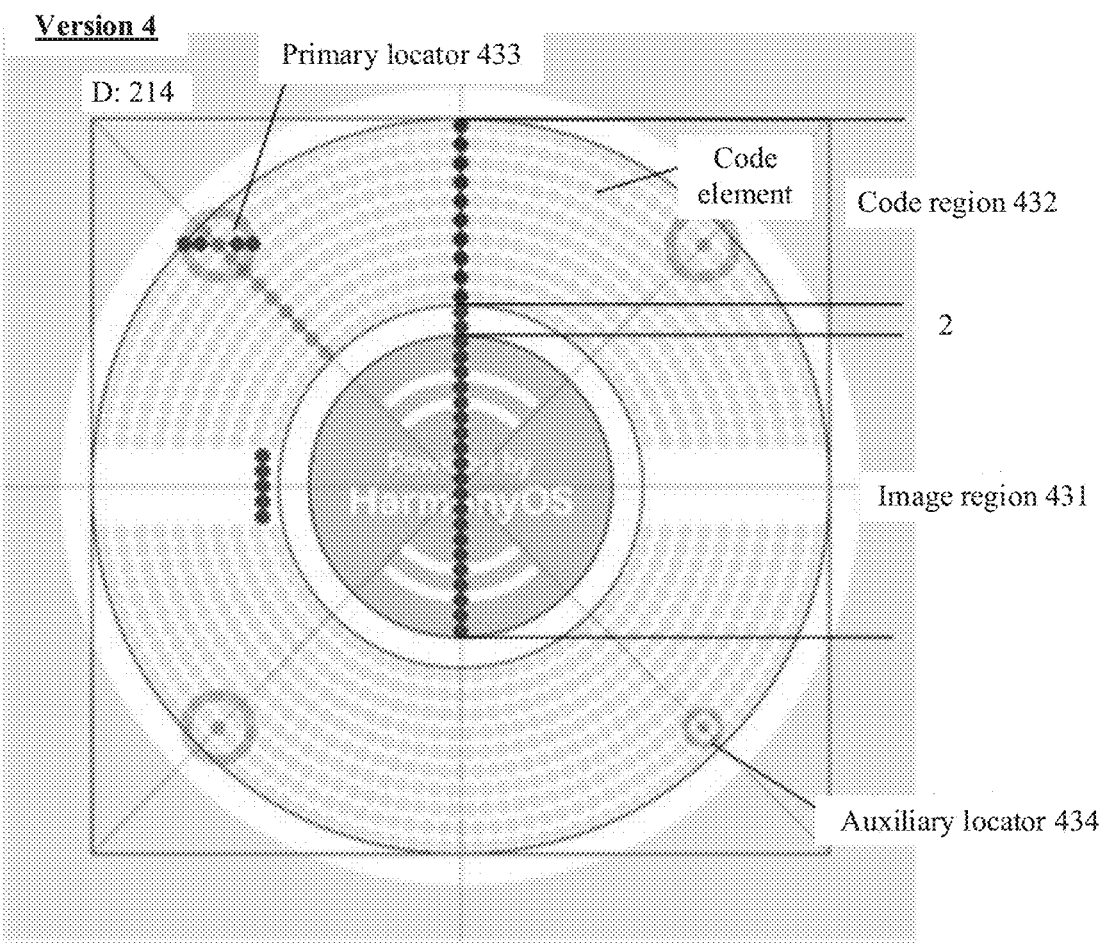
Figure 5E:
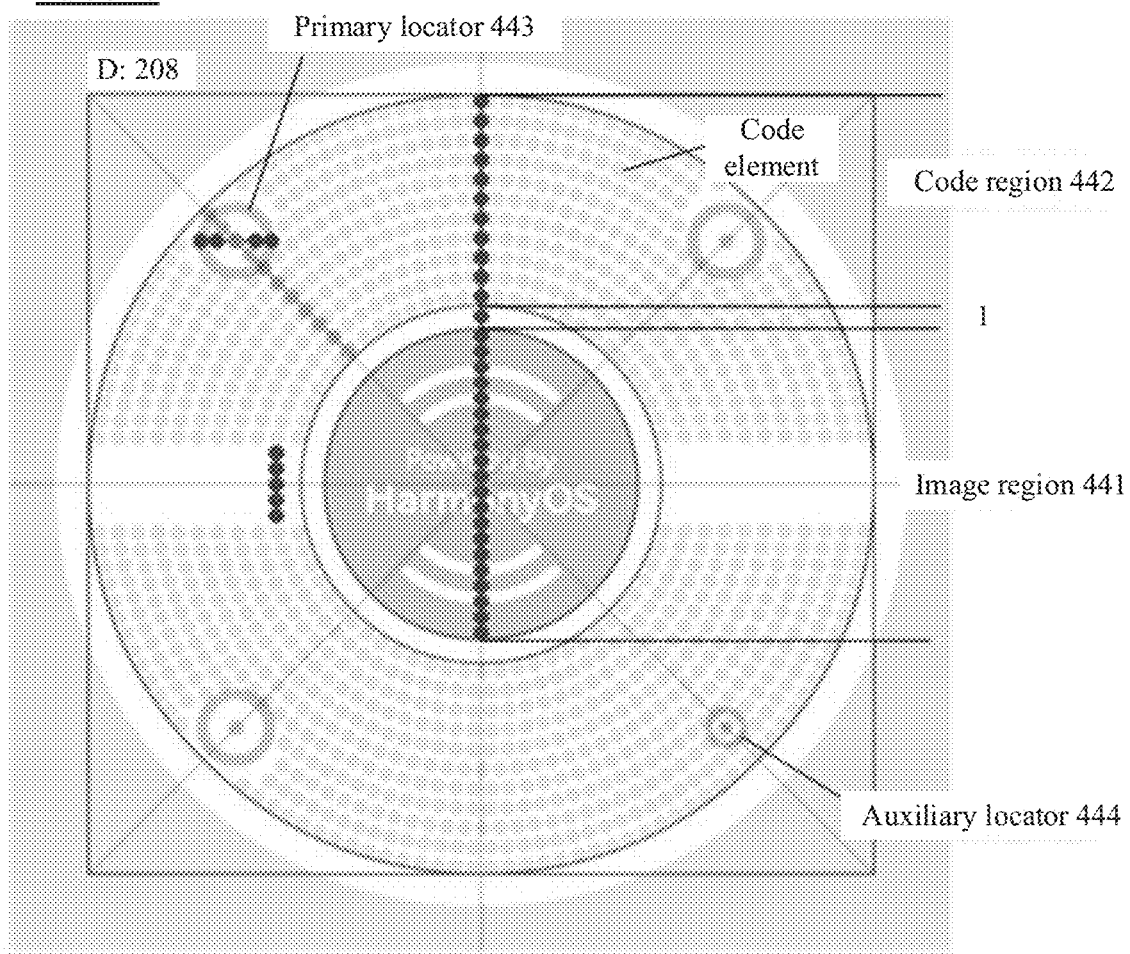
Figure 5F:
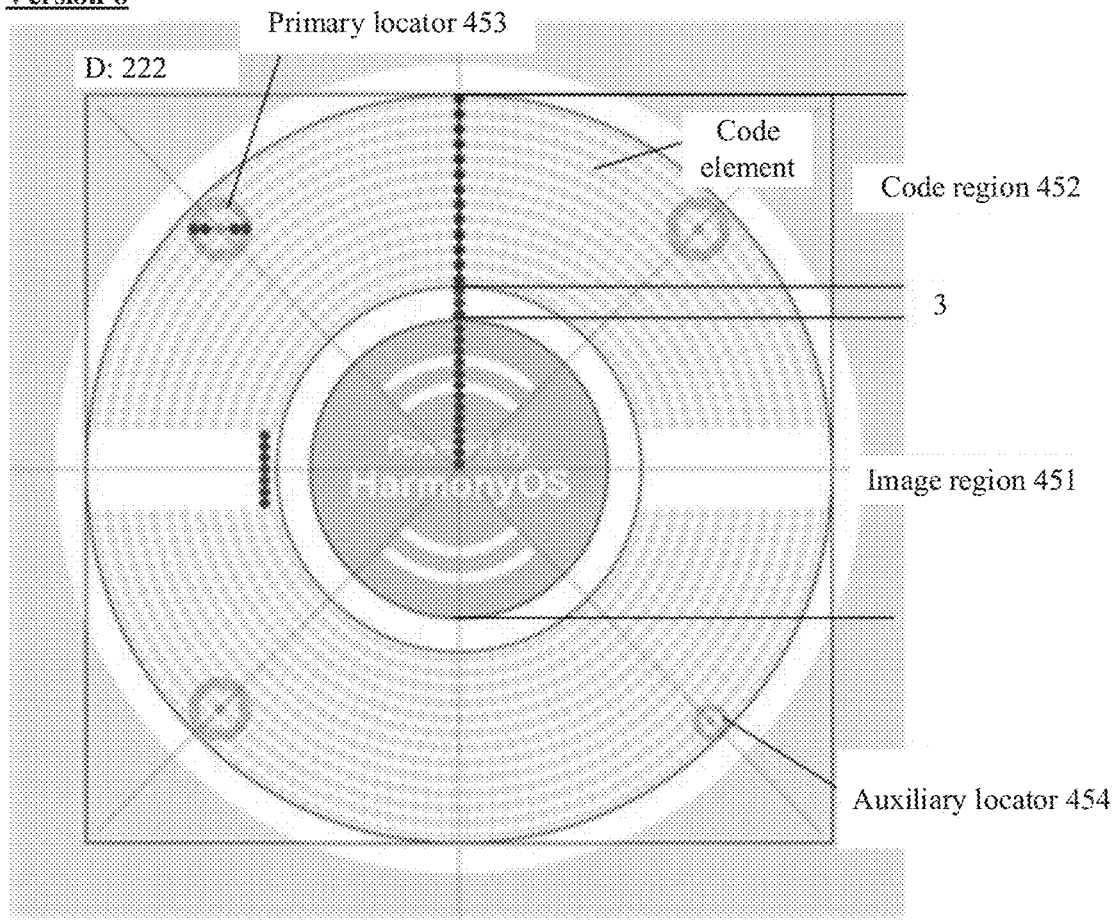

For example, FIG. 5A to FIG. 5F show examples of different versions of two-dimensional codes according to an embodiment of this application. FIG. 5A includes four concentric circle regions. Each concentric circle region in a code region is divided into an upper-half region and a lower-half region, and the upper-half region and the lower-half region are spaced apart by a diameter distance of five dot-shaped code elements. FIG. 5F includes 13 concentric circle regions. Each concentric circle region in a code region is divided into an upper-half region and a lower-half region, and the upper-half region and the lower-half region are spaced apart by a diameter distance of seven dot-shaped code elements.

In some embodiments, each concentric circle region in the code region 302 may not be divided. To be specific, in different versions of two-dimensional codes, dot-shaped code elements in each concentric circle region are evenly distributed at a same spacing.

In addition, the image region 301 and the code region 302 of the two-dimensional code 30 do not overlap each other. In this way, an image inserted into the image region 301 does not block the code element 303 in the code region 301 of the two-dimensional code. A first spacing exists between the image region 301 and the code region 302. A second spacing exists between every two adjacent concentric circle regions in the code region 302.

Further, as shown in FIG. 1, a region of the two-dimensional code 30 other than the image region 301 further includes a locator. The locator is used to identify the code region 302 of the two-dimensional code, to filter and screen a to-be-recognized image. As shown in FIG. 3A, a structure of the two-dimensional code 30 includes three primary locators 304 and one auxiliary locator 305. The three primary locators 304 and the one auxiliary locator 305 are all circular regions.

An outer contour of the primary locator 304 of the two-dimensional code 30 may be circular. Each primary locator 304 includes a black circular region in the center, a black ring region at an outer side, and a white ring region between the black circular region and the black ring region. In this way, widths of concentric circles can remain stable even in the case of rotation, twisting, or the like, so that the locator has a stable geometric feature. This improves accuracy of locating and recognizing the locator, and ensures that information can still be located when the two-dimensional code tilts.

Figure 3C:
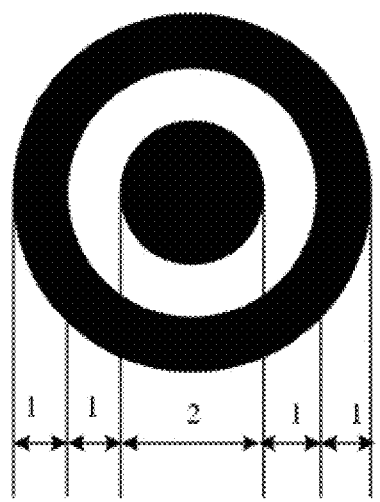
FIG. 3C is a schematic diagram of a structure of a primary locator of a two-dimensional code according to an embodiment of this application.

In addition, the primary locator 304 of the two-dimensional code may use a ratio of approximately 1:1:2:1:1. To be specific, in the primary locator 304, a radius of the black circular region, a width of the white ring region, and a width of the black ring region remain at a ratio of approximately 1:1:1. For example, as shown in FIG. 3C, in the primary locator, the radius of the black circular region is 1, the width of the white ring region is 1, and the width of the black ring region is 1.

A preset geometric shape in the auxiliary locator 305 may be a unique geometric shape, to be distinguished from a geometric shape in another region of the two-dimensional code, such as the primary locator 304. A shape of the auxiliary locator 305 may alternatively be the same as that of the primary locator 304. To be specific, the auxiliary locator 305 may also use a ratio of approximately 1:1:2:1:1. However, a size of the auxiliary locator 305 is different from that of the primary locator 304.

In some embodiments, the auxiliary locator 305 may be a circular region, so that the auxiliary locator 305 has a stable structure. In this way, an overall structure of the two-dimensional code 30 is circular, and sub-elements of the two-dimensional code 30 are also circular. The circular shape has a feature of central symmetry, and is symmetric regardless of rotation. Therefore, the two-dimensional code 30 has a stable geometric structure, and the entire two-dimensional code looks more appealing. The preset geometric shape in the auxiliary locator 305 may be set by persons skilled in the art as required. This is not specifically limited herein in this embodiment.

A location and a ratio of each region are not limited in this embodiment of this application. For example, the image region 301 and the code region 302 may be at a ratio of 1:1 in the horizontal direction. Spacings between concentric circles may be the same or different. Radii of dot-shaped code elements may be the same or different.

Figure 4:
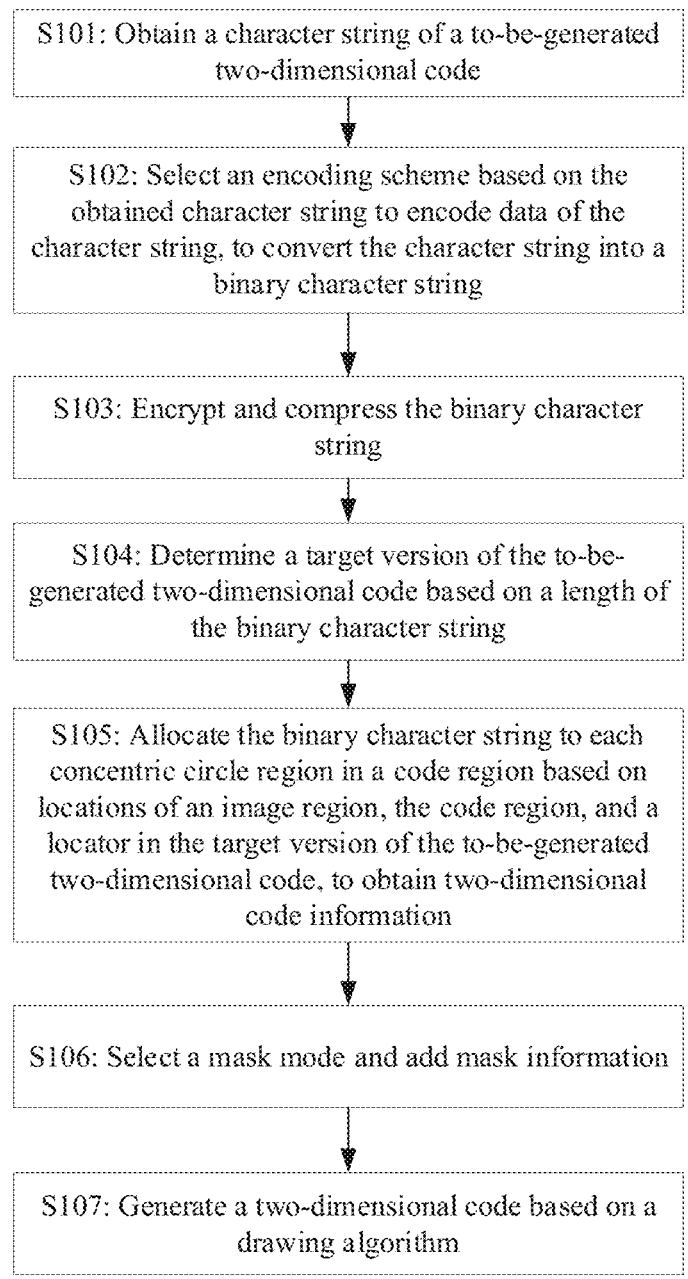
FIG. 4 is a schematic flowchart of a method for generating a two-dimensional code according to an embodiment of this application.

Based on the structure of the foregoing two-dimensional code, embodiments of this application provide a method for generating a two-dimensional code. FIG. 4 shows a process of a method for generating a two-dimensional code. Specific steps are as follows.

Step S101: Obtain a character string of a to-be-generated two-dimensional code.

An electronic device 100 obtains the character string of the to-be-generated two-dimensional code. The character string may be a series of digits, a sentence, a link, or the like, for example, "abcd", "I love Beijing", or "http://www.xxxx.xxxx".

Step S102: Select an encoding scheme based on the obtained character string to encode data of the character string.

The electronic device 100 selects a most appropriate encoding scheme based on the obtained character string. The encoding scheme includes digital encoding, character encoding, byte encoding, Japanese encoding, and the like.

In some embodiments, the digital encoding may correspond to decimal digits 0 to 9; the character encoding may include decimal digits 0 to 9, uppercase letters, and characters such as $, %, *, +, -, ., /, :, and space; the byte encoding may correspond to an ISO-8859-1 character set; and the Japanese encoding may correspond to double-byte encoding derived from a Shift JIS character set (a Japanese encoding character set).

In all the encoding schemes, text (the character string of the to-be-generated two-dimensional code) is encoded into a series of binary bits including 0 and 1, but different code conversion methods are used. For example, for the character encoding, all characters supported by the character encoding may correspond to one index value. For example, in a base_45 table, digits 0) to 9 correspond to index values 0 to 9, letters A to Z correspond to index values 10 to 35, a space character corresponds to an index value 36, a character "$" corresponds to an index value 37, a character "%" corresponds to an index value 38, a character "." corresponds to an index value 42, and a character "/" corresponds to an index value 43.

The electronic device 100 encodes the character string based on the selected encoding scheme, and adds functional encoding information (including encoding scheme indication information, character count information, padding information, and the like). The electronic device 100 converts the character string into a corresponding binary character string (for example, 1010101111001101), and determines a length of the binary character string into which the character string is converted through encoding.

Step S103: Encrypt and compress the binary character string. This step is optional.

The electronic device 100 encrypts and compresses the binary character string by using an encryption algorithm and a compression algorithm, to improve security of the character string, and increase storage space of the character string.

The encryption algorithm includes, for example, an MDS message digest algorithm (MDS Message Digest Algorithm), a secure hash algorithm (Secure Hash Algorithm, SHA), a hash-based message authentication code (Hash-based Message Authentication Code, HMAC), a data encryption standard (Data Encryption Standard, DES), 3DES, an advanced encryption standard (Advanced Encryption Standard, AES), and an RSA algorithm. The compression algorithm includes, for example, a storage-based data-optimized encoding and compression algorithm.

Step S104: Determine a target version of the to-be-generated two-dimensional code based on the length of the binary character string.

Different versions provide different data storage capacities A longer binary character string indicates a larger volume of data that needs to be stored. The electronic device 100 determines the target version of the to-be-generated two-dimensional code based on the length of the binary character string.

The following describes six versions of two-dimensional codes in embodiments of this application by using examples. It should be noted that, when dot-shaped code elements in the six versions of two-dimensional codes are described below, the dot-shaped code elements herein are all storage locations, and are not equivalent to code elements in a generated two-dimensional code.

Version 1: A code region of a two-dimensional code includes four concentric circle regions.

As shown in FIG. 5A, an image region 401 of a two-dimensional code 40 indicates a brand type (HarmonyOS, HarmonyOS) of the two-dimensional code 40. It can be learned that, in FIG. 5A, the image region 401 is circular.

A code region 402 includes four concentric circle regions by using a center point of the image region 401 is a circle center. Dot-shaped code elements are evenly arranged in each concentric circle region. Distances between centers of two adjacent dot-shaped code elements in each concentric circle region (or arc lengths between centers of every two adjacent dot-shaped code elements) are the same. Each dot-shaped code element can store information, and the information stored in each dot-shaped code element may be indicated by a color. If a dot-shaped code element stores first information (which may be, for example, a binary value 1), the dot-shaped code element is set to be in a first color (for example, black) If a dot-shaped code element stores second information (which may be, for example, a binary value 0)), the dot-shaped code element is set to be in a second color (for example, white or a transparent color) or uncolored.

A first spacing exists between the image region 401 and the code region 402. A second spacing exists between every two adjacent concentric circle regions in the code region 402. Each concentric circle region includes an inner ring and an outer ring. A width of the concentric circle region is a difference between a radius of the inner ring and a radius of the outer ring. The second spacing is a spacing between an outer ring of a smaller concentric circle region and an inner ring of a larger concentric circle region in two adjacent concentric circle regions. A third spacing exists between two adjacent dot-shaped code elements in each concentric circle region. For example, in FIG. 5A, if a diameter of one dot-shaped code element is 1, a radius of the image region 401 is 10, and a spacing between the image region 401 and the code region 402 is 1, that is, the first spacing is 1 or a diameter of one dot-shaped code element; a width of each concentric circle region in the code region 402 is 1, that is, a diameter of one dot-shaped code element; a spacing between every two adjacent concentric circle regions in the code region 402 is 1, that is, the second spacing is 1 or a diameter of one dot-shaped code element; and a spacing between two adjacent dot-shaped code elements in each concentric circle region may be 0 or an arc with a same central angle, that is, the third spacing may be 0 or an arc with a same central angle.

In some embodiments, the four concentric circle regions each are divided into an upper-half region and a lower-half region, and a fourth spacing exists between the upper-half region and the lower-half region. For example, in FIG. 5A, if a diameter of one dot-shaped code element is 1, a spacing between the upper-half region and the lower-half region is 5.

A locator region is in the two-dimensional code. For example, FIG. 5A includes three primary locators 403 and one auxiliary locator 404. Outer contours of the three primary locators 403 and the one auxiliary locator 404 are all circular. Centers of the primary locators 403 are all in a penultimate concentric circle region from a periphery. A diameter of one dot-shaped code element is 1. In this case, a diameter of the three primary locators 403 is 5.

Version 2: A code region of a two-dimensional code includes five concentric circle regions.

As shown in FIG. 5B, an image region 411 of a two-dimensional code 41 indicates a brand type (HarmonyOS, HarmonyOS) of the two-dimensional code 41. A code region 412 includes five concentric circle regions by using a center point of the image region 411 is a circle center. Dot-shaped code elements are evenly arranged in each concentric circle region. Distances between centers of two adjacent dot-shaped code elements in each concentric circle region (or arc lengths between centers of every two adjacent dot-shaped code elements) are the same.

A first spacing exists between the image region 411 and the code region 412. A second spacing exists between every two adjacent concentric circle regions in the code region 412. A third spacing exists between two adjacent dot-shaped code elements in each concentric circle region. For example, in FIG. 5B, if a diameter of one dot-shaped code element is 1, a radius of the image region 411 is 10, and a spacing between the image region 411 and the code region 412 is 2, that is, the first spacing is 2 or diameters of two dot-shaped code elements; a spacing between every two adjacent concentric circle regions in the code region 412 is 1, that is, the second spacing is 1 or a diameter of one dot-shaped code element; and a spacing between two adjacent dot-shaped code elements in each concentric circle region may be 0 or an arc with a same central angle, that is, the third spacing may be 0 or an arc with a same central angle.

In some embodiments, the four concentric circle regions each are divided into an upper-half region and a lower-half region, and a fourth spacing exists between the upper-half region and the lower-half region. For example, in FIG. 5B, if a diameter of one dot-shaped code element is 1, a spacing between the upper-half region and the lower-half region is 5.

A locator region is in the two-dimensional code. For example, FIG. 5B includes three primary locators 413 and one auxiliary locator 414. Outer contours of the three primary locators 413 and the one auxiliary locator 414 are all circular. Centers of the primary locators 413 are all in a penultimate concentric circle region from a periphery. A diameter of one dot-shaped code element is 1. In this case, a diameter of the three primary locators 413 is 5.

Version 3: A code region of a two-dimensional code includes eight concentric circle regions.

As shown in FIG. 5C, an image region 421 of a two-dimensional code 42 indicates a brand type (HarmonyOS, HarmonyOS) of the two-dimensional code 42. A code region 422 includes eight concentric circle regions by using a center point of the image region 421 is a circle center. Dot-shaped code elements are evenly arranged in each concentric circle region. Distances between centers of two adjacent dot-shaped code elements in each concentric circle region (or arc lengths between centers of every two adjacent dot-shaped code elements) are the same.

A first spacing exists between the image region 421 and the code region 422. A second spacing exists between every two adjacent concentric circle regions in the code region 422. A third spacing exists between two adjacent dot-shaped code elements in each concentric circle region. For example, in FIG. 5C, if a diameter of one dot-shaped code element is 1, a radius of the image region 421 is 10, and a spacing between the image region 421 and the code region 422 is 2, that is, the first spacing is 2 or diameters of two dot-shaped code elements; a spacing between every two adjacent concentric circle regions in the code region 422 is less than 1, that is, the second spacing may be between 0 and 1; and a spacing between two adjacent dot-shaped code elements in each concentric circle region may be 0 or an arc with a same central angle, that is, the third spacing may be 0 or an arc with a same central angle.

In some embodiments, the eight concentric circle regions each are divided into an upper-half region and a lower-half region, and a fourth spacing exists between the upper-half region and the lower-half region. For example, in FIG. 5C, if a diameter of one dot-shaped code element is 1, a spacing between the upper-half region and the lower-half region is 5.

A locator region is in the two-dimensional code. For example, FIG. 5C includes three primary locators 423 and one auxiliary locator 424. Outer contours of the three primary locators 423 and the one auxiliary locator 424 are all circular. Centers of the primary locators 423 are all in a penultimate concentric circle region from a periphery. A diameter of one dot-shaped code element is 1. In this case, a diameter of the three primary locators 423 is 5.

Version 4: A code region of a two-dimensional code includes 10 concentric circle regions.

As shown in FIG. 5D, an image region 431 of a two-dimensional code 43 indicates a brand type (HarmonyOS, HarmonyOS) of the two-dimensional code 43. A code region 432 includes 10 concentric circle regions by using a center point of the image region 431 is a circle center. Dot-shaped code elements are evenly arranged in each concentric circle region. Distances between centers of two adjacent dot-shaped code elements in each concentric circle region (or arc lengths between centers of every two adjacent dot-shaped code elements) are the same.

A first spacing exists between the image region 431 and the code region 432. A second spacing exists between every two adjacent concentric circle regions in the code region 432. A third spacing exists between two adjacent dot-shaped code elements in each concentric circle region. For example, in FIG. 5D, if a diameter of one dot-shaped code element is 1, a radius of the image region 431 is 10, and a spacing between the image region 431 and the code region 432 is 2, that is, the first spacing is 2 or diameters of two dot-shaped code elements; a spacing between every two adjacent concentric circle regions in the code region 432 is less than 1, that is, the second spacing may be between 0 and 1; and a spacing between two adjacent dot-shaped code elements in each concentric circle region may be 0 or an arc with a same central angle, that is, the third spacing may be 0 or an arc with a same central angle.

In some embodiments, the four concentric circle regions each are divided into an upper-half region and a lower-half region, and a fourth spacing exists between the upper-half region and the lower-half region. For example, in FIG. 5D, if a diameter of one dot-shaped code element is 1, a spacing between the upper-half region and the lower-half region is 5.

A locator region is in the two-dimensional code. For example. FIG. 5D includes three primary locators 433 and one auxiliary locator 434. Outer contours of the three primary locators 433 and the one auxiliary locator 434 are all circular. Centers of the primary locators 433 are all in a penultimate concentric circle region from a periphery. A diameter of one dot-shaped code element is 1. In this case, a diameter of the three primary locators 433 is 5.

Version 5: A code region of a two-dimensional code includes 11 concentric circle regions.

As shown in FIG. 5E, an image region 441 of a two-dimensional code 44 indicates a brand type (HarmonyOS, HarmonyOS) of the two-dimensional code 44. A code region 442 includes 11 concentric circle regions by using a center point of the image region 441 is a circle center. Dot-shaped code elements are evenly arranged in each concentric circle region. Distances between centers of two adjacent dot-shaped code elements in each concentric circle region (or arc lengths between centers of every two adjacent dot-shaped code elements) are the same.

A first spacing exists between the image region 441 and the code region 442. A second spacing exists between every two adjacent concentric circle regions in the code region 442. A third spacing exists between two adjacent dot-shaped code elements in each concentric circle region. For example, in FIG. 5E, if a diameter of one dot-shaped code element is 1, a radius of the image region 441 is 10, and a spacing between the image region 441 and the code region 442 is 1, that is, the first spacing is 1 or a diameter of one dot-shaped code element; a spacing between every two adjacent concentric circle regions in the code region 442 is less than 1, that is, the second spacing may be between 0 and 1; and a spacing between two adjacent dot-shaped code elements in each concentric circle region may be 0 or an arc with a same central angle, that is, the third spacing may be 0 or an arc with a same central angle.

In some embodiments, the 11 concentric circle regions each are divided into an upper-half region and a lower-half region, and a fourth spacing exists between the upper-half region and the lower-half region. For example, in FIG. 5E, if a diameter of one dot-shaped code element is 1, a spacing between the upper-half region and the lower-half region is 5.

A locator region is in the two-dimensional code. For example, FIG. 5E includes three primary locators 443 and one auxiliary locator 444. Outer contours of the three primary locators 443 and the one auxiliary locator 444 are all circular. Centers of the primary locators 443 are all in a penultimate concentric circle region from a periphery. A diameter of one dot-shaped code element is 1. In this case, a diameter of the three primary locators 443 is 5.

Version 6: A code region of a two-dimensional code includes 13 concentric circle regions.

As shown in FIG. 5F, an image region 451 of a two-dimensional code 45 indicates a brand type (Harmony OS, Harmony OS) of the two-dimensional code 45. A code region 452 includes 13 concentric circle regions by using a center point of the image region 451 is a circle center. Dot-shaped code elements are evenly arranged in each concentric circle region. Distances between centers of two adjacent dot-shaped code elements in each concentric circle region (or arc lengths between centers of every two adjacent dot-shaped code elements) are the same.

A first spacing exists between the image region 451 and the code region 452. A second spacing exists between every two adjacent concentric circle regions in the code region 452. A third spacing exists between two adjacent dot-shaped code elements in each concentric circle region. For example, in FIG. 5F, if a diameter of one dot-shaped code element is 1, a radius of the image region 451 is 13, and a spacing between the image region 451 and the code region 452 is 3, that is, the first spacing is 3 or diameters of three dot-shaped code elements; a spacing between every two adjacent concentric circle regions in the code region 452 is less than 1, that is, the second spacing may be between 0 and 1; and a spacing between two adjacent dot-shaped code elements in each concentric circle region may be 0 or an arc with a same central angle, that is, the third spacing may be 0 or an arc with a same central angle.

In some embodiments, the four concentric circle regions each are divided into an upper-half region and a lower-half region, and a fourth spacing exists between the upper-half region and the lower-half region. For example, in FIG. 5F, if a diameter of one dot-shaped code element is 1, a spacing between the upper-half region and the lower-half region is 7.

A locator region is in the two-dimensional code. For example, FIG. 5F includes three primary locators 453 and one auxiliary locator 454. Outer contours of the three primary locators 453 and the one auxiliary locator 454 are all circular. Centers of the primary locators 453 are all in a penultimate concentric circle region from a periphery. A diameter of one dot-shaped code element is 1. In this case, a diameter of the three primary locators 453 is 5.

It can be understood that a larger quantity of concentric circle regions and a larger quantity of dot-shaped code elements indicate a larger data storage capacity of the version. A quantity of concentric circle regions in a two-dimensional code and a quantity of dot-shaped code elements in each concentric circle region are not limited to the foregoing six versions, and may be configured in another manner. This is not limited in this application.

Figure 5G:
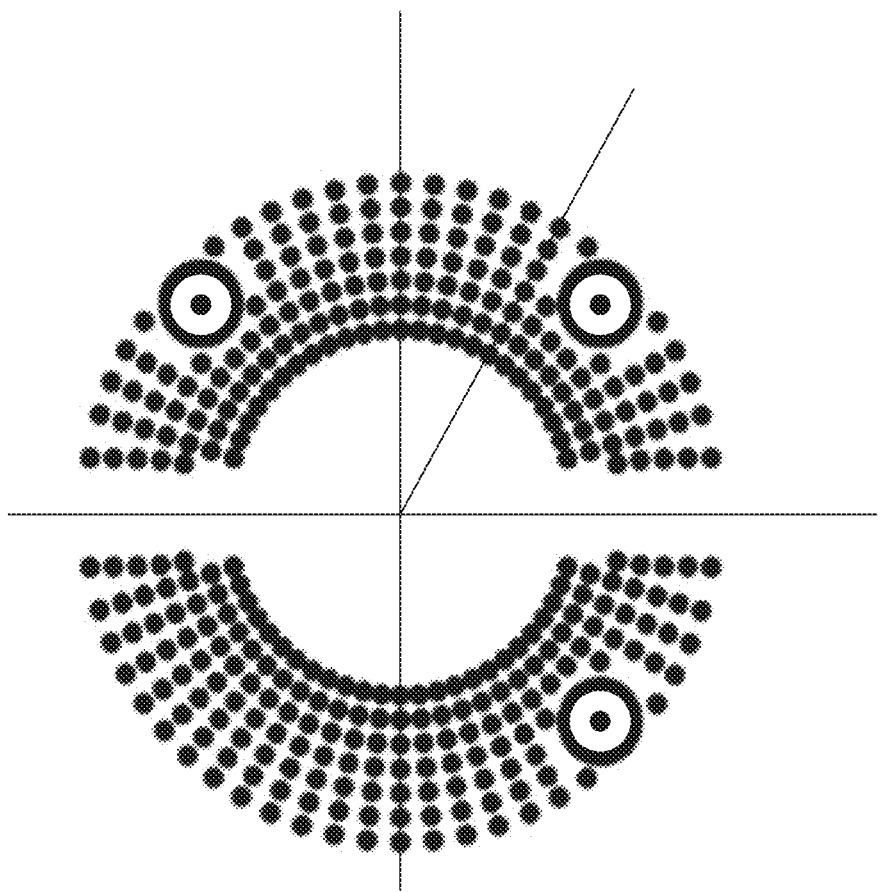
Figure 5H:
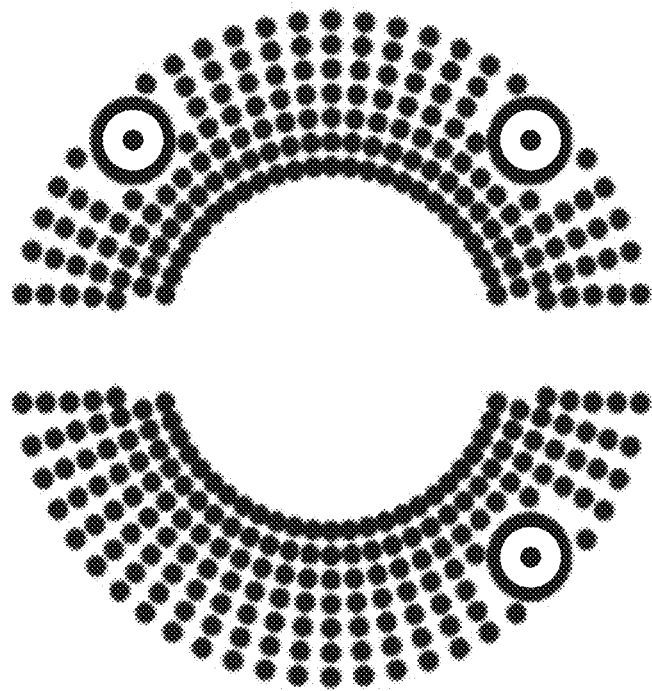

For example, this application further provides a version of a two-dimensional code. As shown in FIG. 5G and FIG. 5H, different from the patterns of the version 1 to the version 6, dot-shaped code elements in FIG. 5G and FIG. 5H are arranged in a radial pattern, and quantities of dot-shaped code elements on all concentric circles are the same. FIG. 5G includes six concentric circles. A ray formed by connecting a center of the two-dimensional code that serves as a start point to a center of any dot-shaped code element may pass through a center of a dot-shaped code element on each of the other five concentric circles. FIG. 5H includes seven concentric circles. Similarly, a ray formed by connecting a center of the two-dimensional code that serves as a start point to a center of any dot-shaped code element may pass through a center of a dot-shaped code element on each of the other six concentric circles.

After determining the target version of the to-be-generated two-dimensional code based on the length of the binary character string, the electronic device 100 may obtain center coordinates of a dot-shaped code element for storing information, radius information of the dot-shaped code element, center coordinates and radius information of an image region, related coordinate information of a locator, and the like in the target version.

Step S105: Allocate the binary character string to each concentric circle region in a code region based on locations of the image region, the code region, and the locator in the target version of the to-be-generated two-dimensional code, to obtain two-dimensional code information.

The electronic device 100 performs ring-based splitting on the binary character string based on the locations of the image region, the code region, and the locator in a structure of the target version of the to-be-generated two-dimensional code, to allocate the binary character string to dot-shaped code elements in concentric circle regions in the code region, to obtain the two-dimensional code information.

Specifically, the binary character string may be split into substrings corresponding to concentric circle regions based on a quantity of concentric circle regions in the code region in the structure of the two-dimensional code and an information capacity (positively correlated with a quantity of dot-shaped code elements) of each concentric circle region, and each substring is allocated to a dot-shaped code element in a corresponding concentric circle region for storage.

The two-dimensional code information includes information correspondingly stored in each dot-shaped code element. For example, a dot-shaped code element at a first location stores first information, and a dot-shaped code element at a second location stores second information, where the first location and the second location indicate center coordinates and radius information of the dot-shaped code elements. For example, the first information may be 1 in the binary character string, and the second information may be 0 in the binary character string.

In some embodiments, the two-dimensional code information may further include a display form corresponding to each dot-shaped code element. For example, the dot-shaped code element storing the first information is correspondingly set to be in a first color, and the dot-shaped code element storing the second information is correspondingly set to be in a second color. For example, the first color may be black, and the second color may be white, a transparent color, or being uncolored.

In some embodiments, the electronic device 100 further splits a substring corresponding to a concentric circle region into two substrings, where the two substrings are correspondingly stored in an upper-half region and a lower-half region of the concentric circle region respectively, or may further split a substring corresponding to a concentric circle region into four substrings, where the four substrings are correspondingly stored in regions in four quadrants of the concentric circle region respectively.

The electronic device 100 fills dot-shaped code elements in concentric circle regions of the two-dimensional code of the target version with the binary character string. A filling direction may be as follows: An innermost concentric circle region is first filled, and then an outer concentric circle region is sequentially filled; or an outermost concentric circle region is first filled, and then an inner concentric circle region is sequentially filled. Alternatively, the filling direction may be a direction from left to right or from top to bottom, or the like. This is not limited in this embodiment of this application.

If there is a reserved region (for example, a reserved region for format information or a reserved region for version information) or a functional module region (for example, a locator region, a calibration module region, or a time module region), a code element at the location is not filled, and only a next idle code element is filled.

Step S106: Select a mask mode and add mask information.

A mask is a policy for changing a value of a code element in the code region of the two-dimensional code according to a specific rule. A purpose of using the mask is to adjust display effect of code elements in the two-dimensional code (for example, avoid a large area of blank or black blocks in the two-dimensional code that affects scanning and recognition), so that a code reader can read information as easily as possible.

The mask mode includes: For example, all even-numbered concentric circle regions in the two-dimensional code are masked. For another example, some dot-shaped code elements in each concentric circle region in the two-dimensional code are masked. The electronic device 100 performs mask superposition on the two-dimensional code information by using the mask mode, to adjust a layout of the two-dimensional code information, so that code elements in the two-dimensional code information are distributed more evenly, and a generated two-dimensional code has more appealing appearance.

Specifically, the performing mask superposition on the two-dimensional code information by using the mask may be implemented by performing an exclusive-OR operation on the binary character string of the two-dimensional code information and the mask.

In some embodiments, the electronic device 100 fills the code region with the two-dimensional code information including the mask information, and the electronic device 100 verifies whether the target version meets a capacity requirement of the to-be-generated two-dimensional code, and if the target version meets the capacity requirement, adds version information.

Step S107: Generate a two-dimensional code based on a drawing algorithm.

In this embodiment of this application, the electronic device 100 may encode the code region of the two-dimensional code in a manner of leaving an unavailable region vacant. After encoding the code region of the two-dimensional code to obtain the two-dimensional code information, the electronic device 100 draws, in the first color based on the two-dimensional code information by using the drawing algorithm, the dot-shaped code element that stores the first information in the code region; and draws, in the second color, the dot-shaped code element that stores second information, to complete drawing of the code region. In addition, the electronic device 100 fills corresponding regions such as an image region and a locator region in the target version, to obtain a complete two-dimensional code image. The unavailable region includes the image region and the locator region in the target version of the two-dimensional code, a blank region in the code region (for example, a blank region with a spacing of 5 between the upper-half region and the lower-half region in FIG. 5A), and the like.

In some embodiments, the electronic device 100 connects dot-shaped code elements that meet a preset condition and draws the dot-shaped code elements into an arc-shaped code element. The preset condition includes: If more than two consecutive adjacent dot-shaped code elements in one concentric circle region all store the first information, the more than two adjacent dot-shaped code elements are connected and drawn into an arc-shaped code element, where the arc-shaped code element is drawn in the first color. Optionally, a part for connecting dot-shaped code elements in the arc-shaped code element is also filled in the first color. This can improve appearance of the two-dimensional code. Similarly, if more than two consecutive adjacent dot-shaped code elements in one concentric circle region all store the second information, the more than two adjacent dot-shaped code elements are connected and drawn into an arc-shaped code element, where the arc-shaped code element is drawn in the second color.

The following separately describes examples of two-dimensional code images generated based on the foregoing six versions of two-dimensional codes.

Figure 6A:
FIG. 6A to FIG. 6F are schematic diagrams of structures of two-dimensional codes generated based on different versions according to an embodiment of this application.

When the target version is the version 1, an example of a generated two-dimensional code is shown in FIG. 6A. FIG. 6A includes four concentric circle regions. Based on the version 1, in the version 1, some dot-shaped code elements are drawn in black, some dot-shaped code elements are drawn in white or a transparent color or are uncolored, and consecutive adjacent dot-shaped code elements are drawn as black dot-shaped code elements and are connected and drawn into an arc-shaped code element.

Figure 6B:
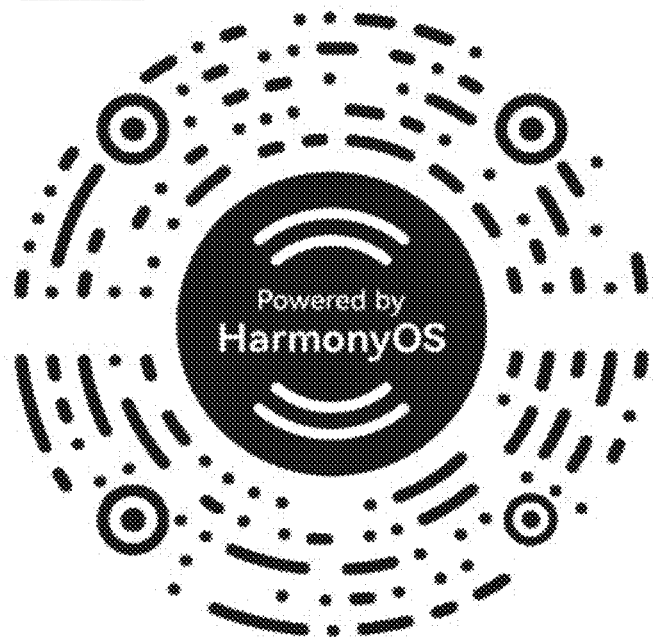

When the target version is the version 2, an example of a generated two-dimensional code is shown in FIG. 6B. FIG. 6B includes five concentric circle regions. Based on the version 2, in the version 2, some dot-shaped code elements are drawn in black, some dot-shaped code elements are drawn in white or a transparent color or are uncolored, and consecutive adjacent dot-shaped code elements are drawn as black dot-shaped code elements and are connected and drawn into an arc-shaped code element.

Figure 6C:
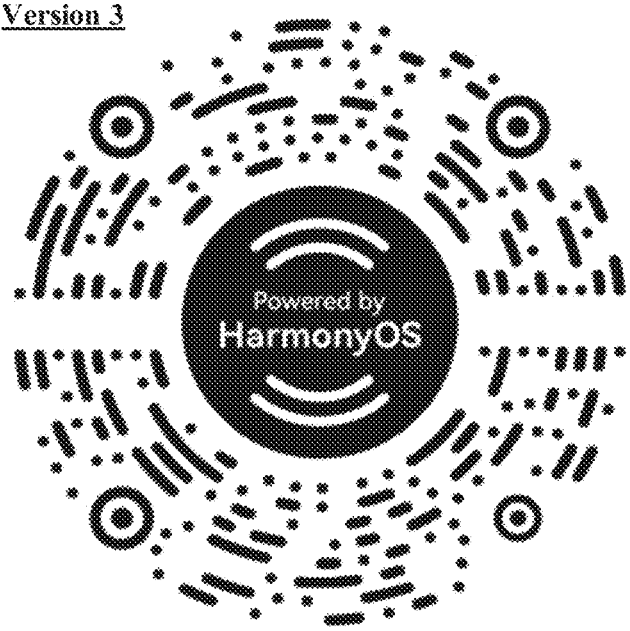

When the target version is the version 3, an example of a generated two-dimensional code is shown in FIG. 6C. FIG. 6C includes eight concentric circle regions. Based on the version 3, in the version 3, some dot-shaped code elements are drawn in black, some dot-shaped code elements are drawn in white or a transparent color or are uncolored, and consecutive adjacent dot-shaped code elements are drawn as black dot-shaped code elements and are connected and drawn into an arc-shaped code element.

Figure 6D:
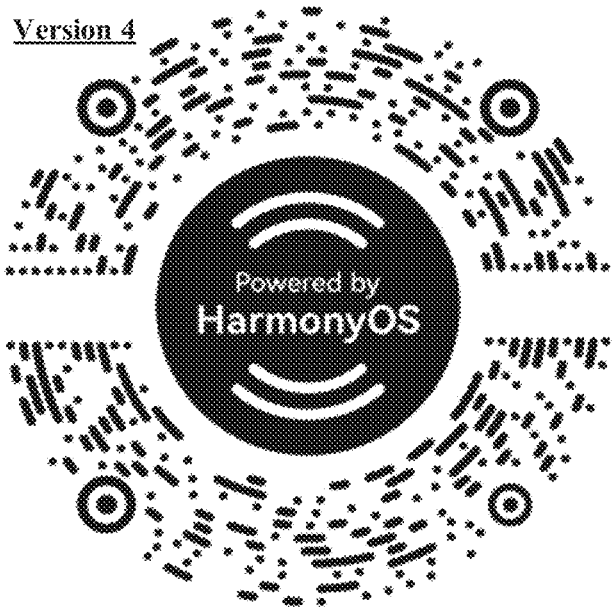

When the target version is the version 4, an example of a generated two-dimensional code is shown in FIG. 6D. FIG. 6D includes 10 concentric circle regions. Based on the version 4, in the version 4, some dot-shaped code elements are drawn in black, some dot-shaped code elements are drawn in white or a transparent color or are uncolored, and consecutive adjacent dot-shaped code elements are drawn as black dot-shaped code elements and are connected and drawn into an arc-shaped code element.

Figure 6E:
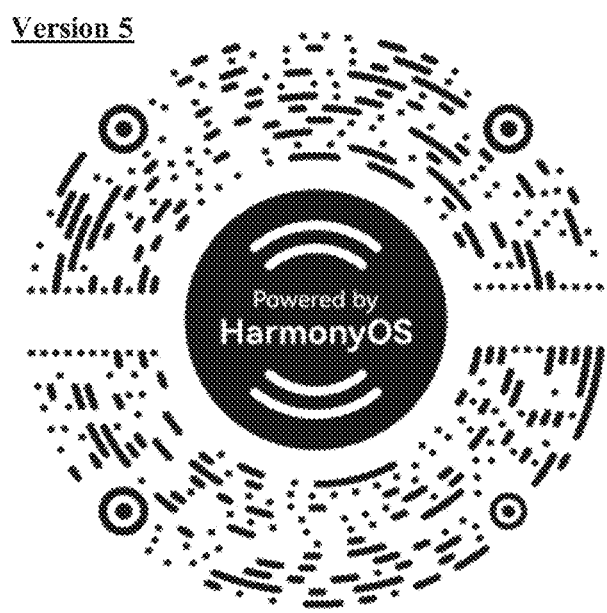

When the target version is the version 5, an example of a generated two-dimensional code is shown in FIG. 6E. FIG. 6E includes 11 concentric circle regions. Based on the version 5, in the version 5, some dot-shaped code elements are drawn in black, some dot-shaped code elements are drawn in white or a transparent color or are uncolored, and consecutive adjacent dot-shaped code elements are drawn as black dot-shaped code elements and are connected and drawn into an arc-shaped code element.

Figure 6F:
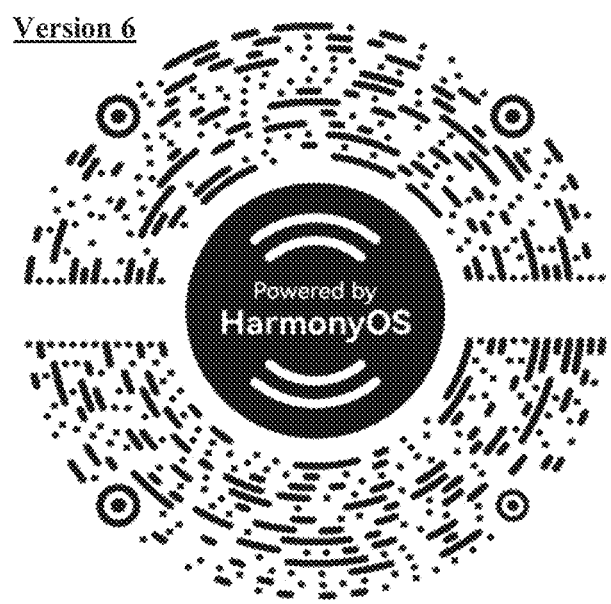

When the target version is the version 6, an example of a generated two-dimensional code is shown in FIG. 6F. FIG. 6F includes 13 concentric circle regions. Based on the version 6, in the version 6, some dot-shaped code elements are drawn in black, some dot-shaped code elements are drawn in white or a transparent color or are uncolored, and consecutive adjacent dot-shaped code elements are drawn as black dot-shaped code elements and are connected and drawn into an arc-shaped code element.

An embodiment of this application provides a method for generating a two-dimensional code. An electronic device 100 binarizes a character string of a to-be-generated two-dimensional code to obtain a corresponding binary character string; determines a target version based on a length of the binary character string, and allocates the binary character string to each concentric circle region in a code region of the target version, to obtain two-dimensional code information; and performs mask superposition on the two-dimensional code information by using a mask, to adjust a layout of the two-dimensional code information, and finally draw a final two-dimensional code. In this way, encoding of a two-dimensional code that complies with a two-dimensional code structure of the target version can be completed, and code elements in the generated two-dimensional code are evenly distributed, with more appealing appearance.

A version of the two-dimensional code provided in this embodiment of this application is a circular two-dimensional code, where a code region includes at least two concentric circle regions, and a code element includes a dot-shaped code element and an arc-shaped code element. In this embodiment of this application, a quantity of circles in a concentric circle region and a quantity of code elements may be increased to increase a data storage capacity of the two-dimensional code. In addition, the electronic device 100 encrypts a character string during encoding, and a complete character string can be obtained during decoding only by using a decryption algorithm corresponding to an encryption algorithm. This improves security of the two-dimensional code.

The following describes a method for drawing a dot-shaped code element in a two-dimensional code according to an embodiment of this application. In step S107, the electronic device 100 draws, in the first color based on the two-dimensional code information by using the drawing algorithm, the dot-shaped code element that stores the first information in the code region. The two-dimensional code information includes information correspondingly stored in each dot-shaped code element. For example, the dot-shaped code element at the first location stores the first information, where the first location indicates center coordinates (cen_x, cen_y) and radius information 0.5h of the dot-shaped code element. The electronic device 100 draws the dot-shaped code element in the first color, and may determine a location and a contour of the dot-shaped code element in the first color based on the center coordinates and the radius information. The drawing algorithm is specifically as follows.

Figure 7A:
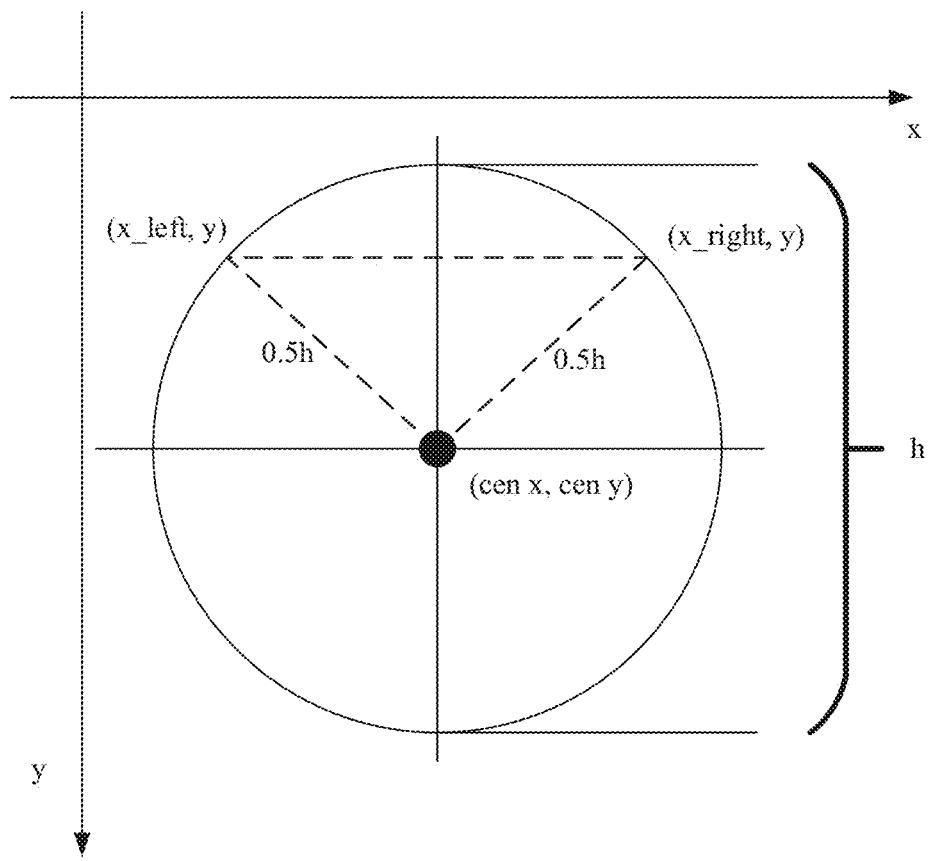
FIG. 7A is a schematic diagram of a structure of a dot-shaped code element according to an embodiment of this application.

As shown in FIG. 7A, it is specified that a horizontal rightward direction is a positive x direction, and a vertical downward direction is a positive y direction. Drawing is performed from top to bottom, a y-axis is used as a variable, and at each location y, x_left and x_right (coordinates of a left boundary and a right boundary) of the location are determined by using an analytic equation for a circle. The electronic device 100 draws, in the first color based on the two-dimensional code information, the dot-shaped code element that stores the first information. The electronic device 100 learns that the center coordinates of the dot-shaped code element are (cen_x, cen_y) and a diameter is h. In this case, a radius is 0.5h.

x_left may be obtained based on an analytic equation for an arc on the left:

$$x\_left = cen\_x - \sqrt{(0.5h)^2 - (cen\_y - y)^2}, (cen\_y - 0.5h \leq y \leq cen\_y + 0.5h) \quad \text{Formula (1)}$$

x_right may be obtained based on an analytic equation for an arc on the right:

$$x\_right = cen\_x + \sqrt{(0.5h)^2 - (cen\_y - y)^2}, (cen\_y - 0.5h \leq y \leq cen\_y + 0.5h) \quad \text{Formula (2)}$$

In some embodiments, the electronic device 100 stores the two-dimensional code information in a 3000-bit array. For example, int32 may be used as a basic unit for data storage. To be specific, 32 bits are used to represent an integer, and x_left and x_right are mapped to corresponding bits in the 32-bit integer, so that image information is stored in a bit stream.

Figure 7B:
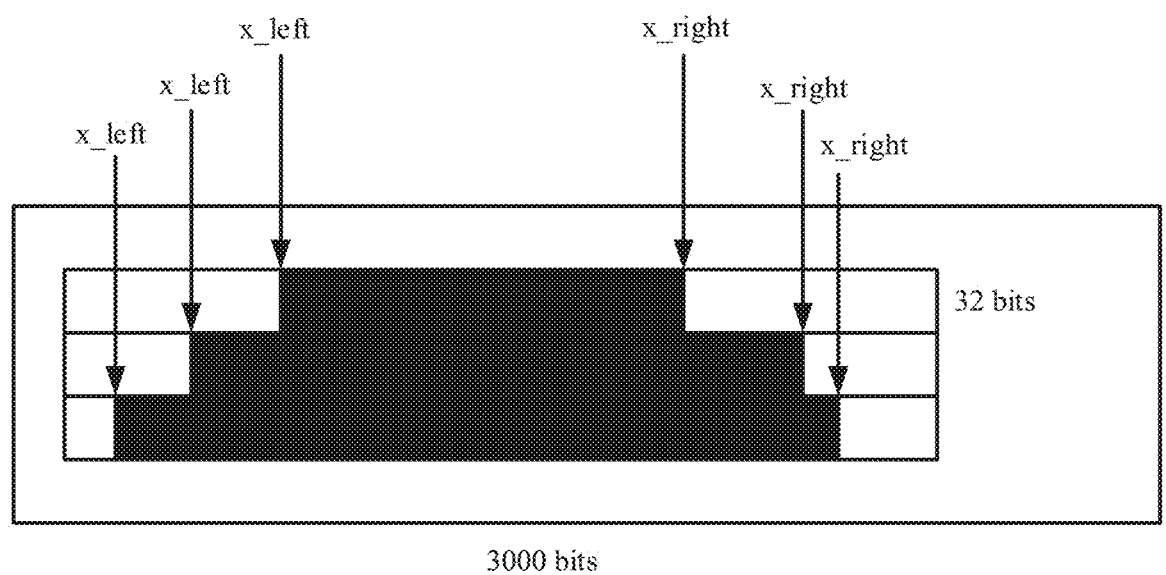
FIG. 7B is a schematic diagram of a manner of storing a data stream for drawing a code element according to an embodiment of this application.

As shown in FIG. 7B, every 32 bits of the array correspond to a group of x_left and x_right. A point beyond x_left and x_right in the 32 bits is set to zero (for example, a white part in FIG. 7B), and a point between x_left and x_right in the 32 bits is set to a non-zero value (for example, a dark part (the first color) in FIG. 7B). In this way, during drawing of the dot-shaped code element, a row of pixels in the first color may be drawn based on each group of x_left and x_right. Drawing is performed from top to bottom, and x_left and x_right may be continuously obtained based on the formula (1) and formula (2), to draw a complete dot-shaped code element in the first color.

In this embodiment of this application, a direction or an order for drawing a code element is not limited. For example, dawning may alternatively be performed from left to right, an x-axis is used as a variable, and at each location x, y_left and y_right (coordinates of an upper boundary and a lower boundary) of the location are determined by using an analytic equation for a circle. For another example, drawing is performed from inside to outside (an innermost concentric circle is first drawn, and then an outer concentric circle is continuously drawn).

The foregoing describes a method for drawing a dot-shaped code element. The following describes a method for drawing an arc-shaped code element according to an embodiment of this application. An arc-shaped code element is formed based on dot-shaped code elements, and two or more dot-shaped code elements are connected through an arc to form an arc-shaped code element. In other words, each arc-shaped code element is formed by connecting two or more dot-shaped code elements. In this embodiment of this application, each arc-shaped code element may be formed by two arcs and two line segments. The two arcs respectively belong to a big circle and a small circle. The big circle and the small circle are concentric circles, and center coordinates of the concentric circles are O1 (org_x, org_y).

Figure 8:
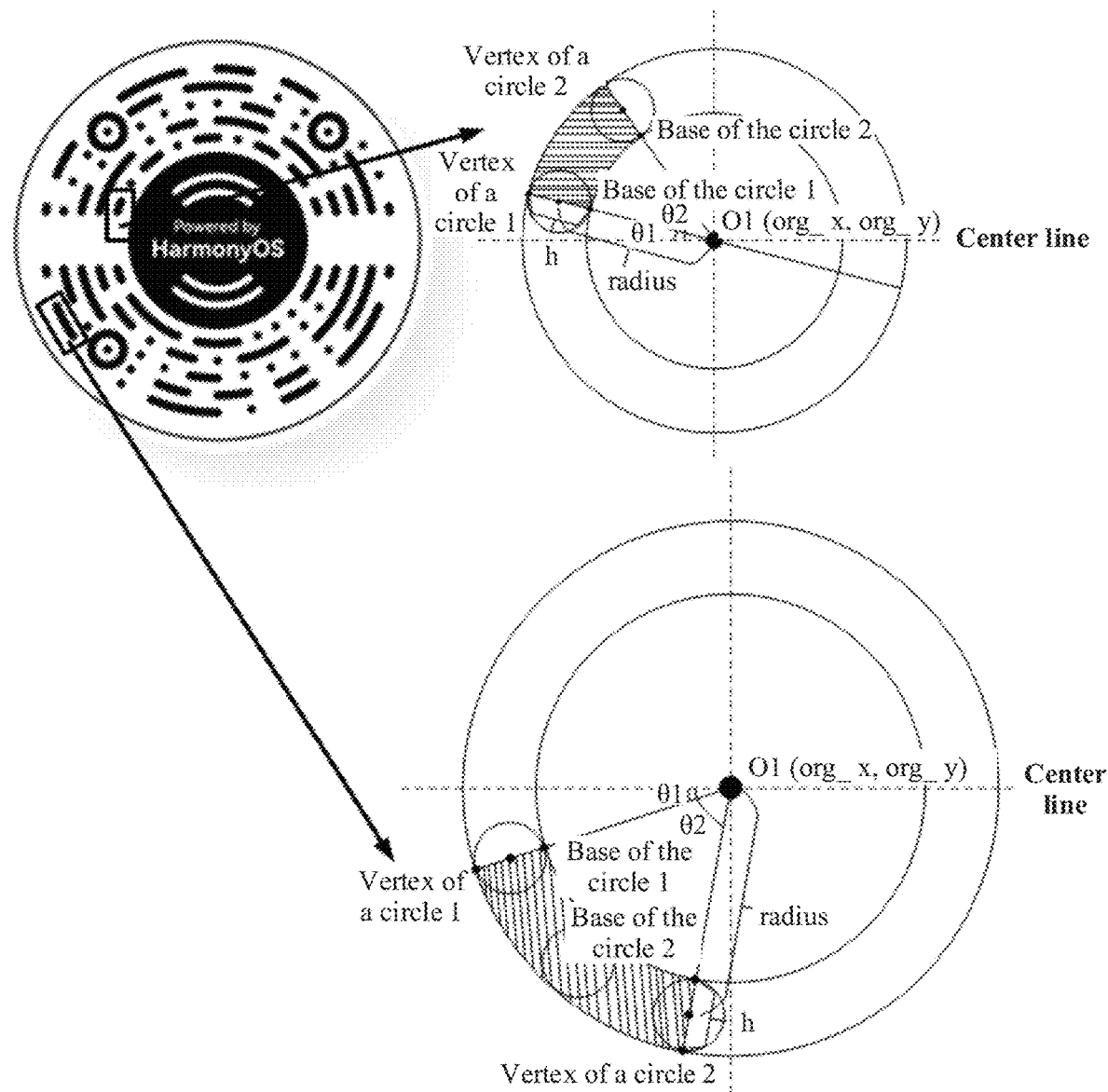
FIG. 8 is a schematic diagram of a structure of an arc-shaped code element according to an embodiment of this application.

FIG. 8 shows an example of structures of two arc-shaped code elements. The electronic device 100 connects dot-shaped code elements that meet a preset condition, and draws the dot-shaped code elements into an arc-shaped code element. In this embodiment of this application, a leftmost dot-shaped code element that forms an arc-shaped code element is referred to as a circle 1, and center coordinates of the circle 1 that are obtained by the electronic device 100 based on the two-dimensional code information are (cen_x1, cen_y1); and a rightmost dot-shaped code element is referred to as a circle 2, and obtained center coordinates of the circle 2 are (cen_x2, cen_y2). h indicates heights of circumscribing squares of the circle 1 and the circle 2 (namely, diameters of the circle 1 and the circle 2), and radius indicates a radius of an arc formed by centers of the circle 1 and the circle 2, where radius may be obtained by calculating a distance between the center coordinates (cen_x1, cen_y1) and O1 (org_x, org_y) of circle 1. $\theta_1$ is an included angle between the x axis and a connection line between centers of the circle 1 and a big circle (a value of $\theta_1$ ranges from 0 to $\pi$). $\theta_2$ is an included angle between the x axis and a connection line between centers of the circle 2 and the big circle (a value of $\theta_2$ ranges from 0 to $\pi$).

In this embodiment of this application, a point that is on the circle 1 and that is farthest away from O1 is referred to as a vertex $(x_{1\_up}, y_{1\_up})$ of the circle 1, a point that is on the circle 1 and that is closest to O1 is referred to as a base $(x_{1\_down}, y_{1\_down})$ of the circle 1, a point that is on the circle 2 and that is farthest away from O1 is referred to as a vertex $(x_{2\_up}, y_{2\_up})$ of the circle 2, and a point that is on the circle 2 and that is closest to O1 is referred to as a base $(x_{2\_down}, y_{2\_down})$ of the circle 2.

For example, coordinates of the vertex and the base of the circle 1 may be calculated as follows:

$$\tan\theta_1 = \frac{y_{1\_up} - cen\_y1}{x_{1\_up} - cen\_x1} = \frac{y_{1\_up} - org\_y}{x_{1\_up} - org\_x},$$

and $$\tan\theta_1 = \frac{cen\_y1 - y_{2\_down}}{cen\_x1 - x_{2\_down}} = \frac{y_{2\_down} - org\_y}{x_{2\_down} - org\_x}$$

Similarly, coordinates of the vertex and the base of the circle 2 may be calculated as follows:

$$\tan\theta_2 = \frac{y_{2\_up} - cen\_y2}{x_{2\_up} - cen\_x2} = \frac{y_{2\_up} - org\_y}{x_{2\_up} - org\_x},$$

and $$\tan\theta_2 = \frac{cen\_y2 - y_{2\_down}}{cen\_x2 - x_{2\_down}} = \frac{y_{2\_down} - org\_y}{x_{2\_down} - org\_x}$$

In some embodiments, it is specified that a horizontal rightward direction is a positive x direction, and a vertical downward direction is a positive y direction. Drawing is performed from top to bottom, a y-axis is used as a variable, and at each location y, x_left and x_right (coordinates of a left boundary and a right boundary) of the location are determined by using an analytic equation for a circle. An arc is drawn from top to bottom. Therefore, different analytic equations for a left boundary and a right boundary need to be considered. Due to different locations of arcs, the arcs have different piecewise analytic equations on an upper left side, a lower left side, an upper right side, and a lower right side of a center line. This is specifically classified into the following eight cases.

Figure 9A:
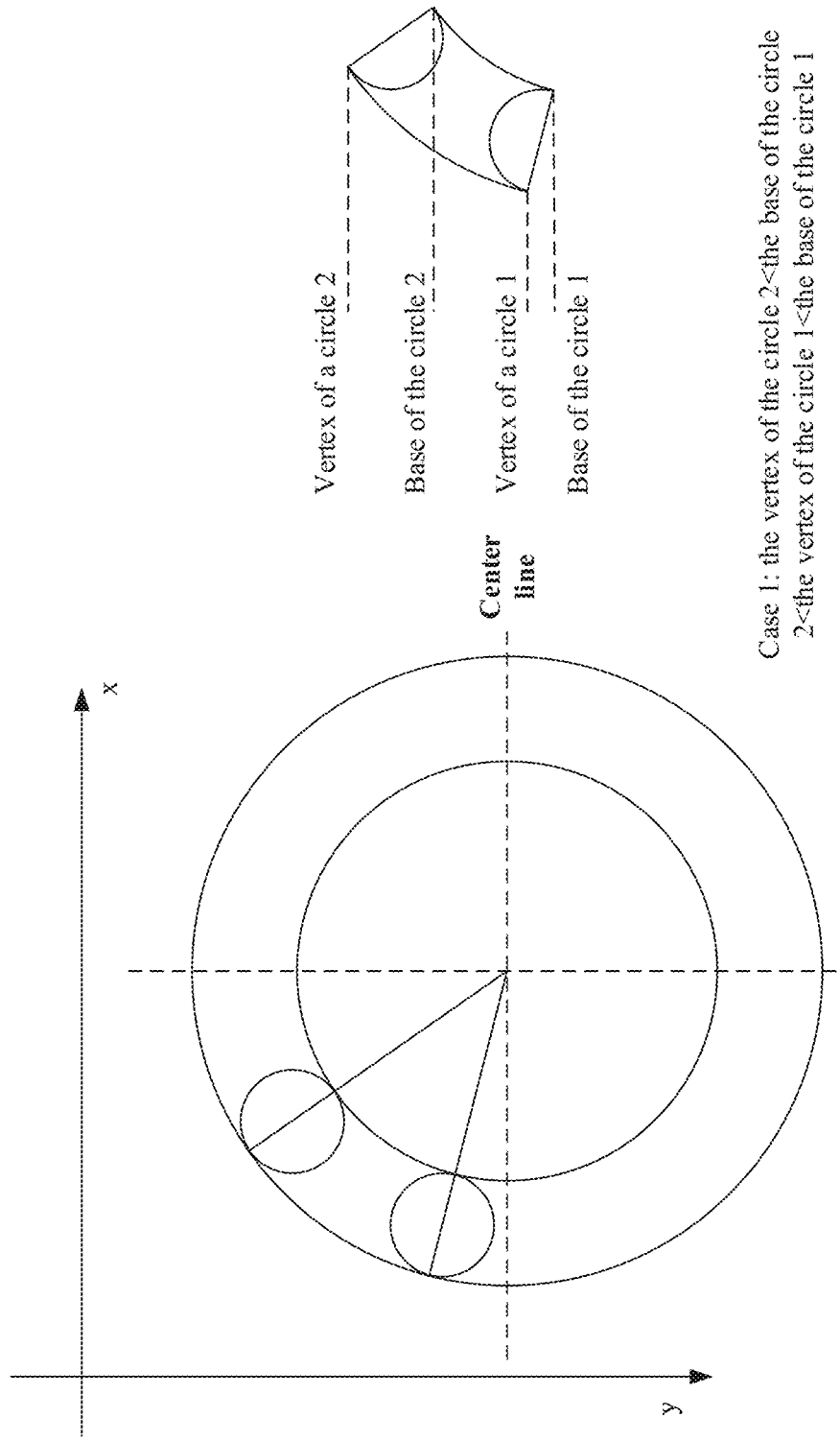
FIG. 9A to FIG. 9H are schematic diagrams of principles of drawing arc-shaped code elements in different cases according to an embodiment of this application.

Case 1: As shown in FIG. 9A, an arc is on an upper left side of a center line, and in a positive direction of a y-axis, a vertex of a circle 2<a base of the circle 2<a vertex of a circle 1<a base of the circle 1, that is, $y_{2\_up} < y_{2\_down} < y_{1\_up} < y_{1\_down}$.

When a value of y is within a range of [the vertex of the circle 2, the base of the circle 2], an arc of a big circle is on the left, and an oblique line of the circle 2 is on the right.

x_left may be obtained based on an analytic equation for the arc of the big circle on the left:

$$x\_left=org_x-\sqrt{(radius+0.5h)^2-(y-org\_y)^2} \quad \text{Formula (3)}$$

x_right may be obtained based on an analytic equation for the oblique line of the circle 2 on the right:

$$y_{len}=(y-y_{2\_up})/\sin(\theta_2)$$

$$x\_right=org_x-(radius+0.5h-y_{len})\times\cos(\theta_2) \quad \text{Formula (4)}$$

When a value of y is within a range of [the base of the circle 2, the vertex of the circle 1], an arc of the big circle is on the left, and an arc of a small circle is on the right. x_left may be obtained based on an analytic equation (same as the formula (3)) for the arc of the big circle on the left:

$$x\_left=org_x-\sqrt{(radius+0.5h)^2-(y-org\_y)^2}$$

x_right may be obtained based on an analytic equation for the arc of the small circle on the right:

$$x\_right=org_x-\sqrt{(radius-0.5h)^2-(y-org\_y)^2} \quad \text{Formula (5)}$$

When a value of y is within a range of [the vertex of the circle 1, the base of the circle 1], an oblique line of the circle 1 is on the left, and an arc of the small circle is on the right. x_left may be obtained based on an analytic equation for the oblique line of the circle 1 on the left:

$$y_{len}=(y-y_{1\_up})/\sin(\theta_1)$$

$$x\_left=org_x-(radius+0.5h-y_{len})\times\cos(\theta_1) \quad \text{Formula (6)}$$

x_right may be obtained based on an analytic equation (same as the formula (5)) for the arc of the small circle on the right:

$$x\_right=org_x-\sqrt{(radius-0.5h)^2-(y-org\_y)^2}$$

In this embodiment of this application, the electronic device 100 may draw the arc shown in FIG. 9A based on the formulas (3), (4), (5), and (6). The electronic device 100 determines, based on the two-dimensional code information, that dot-shaped code elements meeting a preset condition are connected into an arc-shaped code element; determines dot-shaped code elements (a circle 1 and a circle 2) at two ends of an arc-shaped code element; obtains center coordinates of the circle 1 and the circle 2; determines y-axis coordinates of vertexes and bases of the circle 1 and the circle 2; and if a vertex of the circle 2<a base of the circle 2<a vertex of the circle 1<a base of the circle 1 in a y-axis direction, determines that the case 1 is applicable, and determines x_left and x_right based on the analytic equations in the case 1, to draw an arc.

The electronic device 100 maps x_left and x_right to corresponding bits in a 32-bit integer, sets a point beyond x_left and x_right in the 32-bit integer to zero, and sets a point between x_left and x_right in the 32-bit integer to a non-zero value. In this way, during drawing of the arc-shaped code element, a row of pixels may be drawn based on each group of x_left and x_right. Drawing is performed from top to bottom, and x_left and x_right may be continuously obtained based on the formulas (3), (4), (5), and (6), to draw a complete arc-shaped code element.

Figure 9B:
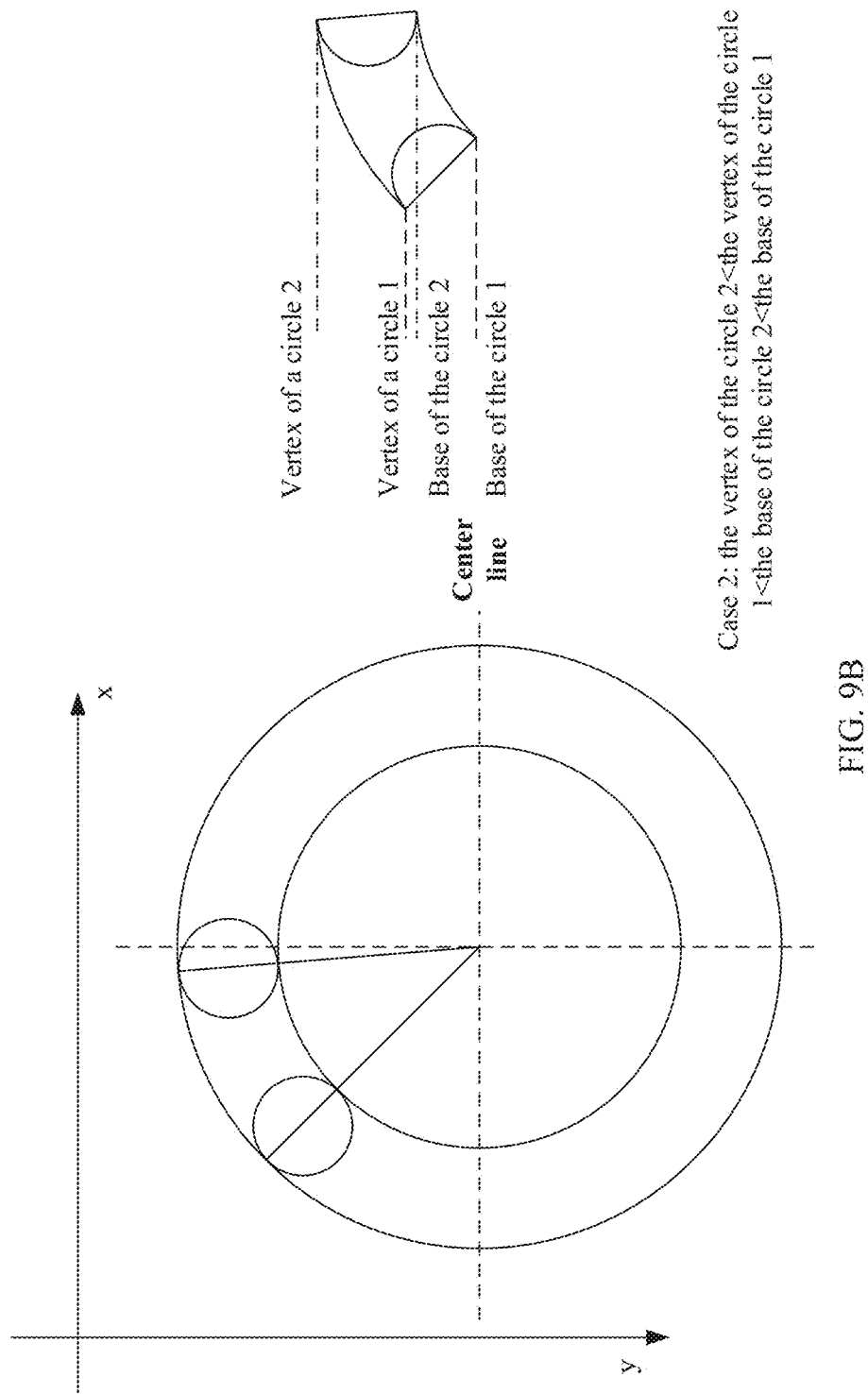

Case 2: As shown in FIG. 9B, an arc is on an upper left side of a center line, and in a y-axis direction, a vertex of a circle 2<a vertex of a circle 1<a base of the circle 2<a base of the circle 1, that is, $y_{2\_up}<y_{1\_up}<y_{2\_down}<y_{1\_down}$.

When a value of y is within a range of [the vertex of the circle 2, the vertex of the circle 1], an arc of a big circle is on the left, and an oblique line of the circle 2 is on the right. x_left may be obtained based on an analytic equation for the arc of the big circle on the left. Refer to the formula (3). x_right may be obtained based on an analytic equation for the oblique line of the circle 2 on the right. Refer to the formula (4).

When a value of y is within a range of [the vertex of the circle 1, the base of the circle 2], an oblique line of the circle 1 is on the left, and an oblique line of the circle 2 is on the right. x_left may be obtained based on an analytic equation for the oblique line of the circle 1 on the left. Refer to the formula (6). x_right may be obtained based on an analytic equation for the oblique line of the circle 2 on the right. Refer to the formula (4).

When a value of y is within a range of [the vertex of the circle 1, the base of the circle 1], an oblique line of the circle 1 is on the left, and an arc of a small circle is on the right. x_left may be obtained based on an analytic equation for the oblique line of the circle 1 on the left. Refer to the formula (6). x_right may be obtained based on an analytic equation for the arc of the small circle on the right. Refer to the formula (5).

Figure 9C:
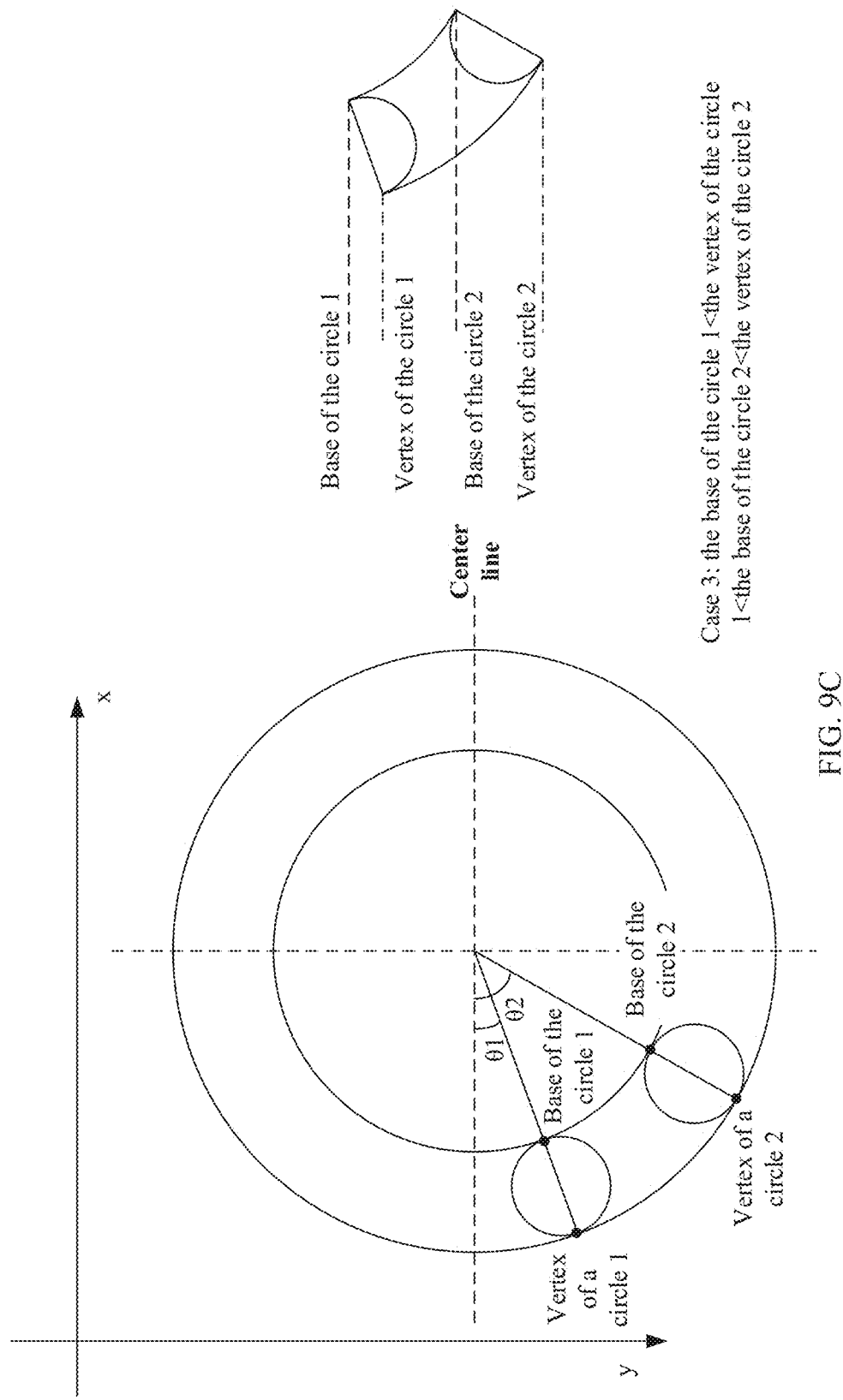

Case 3: As shown in FIG. 9C, an arc is on a lower left side of a center line, and in a y-axis direction, a base of a circle 1<a vertex of the circle 1<a base of a circle 2<a vertex of the circle 2, that is, $y_{1\_down}<y_{1\_up}<y_{2\_down}<y_{2\_up}$.

When a value of y is within a range of [the base of the circle 1, the vertex of the circle 1], an oblique line of the circle 1 is on the left, and an arc of a small circle is on the right. x_left may be obtained based on an analytic equation for the oblique line of the circle 1 on the left. Refer to the formula (6). x_right may be obtained based on an analytic equation for the arc of the small circle on the right. Refer to the formula (5).

When a value of y is within a range of [the vertex of the circle 1, the base of the circle 2], an arc of a big circle is on the left, and an arc of the small circle is on the right. x_left may be obtained based on an analytic equation for the arc of the big circle on the left. Refer to the formula (3). x_right may be obtained based on an analytic equation for the arc of the small circle on the right. Refer to the formula (5).

When a value of y is within a range of [the base of the circle 2, the vertex of the circle 2], an arc of the big circle is on the left, and an oblique line of the circle 2 is on the right. x_left may be obtained based on an analytic equation for the arc of the big circle on the left. Refer to the formula (3). x_right may be obtained based on an analytic equation for the oblique line of the circle 2 on the right. Refer to the formula (4).

Figure 9D:
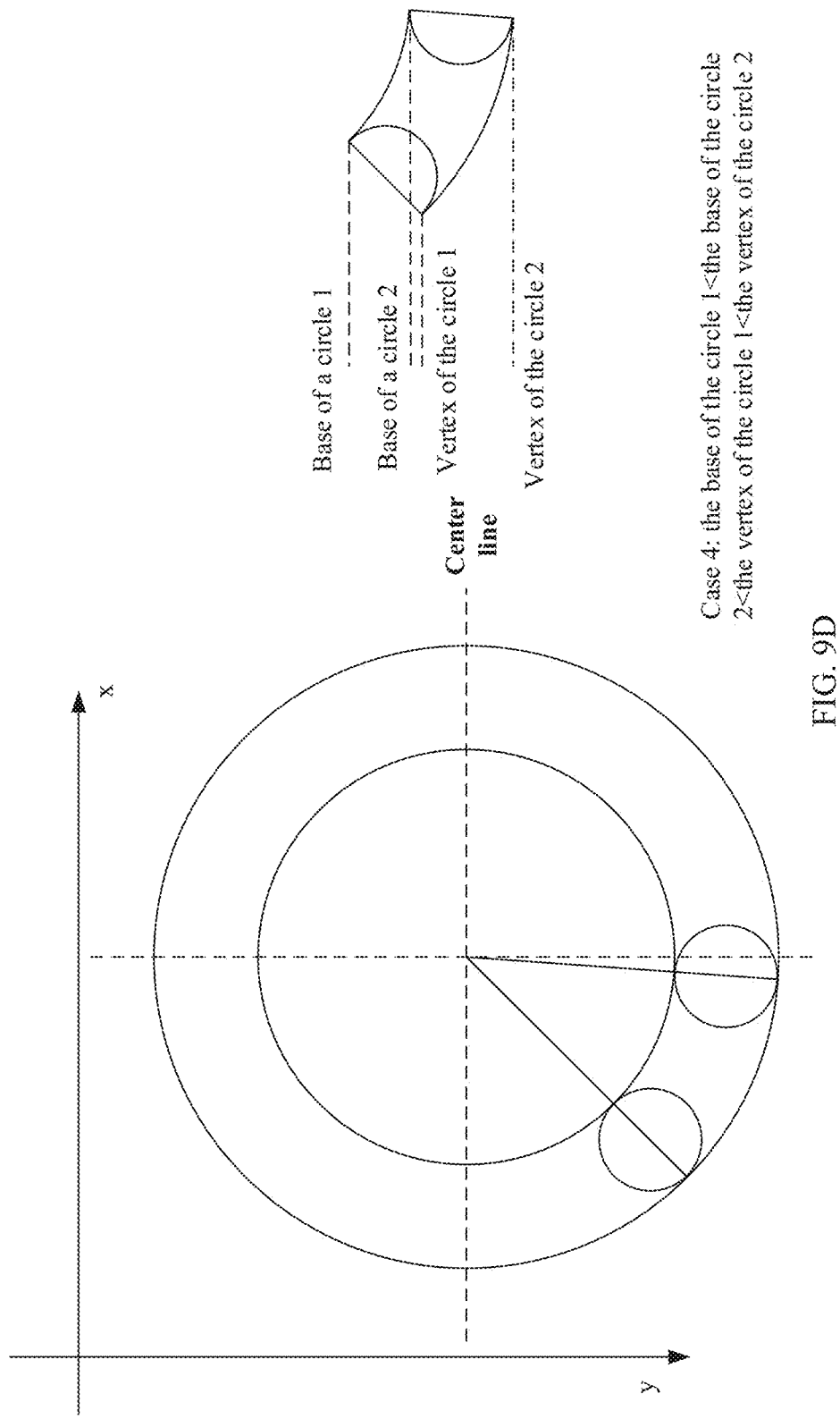

Case 4. As shown in FIG. 9D, an arc is on a lower left side of a center line, and in a y-axis direction, a base of a circle 1<a base of a circle 2<a vertex of the circle 1<a vertex of the circle 2, that is, $y_{1\_down}<y_{2\_down}<y_{1\_up}<y_{2\_up}$.

When a value of y is within a range of [the base of the circle 1, the base of the circle 2], an oblique line of the circle 1 is on the left, and an arc of a small circle is on the right. x_left may be obtained based on an analytic equation for the oblique line of the circle 1 on the left. Refer to the formula (6). x_right may be obtained based on an analytic equation for the arc of the small circle on the right. Refer to the formula (5).

When a value of y is within a range of [the base of the circle 2, the vertex of the circle 1], an oblique line of the circle 1 is on the left, and an oblique line of the circle 2 is on the right. x_left may be obtained based on an analytic equation for the oblique line of the circle 1 on the left. Refer to the formula (6). x_right may be obtained based on an analytic equation for the oblique line of the circle 2 on the right. Refer to the formula (4).

When a value of y is within a range of [the vertex of the circle 1, the vertex of the circle 2], an arc of a big circle is on the left, and an oblique line of the circle 2 is on the right. x_left may be obtained based on an analytic equation for the arc of the big circle on the left. Refer to the formula (3). x_right may be obtained based on an analytic equation for the oblique line of the circle 2 on the right. Refer to the formula (4).

Figure 9E:
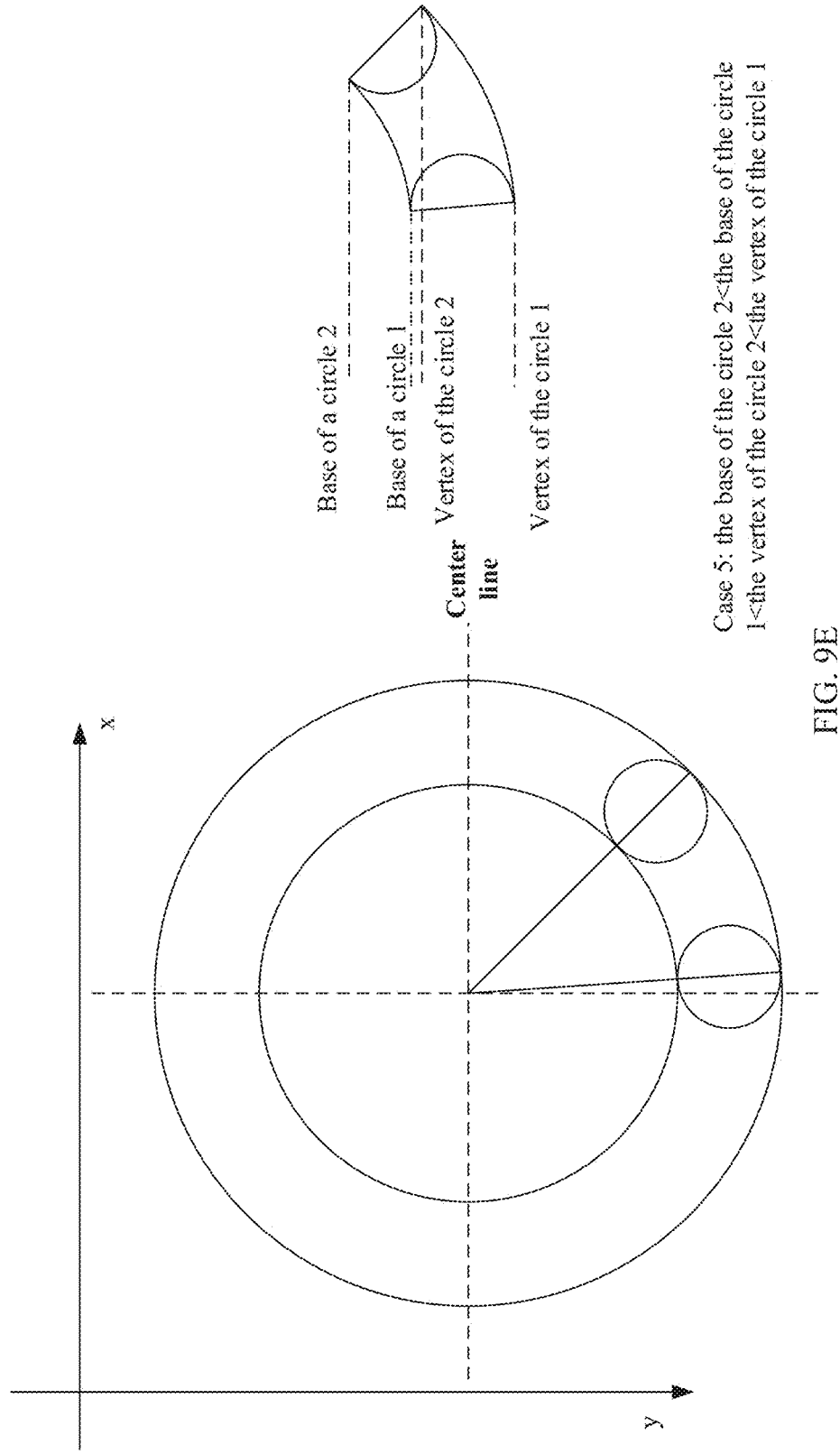

Case 5: As shown in FIG. 9E, an arc is on a lower right side of a center line, and in a y-axis direction, a base of a circle 2<a base of a circle 1<a vertex of the circle 2<a vertex of the circle 1, that is, $y_{2\_down} < y_{1\_down} < y_{2\_up} < y_{1\_up}$.

When a value of y is within a range of [the base of the circle 2, the base of the circle 1], an arc of a small circle is on the left, and an oblique line of the circle 2 is on the right. x_left may be obtained based on an analytic equation for the arc of the small circle on the left. Refer to the formula (5). x_right may be obtained based on an analytic equation for the oblique line of the circle 2 on the right. Refer to the formula (4).

When a value of y is within a range of [the base of the circle 1, the vertex of the circle 2], an oblique line of the circle 1 is on the left, and an oblique line of the circle 2 is on the right. x_left may be obtained based on an analytic equation for the oblique line of the circle 1 on the left. Refer to the formula (6). x_right may be obtained based on an analytic equation for the oblique line of the circle 2 on the right. Refer to the formula (4).

When a value of y is within a range of [the vertex of the circle 2, the vertex of the circle 1], an oblique line of the circle 1 is on the left, and an arc of a big circle is on the right. x_left may be obtained based on an analytic equation for the oblique line of the circle 1 on the left. Refer to the formula (6). x_right may be obtained based on an analytic equation for the arc of the big circle on the right. Refer to the formula (3).

Figure 9F:
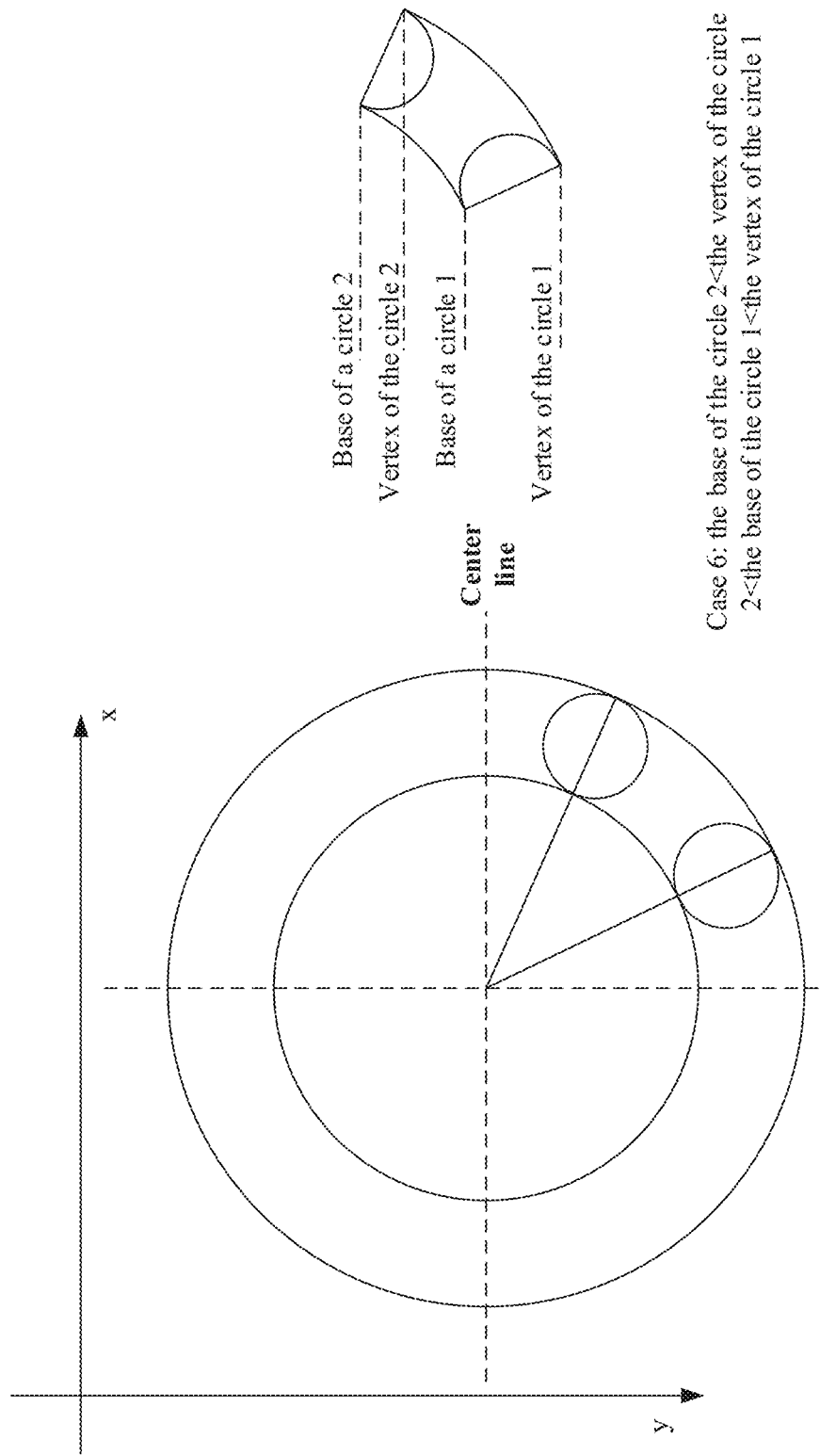

Case 6: As shown in FIG. 9F, an arc is on a lower right side of a center line, and in a y-axis direction, a base of a circle 2<a vertex of the circle 2<a base of a circle 1<a vertex of the circle 1, that is, $y_{1\_down} < y_{2\_down} < y_{1\_up} < y_{2\_up}$.

When a value of y is within a range of [the base of the circle 2, the vertex of the circle 2], an arc of a small circle is on the left, and an oblique line of the circle 2 is on the right. x_left may be obtained based on an analytic equation for the arc of the small circle on the left. Refer to the formula (5). x_right may be obtained based on an analytic equation for the oblique line of the circle 2 on the right. Refer to the formula (4).

When a value of y is within a range of [the vertex of the circle 2, the base of the circle 1], an arc of the small circle is on the left, and an arc of a big circle is on the right. x_left may be obtained based on an analytic equation for the arc of the small circle on the left. Refer to the formula (5). x_right may be obtained based on an analytic equation for the arc of the big circle on the right. Refer to the formula (3).

When a value of y is within a range of [the vertex of the circle 1, the vertex of the circle 2], an oblique line of the circle 1 is on the left, and an arc of the big circle is on the right. x_left may be obtained based on an analytic equation for the oblique line of the circle 1 on the left. Refer to the formula (6). x_right may be obtained based on an analytic equation for the arc of the big circle on the right. Refer to the formula (3).

Figure 9G:
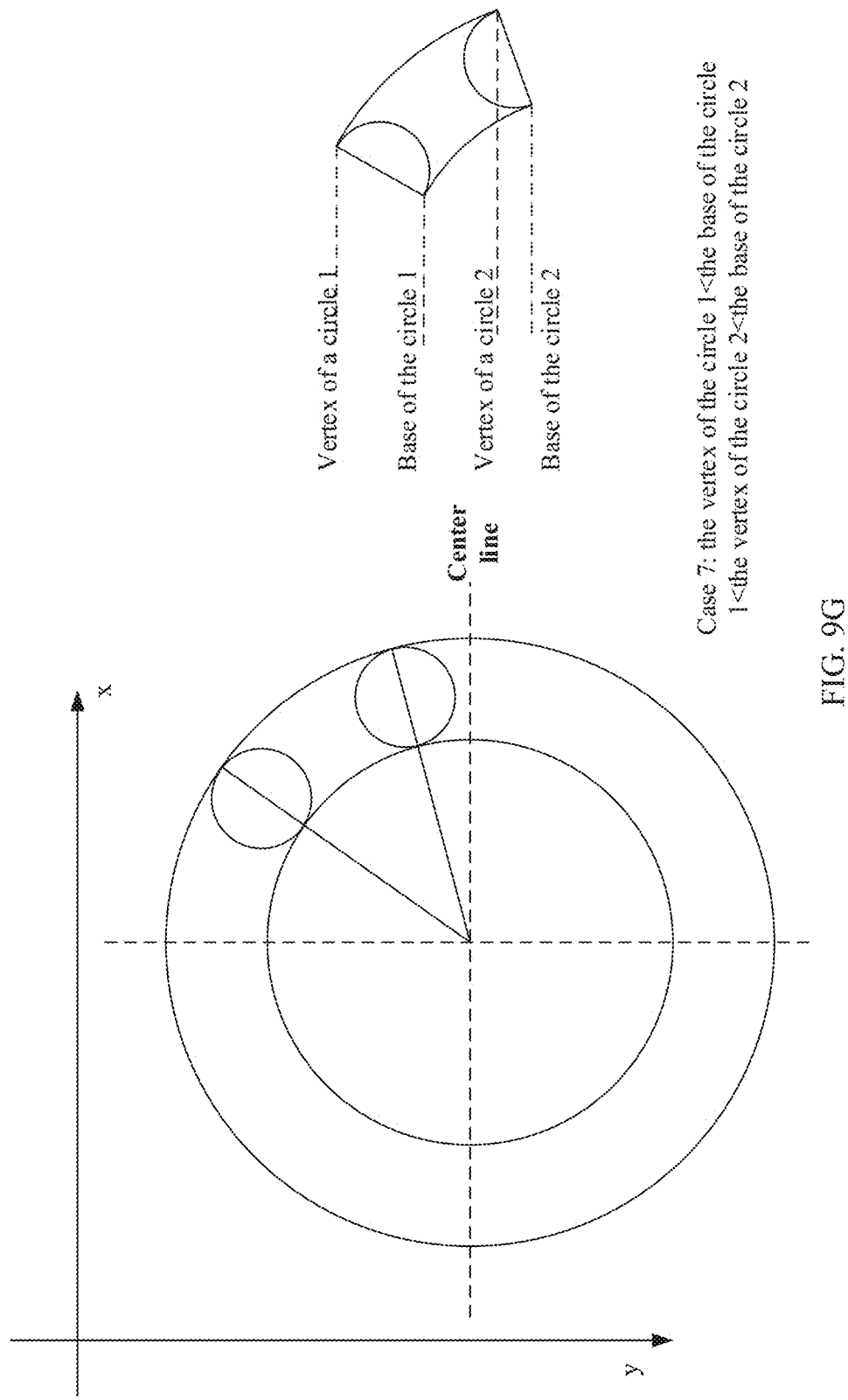

Case 7: As shown in FIG. 9G, an arc is on an upper right side of a center line, and in a y-axis direction, a vertex of a circle 1<a base of the circle 1<a vertex of a circle 2<a base of the circle 2, that is, $y_{1\_up} < y_{1\_down} < y_{2\_up} < y_{2\_down}$.

When a value of y is within a range of [the vertex of the circle 1, the base of the circle 1], an oblique line of the circle 1 is on the left, and an arc of a big circle is on the right. x_left may be obtained based on an analytic equation for the oblique line of the circle 1 on the left. Refer to the formula (6). x_right may be obtained based on an analytic equation for the arc of the big circle on the right. Refer to the formula (3).

When a value of y is within a range of [the base of the circle 1, the vertex of the circle 2], an arc of a small circle is on the left, and an arc of the big circle is on the right. x_left may be obtained based on an analytic equation for the arc of the small circle on the left. Refer to the formula (5). x_right may be obtained based on an analytic equation for the arc of the big circle on the right. Refer to the formula (3).

When a value of y is within a range of [the vertex of the circle 2, the base of the circle 2], an arc of the small circle is on the left, and an oblique line of the circle 2 is on the right. x_left may be obtained based on an analytic equation for the arc of the small circle on the left. Refer to the formula (5). x_right may be obtained based on an analytic equation for the oblique line of the circle 2 on the right. Refer to the formula (4).

Figure 9H:
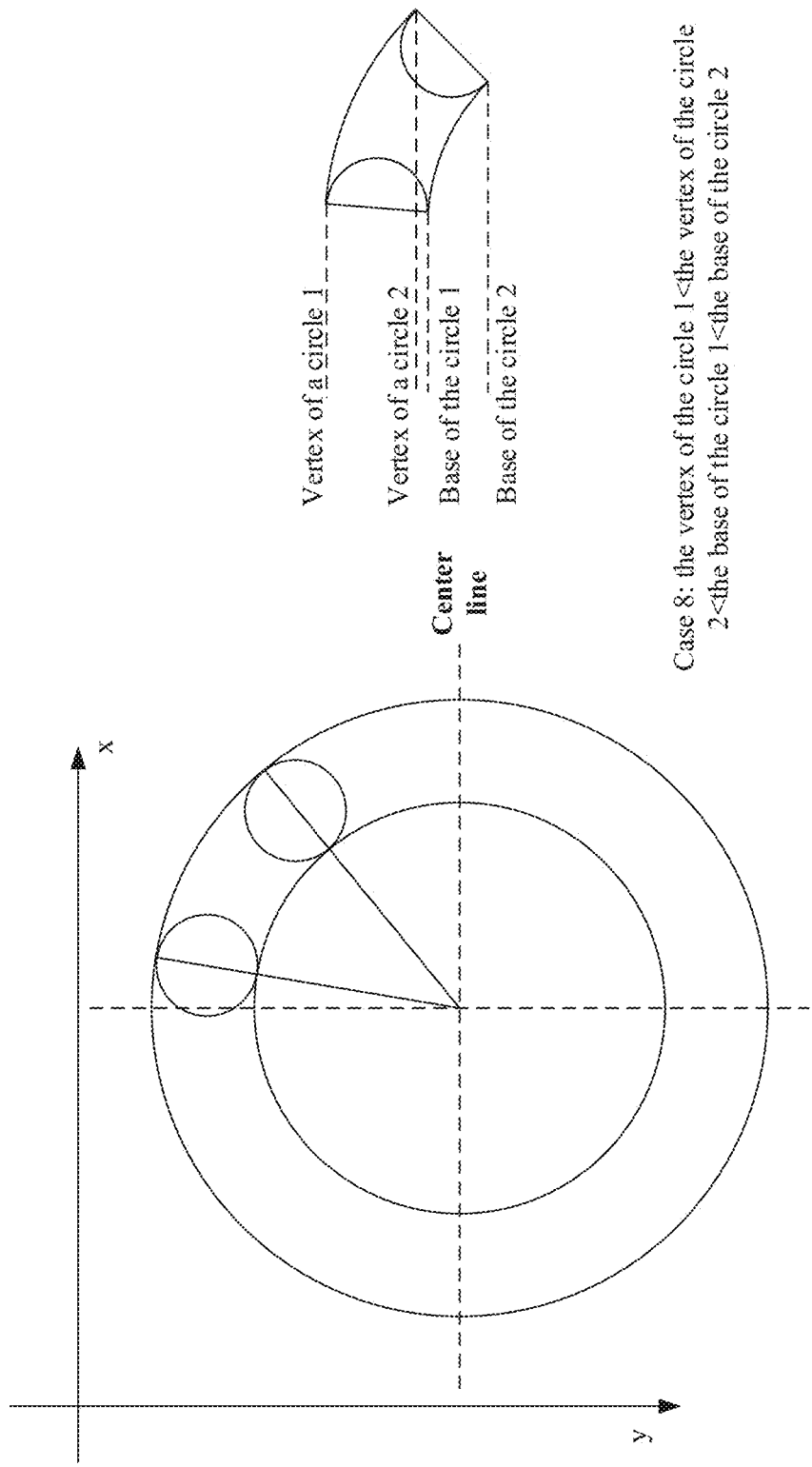

Case 8: As shown in FIG. 9H, an arc is on an upper right side of a center line, and in a y-axis direction, a vertex of a circle 1<a vertex of a circle 2<a base of the circle 1<a base of the circle 2, that is, $y_{1\_up} < y_{2\_up} < y_{1\_down} < y_{2\_down}$.

When a value of y is within a range of [the vertex of the circle 1, the vertex of the circle 2], an oblique line of the circle 1 is on the left, and an arc of a big circle is on the right. x_left may be obtained based on an analytic equation for the oblique line of the circle 1 on the left. Refer to the formula (6). x_right may be obtained based on an analytic equation for the arc of the big circle on the right. Refer to the formula (3).

When a value of y is within a range of [the vertex of the circle 2, the base of the circle 1], an oblique line of the circle 1 is on the left, and an oblique line of the circle 2 is on the right. x_left may be obtained based on an analytic equation for the oblique line of the circle 1 on the left. Refer to the formula (6). x_right may be obtained based on an analytic equation for the oblique line of the circle 2 on the right. Refer to the formula (4).

When a value of y is within a range of [the base of the circle 1, the base of the circle 2], an arc of a small circle is on the left, and an oblique line of the circle 2 is on the right. x_left may be obtained based on an analytic equation for the arc of the small circle on the left. Refer to the formula (5). x_right may be obtained based on an analytic equation for the oblique line of the circle 2 on the right. Refer to the formula (4).

The foregoing describes eight manners of drawing arc-shaped code elements at different locations.

In some embodiments, an arc-shaped code element may be divided by a center line (a straight line that passes through a point O1 and that is perpendicular to a y-axis direction), and the arc-shaped code element is distributed in a second quadrant and a third quadrant, or the arc-shaped code element is distributed in a first quadrant and a fourth quadrant. This may correspond to one of the foregoing case 1 to case 8.

In some embodiments, an arc-shaped code element may be divided by a center line (a straight line that passes through a point O1 and that is perpendicular to an x-axis direction), and the arc-shaped code element is on two sides of the center line. To be specific, the arc-shaped code element is distributed in a first quadrant and a second quadrant, or is distributed in a third quadrant and a fourth quadrant. In this case, analytic equations from top to bottom may be completely different. To avoid complexity of a generated two-dimensional code, in this embodiment of this application, an arc-shaped code element is divided into two parts by using a center line as a boundary. An arc-shaped code element on the left of the center line is first drawn, and then an arc-shaped code element on the right of the center line is drawn. This is converted into a case in which an arc-shaped code element is on a same side of a center line.

In some embodiments, a manner of determining whether an arc-shaped code element is divided by a center line may be as follows: It is determined that the arc is divided by the center line if a horizontal coordinate of a center of a big circle is included between a horizontal coordinate of a center of a circle 1 in the arc-shaped code element and a horizontal coordinate of a center of a circle 2 in the arc-shaped code element, that is, the following condition is met: the horizontal coordinate of the center of the circle 1<org_y<the horizontal coordinate of the center of the circle 2.

The following describes in detail eight cases in which an arc is divided by a center line.

Figure 10A:
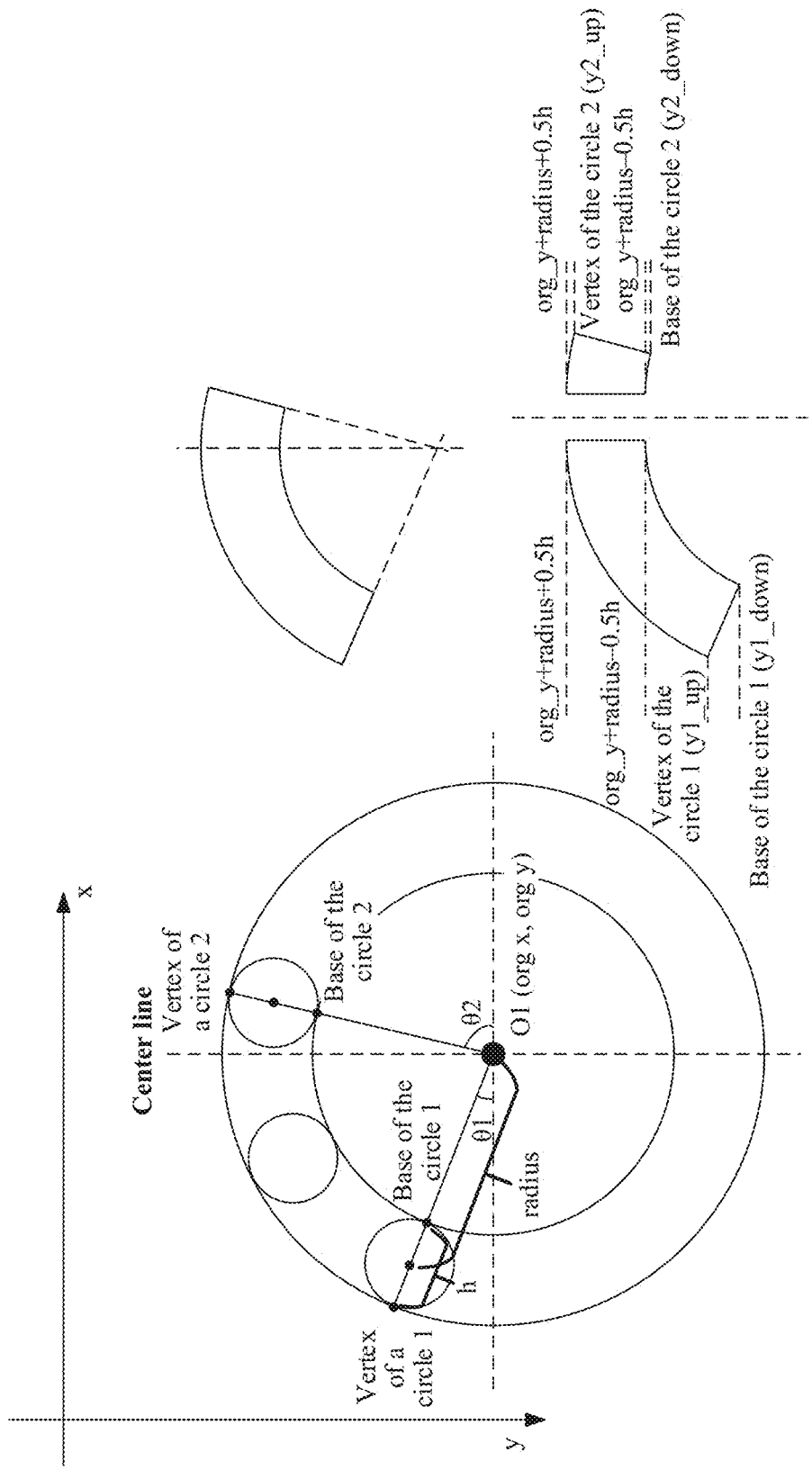
FIG. 10A to FIG. 10H are schematic diagrams of principles of drawing arc-shaped code elements in different cases according to an embodiment of this application.

Case 9: As shown in FIG. 10A, an arc is on an upper left side and an upper right side of a center line, and the center line divides the arc into two arc parts: a left arc part and a right arc part.

For the left arc part, in a y-axis direction, (org_y+radius+0.5h)<(org_y+radius−0.5h)<a vertex of a circle 1<a base of the circle 1, that is, (org_y+radius+0.5h)<(org_y+radius−0.5h)<$y_{1\_up}$<$y_{1\_down}$.

In a first part, when a value of y is within a range of [(org_y+radius+0.5h), (org_y+radius−0.5h)], a curve is an arc of a big circle. x_left may be obtained based on an analytic equation for the arc of the big circle. Refer to the formula (3). x_right is a horizontal coordinate of a center of the big circle, namely, a horizontal coordinate org_x of O1.

In a second part, when a value of y is within a range of [(org_y+radius−0.5h), $y_{1\_up}$], an arc of the big circle is on the left, and an arc of a small circle is on the right. x_left may be obtained based on an analytic equation for the arc of the big circle on the left. Refer to the formula (3). x_right may be obtained based on a recognition equation for the arc of the small circle on the right. Refer to the formula (5).

In a third part, when a value of y is within a range of [$y_{1\_up}$, $y_{1\_down}$], an oblique line of the circle 1 is on the left, and an arc of the small circle is on the right. x_left may be obtained based on an analytic equation for the oblique line of the circle 1 on the left. Refer to the formula (6). x_right may be obtained based on an analytic equation for the arc of the small circle on the right. Refer to the formula (5).

For the right arc part, in the y-axis direction, (org_y+radius+0.5h)<a vertex of a circle 2<(org_y+radius−0.5h)<a base of the circle 2, that is, (org_y+radius+0.5h)<$y_{2\_up}$<(org_y+radius−0.5h)<$y_{2\_down}$.

In a fourth part, when a value of y is within a range of [(org_y+radius+0.5h), $y_{2\_up}$], a curve is an arc of the big circle. x_left is the horizontal coordinate of the center of the big circle, namely, the horizontal coordinate org_x of O1. x_right may be obtained based on an analytic equation for the arc of the big circle. Refer to the formula (3).

In a fifth part, when a value of y is within a range of [$y_{2\_up}$, (org_y+radius−0.5h)], a curve is an oblique line of the circle 2. x_left is the horizontal coordinate of the center of the big circle, namely, the horizontal coordinate org_x of O1. x_right may be obtained based on an analytic equation for the oblique line of the circle 2. Refer to the formula (4).

In a sixth part, when a value of y is within a range of [(org_y+radius−0.5h), $y_{2\_down}$], an arc of the small circle is on the left, and an oblique line of the circle 2 is on the right. x_left may be obtained based on an analytic equation for the arc of the small circle on the left. Refer to the formula (5). x_right may be obtained based on an analytic equation for the oblique line of the circle 2 on the right. Refer to the formula (4).

Figure 10B:
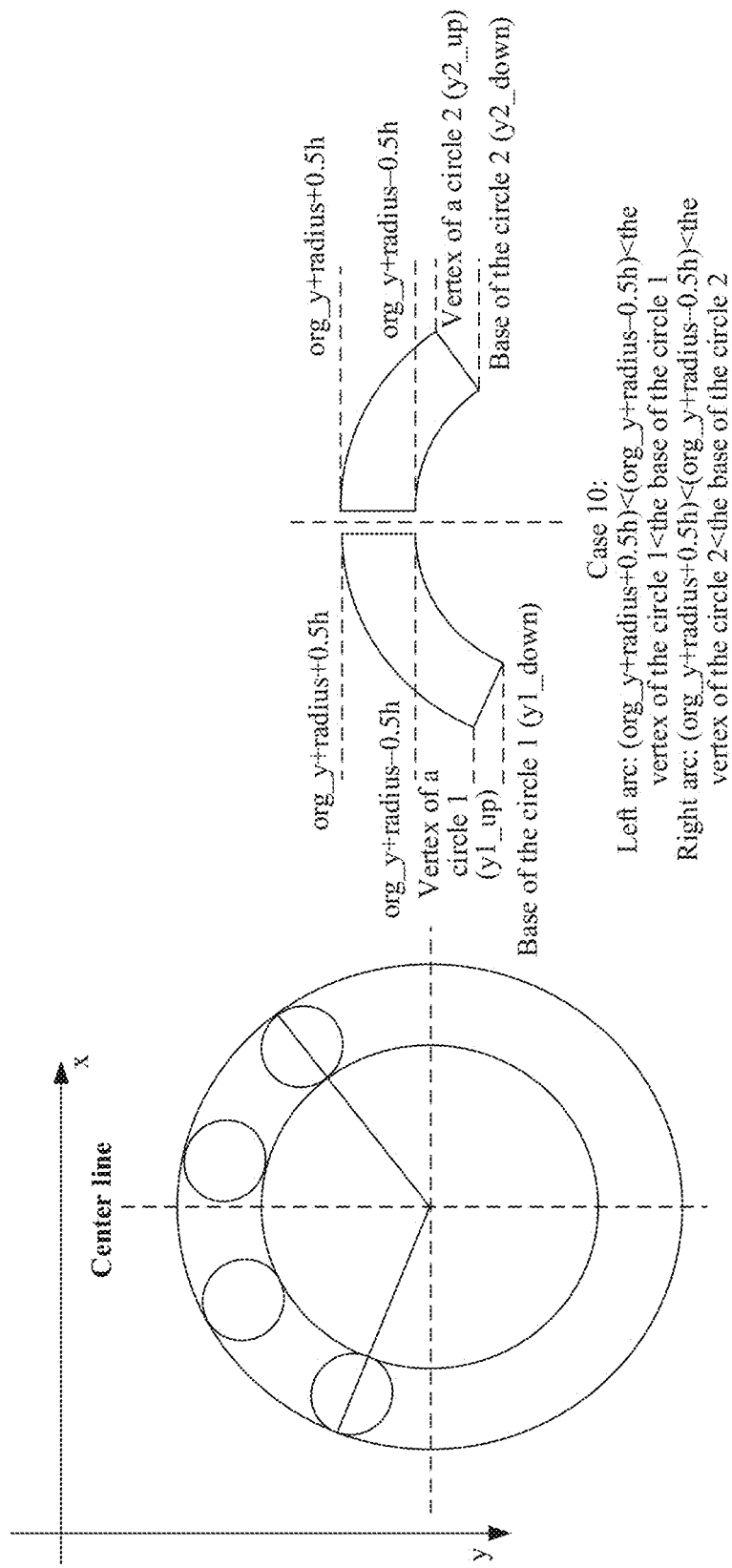

Case 10: As shown in FIG. 10B, an arc is on an upper left side and an upper right side of a center line, and the center line divides the arc into two arc parts: a left arc part and a right arc part.

For the left arc part, in a y-axis direction, (org_y+radius+0.5h)<(org_y+radius−0.5h)<a vertex of a circle 1<a base of the circle 1, that is, (org_y+radius+0.5h)<(org_y+radius−0.5h)<$y_{1\_up}$<$y_{1\_down}$.

In a first part, when a value of y is within a range of [(org_y+radius+0.5h), (org_y+radius−0.5h)], a curve is an arc of a big circle. x_left may be obtained based on an analytic equation for the arc of the big circle. Refer to the formula (3). x_right is a horizontal coordinate of a center of the big circle, namely, a horizontal coordinate org_x of O1.

In a second part, when a value of y is within a range of [(org_y+radius−0.5h), $y_{1\_up}$], an arc of the big circle is on the left, and an arc of a small circle is on the right. x_left may be obtained based on an analytic equation for the arc of the big circle on the left. Refer to the formula (3). x_right may be obtained based on an analytic equation for the arc of the small circle on the right. Refer to the formula (5).

In a third part, when a value of y is within a range of [$y_{1\_up}$, $y_{1\_down}$], an oblique line of the circle 1 is on the left, and an arc of the small circle is on the right. x_left may be obtained based on an analytic equation for the oblique line of the circle 1 on the left. Refer to the formula (6). x_right may be obtained based on an analytic equation for the arc of the small circle on the right. Refer to the formula (5).

For the right arc part, in the y-axis direction, (org_y+radius+0.5h)<(org_y+radius−0.5h)<a vertex of a circle 2<a base of the circle 2, that is, (org_y+radius+0.5h)<(org_y+radius−0.5h)<$y_{2\_up}$<$y_{2\_down}$.

In a fourth part, when a value of y is within a range of [(org_y+radius+0.5h), (org_y+radius−0.5h)], a curve is an arc of the big circle. x_left is the horizontal coordinate of the center of the big circle, namely, the horizontal coordinate org_x of O1. x_right may be obtained based on an analytic equation for the arc of the big circle. Refer to the formula (3).

In a fifth part, when a value of y is within a range of [(org_y+radius−0.5h), $y_{2\_up}$], an arc of the small circle is on the left, and an arc of the big circle is on the right. x_left may be obtained based on an analytic equation for the arc of the small circle on the left. Refer to the formula (5). x_right may be obtained based on an analytic equation for the arc of the big circle on the right. Refer to the formula (3).

In a sixth part, when a value of y is within a range of [$y_{2\_up}$, $y_{2\_down}$], an arc of the small circle is on the left, and an oblique line of the circle 2 is on the right. x_left may be obtained based on an analytic equation for the arc of the small circle on the left. Refer to the formula (5). x_right may be obtained based on an analytic equation for the oblique line of the circle 2 on the right. Refer to the formula (4).

Figure 10C:
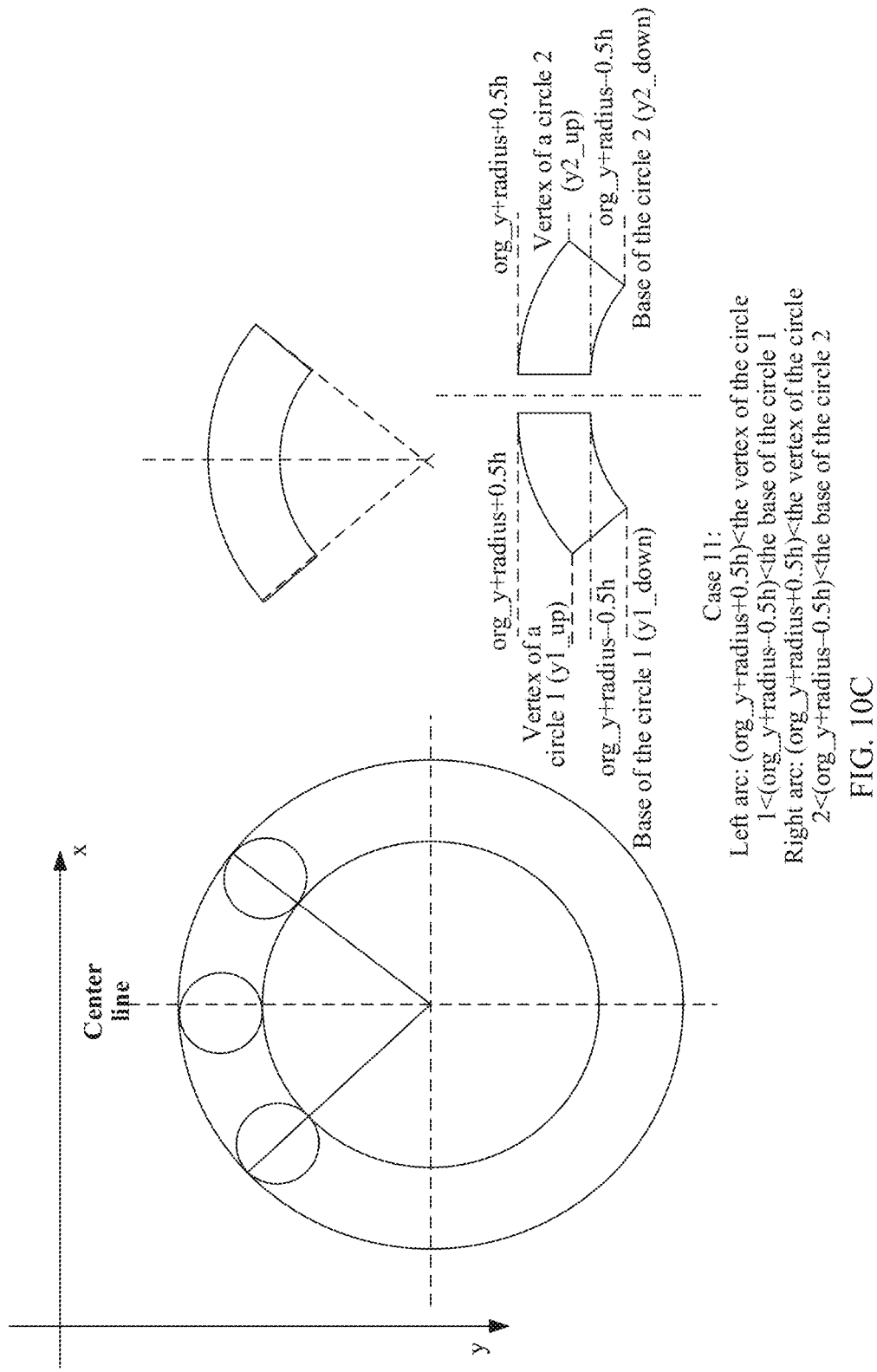

Case 11: As shown in FIG. 10C, an arc is on an upper left side and an upper right side of a center line, and the center line divides the arc into two arc parts: a left arc part and a right arc part.

For the left arc part, in a y-axis direction, (org_y+radius+0.5h)<a vertex of a circle 1<(org_y+radius−0.5h)<a base of the circle 1, that is, (org_y+radius+0.5h)<$y_{1\_up}$<(org_y+radius−0.5h)<$y_{1\_down}$.

In a first part, when a value of y is within a range of [(org_y+radius+0.5h), $y_{1\_up}$], a curve is an arc of a big circle. x_left may be obtained based on an analytic equation for the arc of the big circle. Refer to the formula (3). x_right is a horizontal coordinate of a center of the big circle, namely, a horizontal coordinate org_x of O1.

In a second part, when a value of y is within a range of [$y_{1\_up}$, (org_y+radius−0.5h)], a curve is an oblique line of the circle 1. x_left may be obtained based on an analytic equation for the oblique line of the circle 1. Refer to the formula (6). x_right is the horizontal coordinate of the center of the big circle, namely, the horizontal coordinate org_x of O1.

In a third part, when a value of y is within a range of [(org_y+radius−0.5h), $y_{1\_down}$], an oblique line of the circle 1 is on the left, and an arc of a small circle is on the right. x_left may be obtained based on an analytic equation for the oblique line of the circle 1 on the left. Refer to the formula (6). x_right may be obtained based on an analytic equation for the arc of the small circle on the right. Refer to the formula (5).

For the right arc part, in the y-axis direction, (org_y+radius+0.5h)<a vertex of a circle 2<(org_y+radius−0.5h)<a base of the circle 2, that is, (org_y+radius+0.5h)<$y_{2\_up}$<(org_y+radius−0.5h)<$y_{2\_down}$.

In a fourth part, when a value of y is within a range of [(org_y+radius+0.5h), $y_{2\_up}$], a curve is an arc of the big circle. x_left is the horizontal coordinate of the center of the big circle, namely, the horizontal coordinate org_x of O1. x_right may be obtained based on an analytic equation for the arc of the big circle. Refer to the formula (3).

In a fifth part, when a value of y is within a range of [$y_{2\_up}$, (org_y+radius−0.5h)], a curve is an oblique line of the circle 2. x_left is the horizontal coordinate of the center of the big circle, namely, the horizontal coordinate org_x of O1. x_right may be obtained based on an analytic equation for the oblique line of the circle 2. Refer to the formula (4).

In a sixth part, when a value of y is within a range of [(org_y+radius−0.5h), $y_{2\_down}$], an arc of the small circle is on the left, and an oblique line of the circle 2 is on the right. x_left may be obtained based on an analytic equation for the arc of the small circle on the left. Refer to the formula (5). x_right may be obtained based on an analytic equation for the oblique line of the circle 2 on the right. Refer to the formula (4).

Figure 10D:
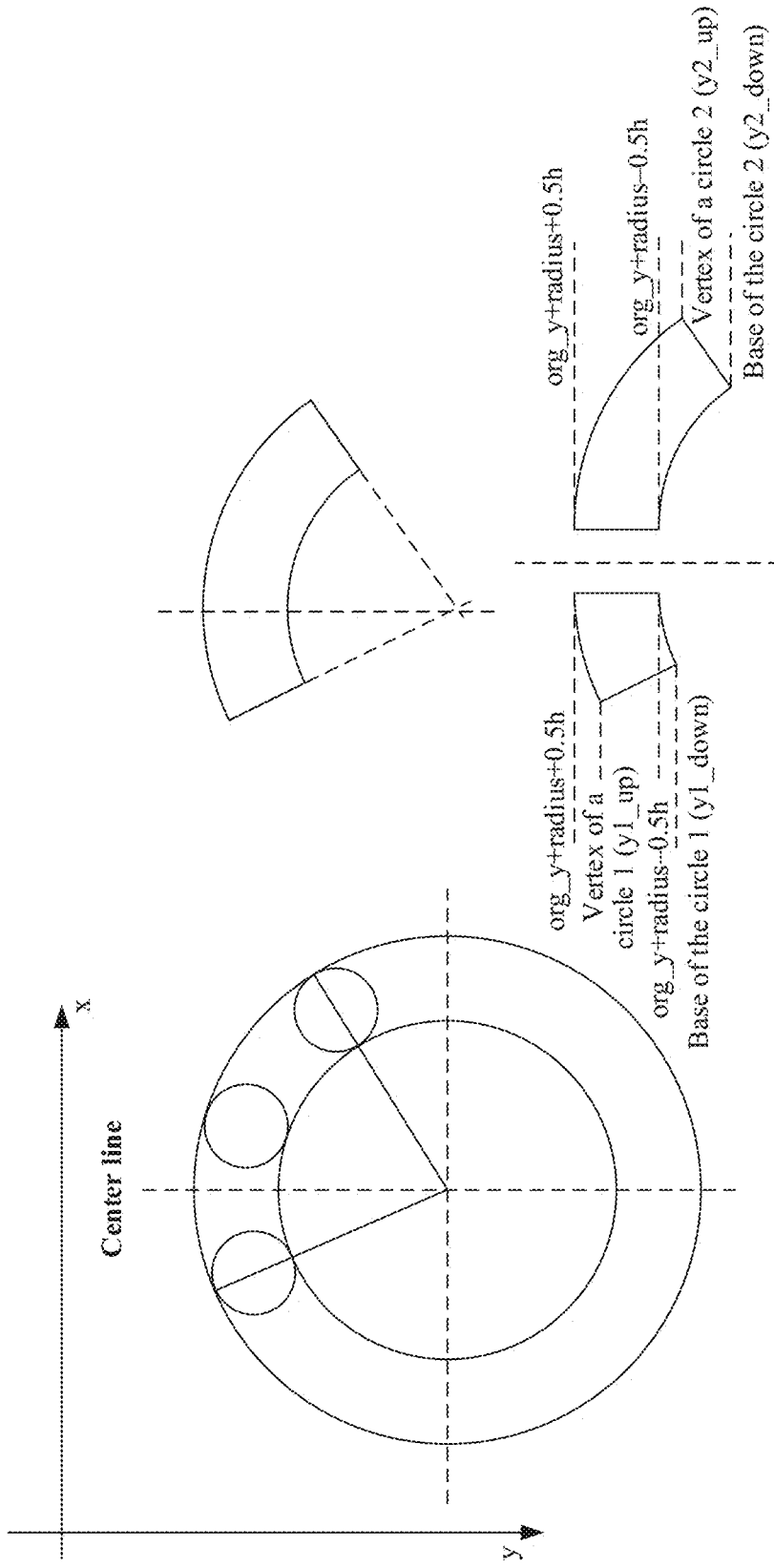

Case 12: As shown in FIG. 10D, an arc is on an upper left side and an upper right side of a center line, and the center line divides the arc into two arc parts: a left arc part and a right arc part.

For the left arc part, in a y-axis direction, (org_y+radius+0.5h)<a vertex of a circle 1<(org_y+radius−0.5h)<a base of the circle 1 that is, (org_y+radius+0.5h)<$y_{1\_up}$<(org_y+radius−0.5h)<$y_{1\_down}$.

In a first part, when a value of y is within a range of [(org_y+radius+0.5h), $y_{1\_up}$], a curve is an arc of a big circle. x_left may be obtained based on an analytic equation for the arc of the big circle. Refer to the formula (3). x_right is a horizontal coordinate of a center of the big circle, namely, a horizontal coordinate org_x of O1.

In a second part, when a value of y is within a range of [$y_{1\_up}$, (org_y+radius−0.5h)], a curve is an oblique line of the circle 1. x_left may be obtained based on an analytic equation for the oblique line of the circle 1. Refer to the formula (6). x_right is the horizontal coordinate of the center of the big circle, namely, the horizontal coordinate org_x of O1.

In a third part, when a value of y is within a range of [(org_y+radius−0.5h), $y_{1\_down}$], an oblique line of the circle 1 is on the left, and an arc of a small circle is on the right. x_left may be obtained based on an analytic equation for the oblique line of the circle 1 on the left. Refer to the formula (6). x_right may be obtained based on an analytic equation for the arc of the small circle on the right. Refer to the formula (5).

For the right arc part, in the y-axis direction, (org_y+radius+0.5h)<(org_y+radius−0.5h)<a vertex of a circle 2<a base of the circle 2, that is, (org_y+radius+0.5h)<(org_y+radius−0.5h)<$y_{2\_up}$<$y_{2\_down}$.

In a fourth part, when a value of y is within a range of [(org_y+radius+0.5h), (org_y+radius−0.5h)], a curve is an arc of the big circle. x_left is the horizontal coordinate of the center of the big circle, namely, the horizontal coordinate org_x of O1. x_right may be obtained based on an analytic equation for the arc of the big circle. Refer to the formula (3).

In a fifth part, when a value of y is within a range of [(org_y+radius−0.5h), $y_{2\_up}$], an arc of the small circle is on the left, and an arc of the big circle is on the right. x_left may be obtained based on an analytic equation for the arc of the small circle on the left. Refer to the formula (5). x_right may be obtained based on an analytic equation for the arc of the big circle on the right. Refer to the formula (3).

In a sixth part, when a value of y is within a range of [$y_{2\_up}$, $y_{2\_down}$], an arc of the small circle is on the left, and an oblique line of the circle 2 is on the right. x_left may be obtained based on an analytic equation for the arc of the small circle on the left. Refer to the formula (5). x_right may be obtained based on an analytic equation for the oblique line of the circle 2 on the right. Refer to the formula (4).

Figure 10E:
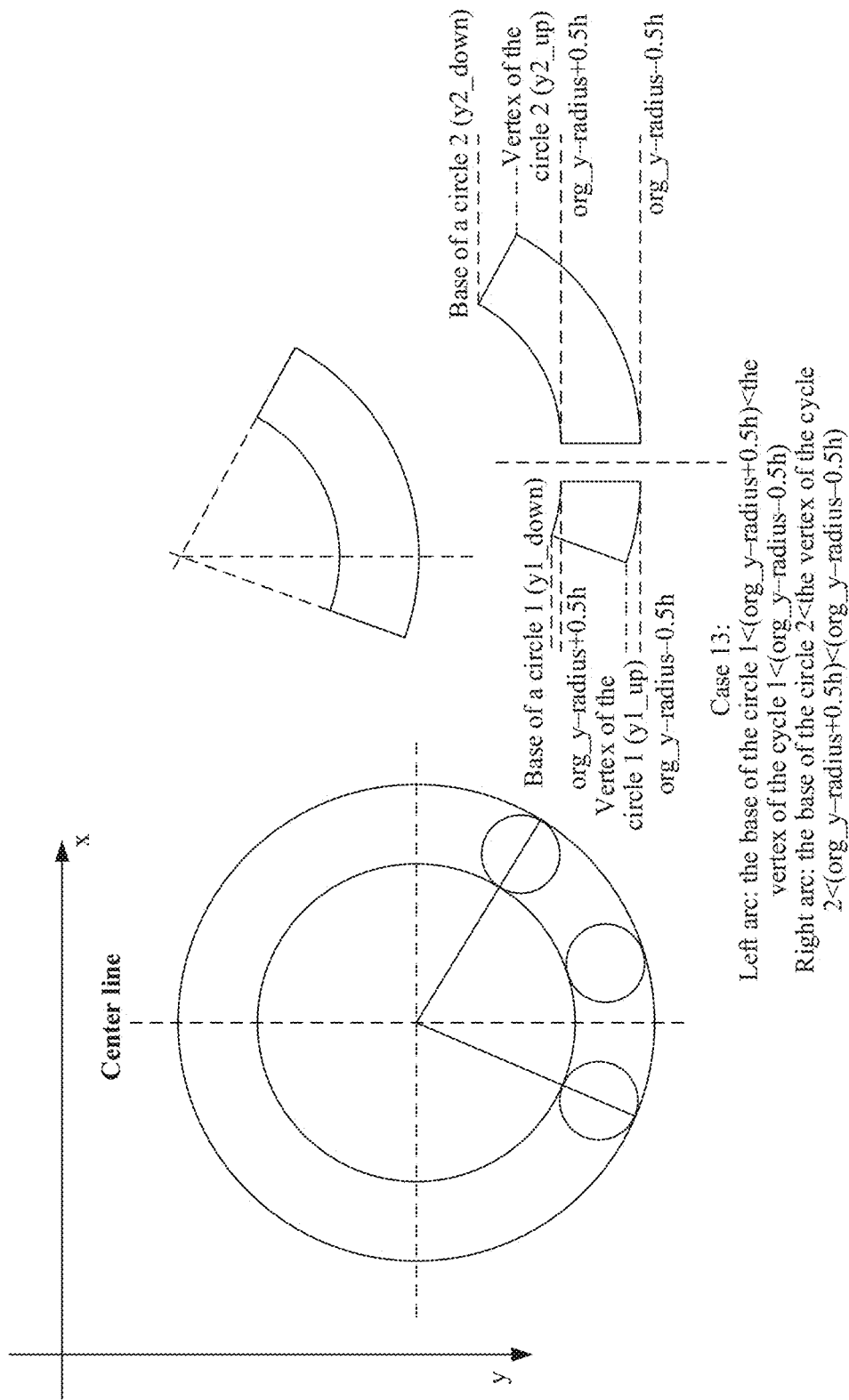

Case 13: As shown in FIG. 10E, an arc is on a lower left side and a lower right side of a center line, and the center line divides the arc into two arc parts: a left arc part and a right arc part.

For the left arc part, in a y-axis direction, a base of a circle 1<(org_y−radius+0.5h)<a vertex of the circle 1<(org_y−radius−0.5h), that is, $y_{1\_down}$<(org_y−radius+0.5h)<$y_{1\_up}$<(org_y−radius−0.5h).

In a first part, when a value of y is within a range of [$y_{1\_down}$, (org_y−radius+0.5h)], an oblique line of the circle 1 is on the left, and an arc of a small circle is on the right. x_left may be obtained based on an analytic equation for the oblique line of the circle 1. Refer to the formula (6). x_right may be obtained based on an analytic equation for the arc of the small circle on the right. Refer to the formula (5).

In a second part, when a value of y is within a range of [(org_y−radius+0.5h), $y_{1\_up}$], a curve is an oblique line of the circle 1. x_left may be obtained based on an analytic equation for the oblique line of the circle 1 on the left. Refer to the formula (6). x_right is a horizontal coordinate of a center of a big circle, namely, a horizontal coordinate org_x of O1.

In a third part, when a value of y is within a range of [$y_{1\_up}$, (org_y−radius−0.5h)], a curve is an arc of the big circle. x_left may be obtained based on an analytic equation for the arc of the big circle. Refer to the formula (3). x_right is the horizontal coordinate of the center of the big circle, namely, the horizontal coordinate org_x of O1.

For the right arc part, in the y-axis direction, a base of a circle 2<a vertex of the circle 2<(org_y−radius+0.5h)<(org_y−radius−0.5h), that is, $y_{2\_down} < y_{2\_up} <$(org_y−radius+0.5h)<(org_y−radius−0.5h).

In a fourth part, when a value of y is within a range of [$y_{2\_down}$, $y_{2\_up}$], an arc of the small circle is on the left, and an oblique line of the circle 2 is on the right. x_left may be obtained based on an analytic equation for the arc of the small circle on the left. Refer to the formula (5). x_right may be obtained based on an analytic equation for the oblique line of the circle 2. Refer to the formula (4).

In a fifth part, when a value of y is within a range of [$y_{2\_up}$, (org_y−radius+0.5h)], an arc of the small circle is on the left, and an arc of the big circle is on the right. x_left may be obtained based on an analytic equation for the arc of the small circle on the left. Refer to the formula (5). x_right may be obtained based on an analytic equation for the arc of the big circle on the right. Refer to the formula (3).

In a sixth part, when a value of y is within a range of [(org_y−radius+0.5h), (org_y−radius−0.5h)], a curve is an arc of the big circle. x_left is the horizontal coordinate of the center of the big circle, namely, the horizontal coordinate org_x of O1. x_right may be obtained based on an analytic equation for the arc of the big circle. Refer to the formula (3).

Figure 10F:
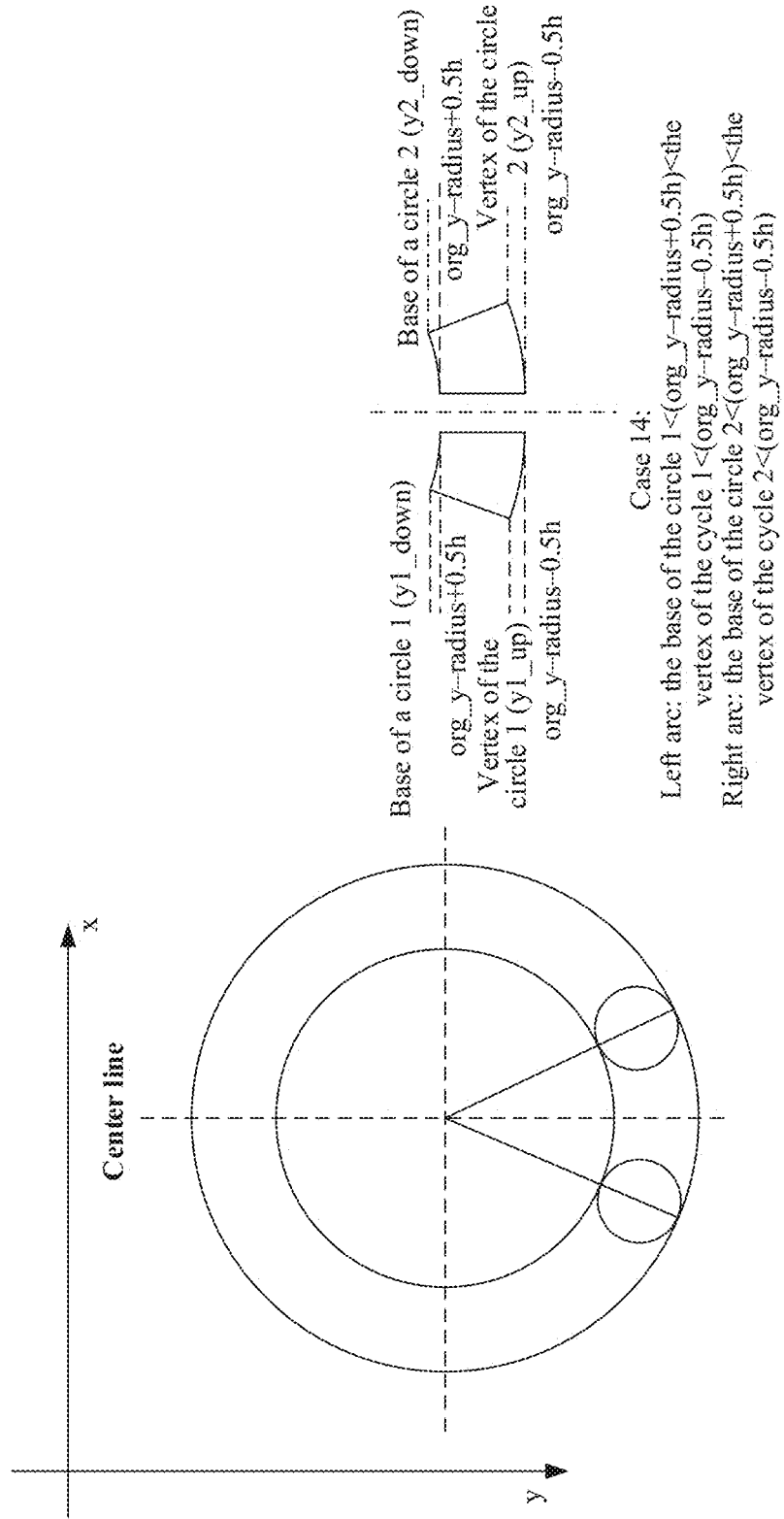

Case 14: As shown in FIG. 10F, an arc is on a lower left side and a lower right side of a center line, and the center line divides the arc into two arc parts: a left arc part and a right arc part.

For the left arc part, in a y-axis direction, a base of a circle 1<(org_y−radius+0.5h)<a vertex of the circle 1<(org_y−radius−0.5h), that is, $y_{1\_down} <$(org_y−radius+0.5h)$< y_{1\_up} <$(org_y−radius−0.5h).

In a first part, when a value of y is within a range of [$y_{1\_down}$, (org_y−radius+0.5h)], an oblique line of the circle 1 is on the left, and an arc of a small circle is on the right. x_left may be obtained based on an analytic equation for the oblique line of the circle 1. Refer to the formula (6). x_right may be obtained based on an analytic equation for the arc of the small circle on the right. Refer to the formula (5).

In a second part, when a value of y is within a range of [(org_y−radius+0.5h), $y_{1\_up}$], a curve is an oblique line of the circle 1. x_left may be obtained based on an analytic equation for the oblique line of the circle 1 on the left. Refer to the formula (6). x_right is a horizontal coordinate of a center of a big circle, namely, a horizontal coordinate org_x of O1.

In a third part, when a value of y is within a range of [$y_{1\_up}$, (org_y−radius−0.5h)], a curve is an arc of the big circle. x_left may be obtained based on an analytic equation for the arc of the big circle. Refer to the formula (3). x_right is the horizontal coordinate of the center of the big circle, namely, the horizontal coordinate org_x of O1.

For the right arc part, in the y-axis direction, a base of a circle 2<(org_y−radius+0.5h)<a vertex of the circle 2<(org_y−radius−0.5h), that is, $y_{2\_down} <$(org_y−radius+0.5h)$< y_{2\_up} <$(org_y−radius−0.5h).

In a fourth part, when a value of y is within a range of [$y_{2\_down}$, (org_y−radius+0.5h)], an arc of the small circle is on the left, and an oblique line of the circle 2 is on the right. x_left may be obtained based on an analytic equation for the arc of the small circle on the left. Refer to the formula (5). x_right may be obtained based on an analytic equation for the oblique line of the circle 2 on the right. Refer to the formula (4).

In a fifth part, when a value of y is within a range of [(org_y−radius+0.5h), $y_{2\_up}$], a curve is an oblique line of the circle 2. x_left is the horizontal coordinate of the center of the big circle, namely, the horizontal coordinate org_x of O1. x_right may be obtained based on an analytic equation for the oblique line of the circle 2. Refer to the formula (4).

In a sixth part, when a value of y is within a range of [$y_{2\_up}$, org_y−radius−0.5h)], a curve is an arc of the big circle. x_left is the horizontal coordinate of the center of the big circle, namely, the horizontal coordinate org_x of O1. x_right may be obtained based on an analytic equation for the arc of the big circle. Refer to the formula (3).

Figure 10G:
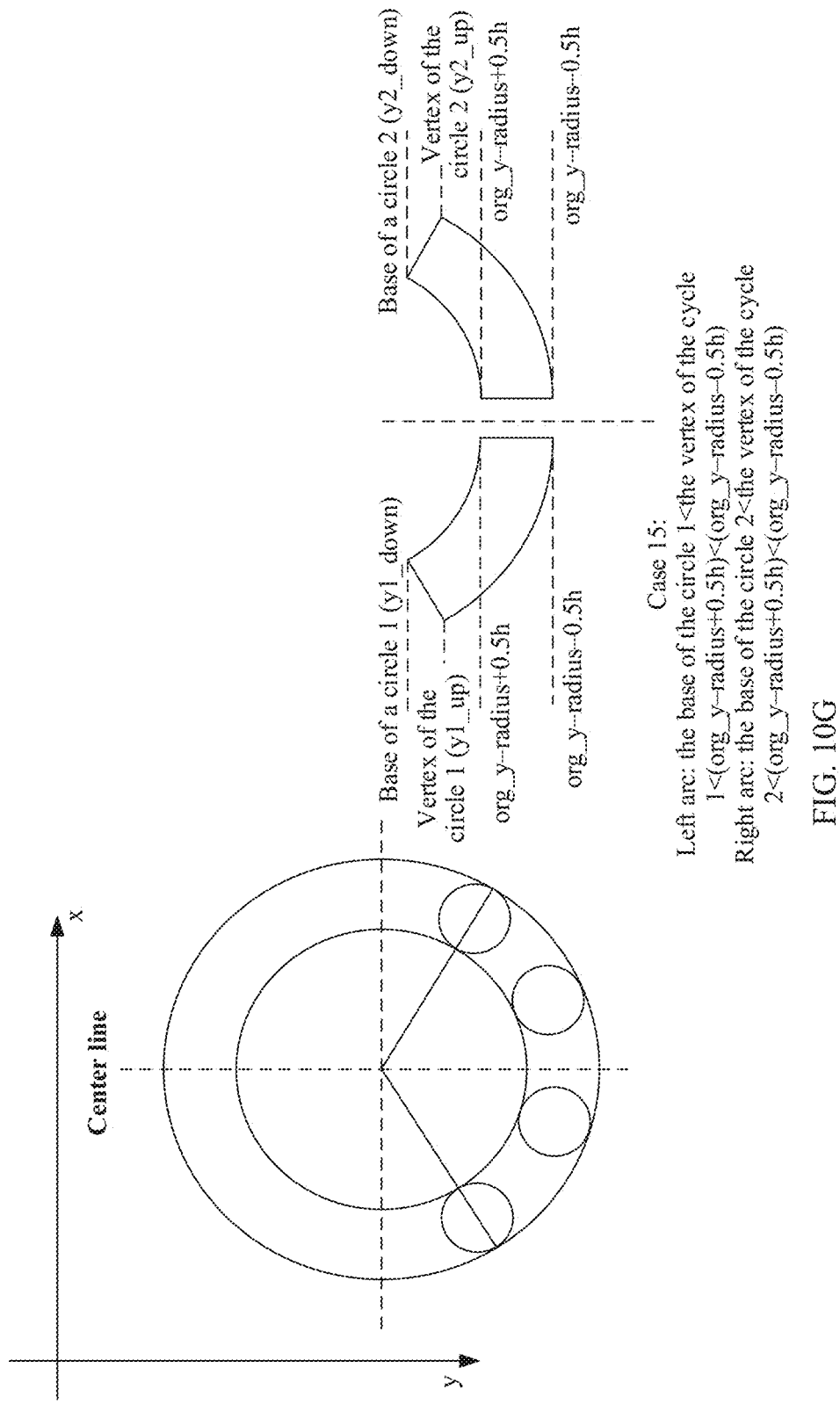

Case 15: As shown in FIG. 10G, an arc is on a lower left side and a lower right side of a center line, and the center line divides the arc into two arc parts: a left arc part and a right arc part.

For the left arc part, in a y-axis direction, a base of a circle 1<a vertex of the circle 1<(org_y−radius+0.5h)<(org_y−radius−0.5h), that is, $y_{1\_down} < y_{1\_up} <$(org_y−radius+0.5h)<(org_y−radius−0.5h).

In a first part, when a value of y is within a range of [$y_{1\_down}$, $y_{1\_up}$], an oblique line of the circle 1 is on the left, and an arc of a small circle is on the right. x_left may be obtained based on an analytic equation for the oblique line of the circle 1 on the left. Refer to the formula (6). x_right may be obtained based on an analytic equation for the arc of the small circle on the right. Refer to the formula (5).

In a second part, when a value of y is within a range of [$y_{1\_up}$, (org_y−radius+0.5h)], an arc of a big circle is on the left, and an arc of the small circle is on the right. x_left may be obtained based on an analytic equation for the arc of the big circle on the left. Refer to the formula (3). x_right may be obtained based on an analytic equation for the arc of the small circle on the right. Refer to the formula (5).

In a third part, when a value of y is within a range of [(org_y−radius+0.5h), (org_y−radius−0.5h)], a curve is an arc of the big circle. x_left may be obtained based on an analytic equation for the arc of the big circle. Refer to the formula (3). x_right is a horizontal coordinate of a center of the big circle, namely, a horizontal coordinate org_x of O1.

For the right arc part, in the y-axis direction, a base of a circle 2<(org_y−radius+0.5h)<a vertex of the circle 2<(org_y−radius−0.5h), that is, $y_{2\_down} <$(org_y−radius+0.5h)$< y_{2\_up} <$(org_y−radius−0.5h).

In a fourth part, when a value of y is within a range of [$y_{2\_down}$, $y_{2\_up}$], an arc of the small circle is on the left, and an oblique line of the circle 2 is on the right. x_left may be obtained based on an analytic equation for the arc of the small circle on the left. Refer to the formula (5). x_right may be obtained based on an analytic equation for the oblique line of the circle 2. Refer to the formula (4).

In a fifth part, when a value of y is within a range of [$y_{2\_up}$, (org_y−radius+0.5h)], an arc of the small circle is on the left, and an arc of the big circle is on the right. x_left may be obtained based on an analytic equation for the arc of the small circle on the left. Refer to the formula (5). x_right may be obtained based on an analytic equation for the arc of the big circle on the right. Refer to the formula (3).

In a sixth part, when a value of y is within a range of [(org_y−radius+0.5h), (org_y−radius−0.5h)], a curve is an arc of the big circle. x_left is the horizontal coordinate of the center of the big circle, namely, the horizontal coordinate org_x of O1. x_right may be obtained based on an analytic equation for the arc of the big circle. Refer to the formula (3).

Figure 10H:
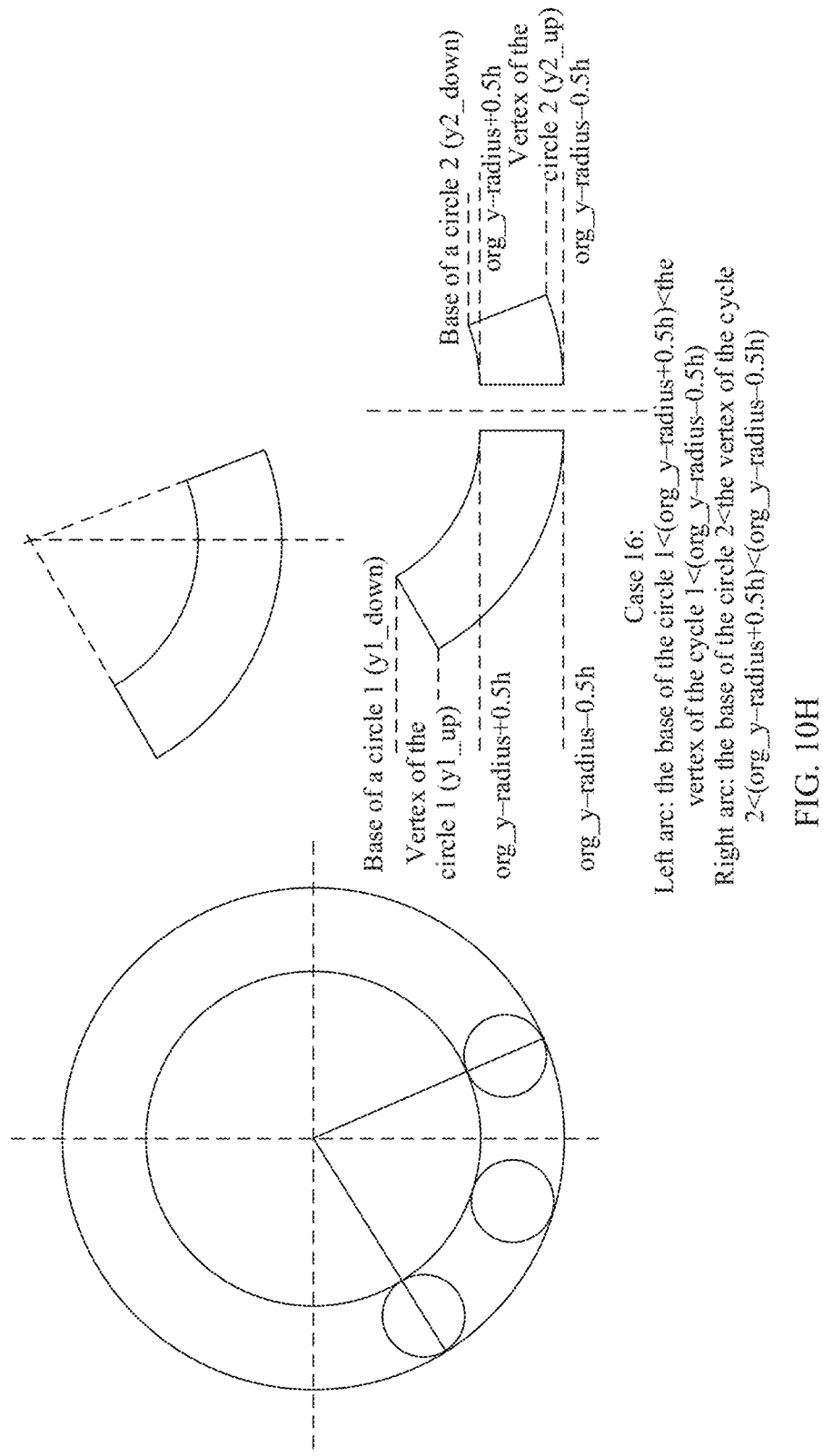

Case 16: As shown in FIG. 10H, an arc is on a lower left side and a lower right side of a center line, and the center line divides the arc into two arc parts: a left arc part and a right arc part.

For the left arc part, in a y-axis direction, a base of a circle 1<a vertex of the circle 1<(org_y−radius+0.5h)<(org_y−radius−0.5h), that is, $y_{1\_down} < y_{1\_up} < (\text{org\_y}-\text{radius}+0.5h) < (\text{org\_y}-\text{radius}-0.5h)$.

In a first part, when a value of y is within a range of $[y_{1\_down}, y_{1\_up}]$, an oblique line of the circle 1 is on the left, and an arc of a small circle is on the right. x_left may be obtained based on an analytic equation for the oblique line of the circle 1 on the left. Refer to the formula (6). x_right may be obtained based on an analytic equation for the arc of the small circle on the right. Refer to the formula (5).

In a second part, when a value of y is within a range of $[y_{1\_up}, (\text{org\_y}-\text{radius}+0.5h)]$, an arc of a big circle is on the left, and an arc of the small circle is on the right. x_left may be obtained based on an analytic equation for the arc of the big circle on the left. Refer to the formula (3). x_right may be obtained based on an analytic equation for the arc of the small circle on the right. Refer to the formula (5).

In a third part, when a value of y is within a range of $[(\text{org\_y}-\text{radius}+0.5h), (\text{org\_y}-\text{radius}-0.5h)]$, a curve is an arc of the big circle. x_left may be obtained based on an analytic equation for the arc of the big circle. Refer to the formula (3). x_right is a horizontal coordinate of a center of the big circle, namely, a horizontal coordinate org_x of O1.

For the right arc part, in the y-axis direction, a base of a circle 2<(org_y−radius+0.5h)<a vertex of the circle 2<(org_y−radius−0.5h), that is, $y_{2\_down} < (\text{org\_y}-\text{radius}+0.5h) < y_{2\_up} < (\text{org\_y}-\text{radius}-0.5h)$.

In a fourth part, when a value of y is within a range of $[y_{2\_down}, (\text{org\_y}-\text{radius}+0.5h)]$, an arc of the small circle is on the left, and an oblique line of the circle 2 is on the right. x_left may be obtained based on an analytic equation for the arc of the small circle on the left. Refer to the formula (5). x_right may be obtained based on an analytic equation for the oblique line of the circle 2 on the right. Refer to the formula (4).

In a fifth part, when a value of y is within a range of $[(\text{org\_y}-\text{radius}+0.5h), y_{2\_up}]$, a curve is an oblique line of the circle 2. x_left is the horizontal coordinate of the center of the big circle, namely, the horizontal coordinate org_x of O1. x_right may be obtained based on an analytic equation for the oblique line of the circle 2. Refer to the formula (4).

In a sixth part, when a value of y is within a range of $[y_{2\_up}, (\text{org\_y}-\text{radius}-0.5h)]$, a curve is an arc of the big circle. x_left is the horizontal coordinate of the center of the big circle, namely, the horizontal coordinate org_x of O1. x_right may be obtained based on an analytic equation for the arc of the big circle. Refer to the formula (3).

In the foregoing 16 cases, the electronic device 100 may draw an arc in any form. The electronic device 100 obtains center coordinates of a circle 1 and a circle 2, and then determines y-axis coordinates of vertexes and bases of the circle 1 and the circle 2. The electronic device determines a magnitude relationship between a vertex of the circle 2, a base of the circle 2, a vertex of the circle 1, and a base of the circle 1 in a y-axis direction, and therefore may determine which one of the foregoing 16 cases is applicable, and then draw an arc based on an analytic equation in the corresponding case.

x_left and x_right are mapped to corresponding bits in a 32-bit integer, a point beyond x_left and x_right in the 32-bit integer is set to zero, and a point between x_left and x_right in the 32-bit integer is set to a non-zero value. In this way, during drawing of the arc-shaped code element, a row of pixels may be drawn based on each group of x_left and x_right. Drawing is performed from top to bottom, and x_left and x_right may be continuously obtained based on a formula in the corresponding case, to draw a complete arc-shaped code element.

In this embodiment of this application, a 32-bit stream is used for generating a two-dimensional code and recognizing a two-dimensional code, so that a speed of encoding and decoding a two-dimensional code can be improved.

Figure 11:
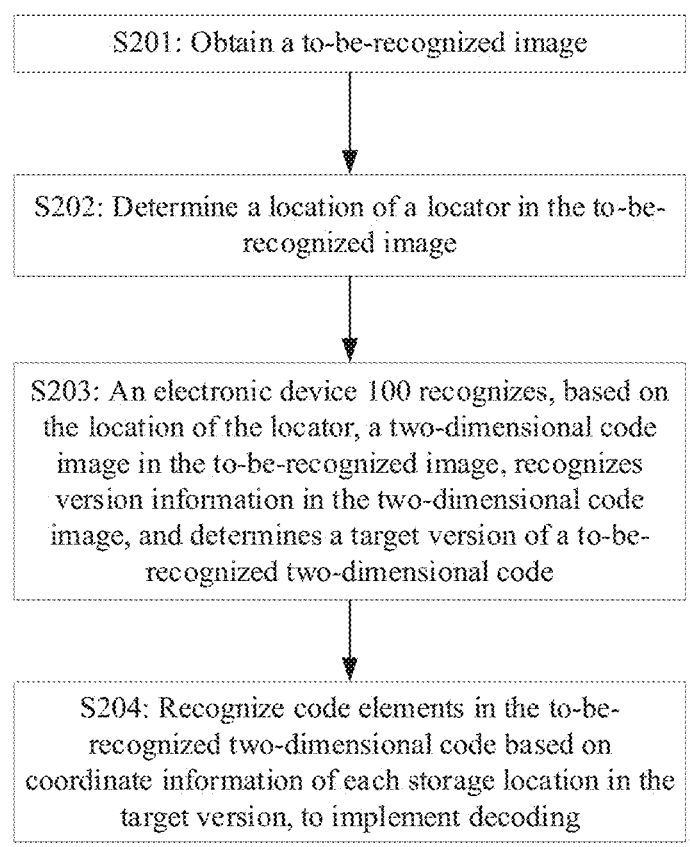
FIG. 11 is a method flowchart of a method for recognizing a two-dimensional code according to an embodiment of this application.

The foregoing describes generation steps and a drawing method for a two-dimensional code in embodiments of this application. For a generated two-dimensional code image, an embodiment of this application further provides a corresponding method for recognizing a two-dimensional code. As shown in FIG. 11, specific steps of the method are as follows.

Step S201: An electronic device 100 obtains a to-be-recognized image.

The to-be-recognized image includes a to-be-recognized two-dimensional code.

In some embodiments, after obtaining the to-be-recognized image, the electronic device 100 performs operations such as contrast adjustment, grayscale processing, binarization, and smoothing on the to-be-recognized image, to facilitate subsequent recognition for the two-dimensional code.

Step S202: The electronic device 100 determines a location of a locator in the to-be-recognized image.

The electronic device 100 obtains the to-be-recognized image, and when recognizing the two-dimensional code in the to-be-recognized image, searches the to-be-recognized image for the locator based on a feature of the locator, to determine the location of the locator in the input image.

In some embodiments, the locator includes three locators and one auxiliary locator that are distributed in an upper left corner, an upper right corner, a lower left corner, and a lower right corner of the two-dimensional code. The electronic device 100 searches the input image for the three locators based on features of the three locators, and determines locations of the three locators in the input image. The two-dimensional code is accurately and quickly located in a combination of a plurality of manners based on the locations of the three locators.

A pattern of the locator is usually a pattern with a fixed ratio (as shown in FIG. 3C, the pattern of the locator is a black-and-white concentric circle pattern, a ratio between black code elements and white code elements of the primary locator is 1:1:2:1:1, and a ratio between black code elements and white code elements of the auxiliary locator is 1:1:2:1: 13. During scanning of the two-dimensional code, a locator pattern of the two-dimensional code is usually first searched for based on the fixed ratio, to determine a direction of the two-dimensional code.

For example, after determining a location of the one auxiliary locator, the electronic device 100 may quickly determine the locations of the primary locators based on a relative location relationship between the primary locators and the auxiliary locator, to improve efficiency of locating the two-dimensional code.

For example, locations of the three primary locators and the one auxiliary locator may be separately determined, and a location of a code region of the two-dimensional code is calibrated based on the determined locations of the primary locators and the auxiliary locator and the relative location relationship between the primary locators and the auxiliary locator in a structure of the two-dimensional code, to improve accuracy of locating the two-dimensional code.

Step S203: The electronic device 100 recognizes, based on the location of the locator, a two-dimensional code image in the to-be-recognized image, recognizes version information in the two-dimensional code image, and determines a target version of the to-be-recognized two-dimensional code.

After determining the target version of the to-be-recognized two-dimensional code, the electronic device 100 may obtain center coordinates and radius information of each (dot-shaped) storage location, center coordinates and radius information of an image region, related coordinate information of a locator, and the like in the target version.

In some embodiments, the electronic device 100 may determine, based on the location of the locator, a vertex location of the two-dimensional code in the to-be-recognized image, and then calibrate the two-dimensional code based on the vertex location. For example, the electronic device 100 performs perspective transformation on the two-dimensional code image to obtain a non-tilting two-dimensional code image. Due to a shooting angle, in most cases, a two-dimensional code in an obtained two-dimensional code image is linearly deformed. The electronic device 100 detects four corners of the two-dimensional code, and obtains a calibrated image, namely, a non-tilting two-dimensional code image, through reverse perspective transformation.

Step S204: Recognize code elements in the to-be-recognized two-dimensional code based on coordinate information of each storage location in the target version, to implement decoding.

The coordinate information of each storage location in the target version includes center coordinates and radius information of the storage location. The target version may further indicate the center coordinates and the radius information of the image region, the related coordinate information of the locator, and the like.

The electronic device 100 obtains the coordinate information of each storage location in the target version, including the center coordinates and the radius information of the storage location; and then recognizes, based on the non-tilting two-dimensional code image, the code elements in the two-dimensional code image (the to-be-recognized two-dimensional code).

In some embodiments, the electronic device 100 recognizes, based on the coordinate information of each storage location, a value correspondingly stored at each storage location in the two-dimensional code image. Optionally, a value corresponding to a storage location occupied by a code element in the code region of the to-be-recognized two-dimensional code is a first value, a value corresponding to a storage location not occupied by a code element is a second value. For example, the electronic device 100 obtains center coordinates and radii of 100 storage locations, and the electronic device 100 scans the 100 storage locations in the two-dimensional code image based on the center coordinates and the radii. A value corresponding to a storage location occupied by a code element is 1, and a value corresponding to a storage location not occupied by a code element is 0. In this case, a binary character string can be recognized. The electronic device 100 performs decoding based on the binary character string, to obtain information corresponding to the two-dimensional code.

In some embodiments, the electronic device 100 recognizes a dot-shaped code element in the two-dimensional code image, and determines a location of each dot-shaped code element and that a value corresponding to each dot-shaped code element is the first value. The electronic device 100 determines, based on the coordinate information of the storage location indicated in the target version of the two-dimensional code image, that a value corresponding to a storage location not occupied by a code element is the second value. For example, the electronic device 100 recognizes the two-dimensional code image, and finds that 60 locations (including center coordinates and radii) are occupied by code elements and correspond to a value 1. The electronic device 100 maps the 60 locations to, for example, 100 storage locations in the target version of the two-dimensional code. In this case, values corresponding to the remaining 40 storage locations are 0. The electronic device 100 recognizes a binary character string, and the electronic device 100 performs decoding based on the binary character string to obtain information corresponding to the two-dimensional code.

In some embodiments, the electronic device 100 recognizes a dot-shaped code element in the two-dimensional code image, determines a location of a dot-shaped code element in a first color and that a value corresponding to the dot-shaped code element is the first value, and determines a location of a dot-shaped code element in a second color and that a value corresponding to the dot-shaped code element is the second value. Optionally, the electronic device 100 recognizes the two-dimensional code image, and finds that code elements in 60 locations including center coordinates and radii) are in the first color and correspond to a value 1, and code elements in the other 40 locations are in the second color and correspond to a value 0. In this case, the electronic device 100 recognizes a binary character string, and the electronic device 100 performs decoding based on the binary character string to obtain information corresponding to the two-dimensional code.

In some embodiments, the electronic device 100 recognizes an arc-shaped code element in the two-dimensional code image; may determine, based on a length of the arc-shaped code element, that the arc-shaped code element includes several dot-shaped code elements; and may determine center coordinates of each dot-shaped code element. The electronic device 100 determines a location of each dot-shaped code element and that a value corresponding to each dot-shaped code element is the first value. The electronic device 100 determines, based on the coordinate information of the storage location indicated in the target version of the two-dimensional code image, that a value corresponding to a storage location not occupied by a code element is the second value.

The foregoing describes steps of recognizing a two-dimensional code in embodiments of this application. Embodiments of this application provide a method for recognizing a two-dimensional code. An electronic device 100 performs digital image processing on a to-be-recognized image, determines a two-dimensional code image by determining a location of a locator in the to-be-recognized image, and after a target version of a two-dimensional code is recognized, obtains coded information based on location coordinates of the target version, and implements decoding according to a decoding rule. In this way, the two-dimensional code with a two-dimensional code structure of the target version is decoded. In embodiments of this application, a 32-bit stream is used for recognizing a two-dimensional code, so that a speed of decoding a two-dimensional code can be improved.

Embodiments of this application further provide other versions of two-dimensional codes. For example, FIG. 12A and FIG. 12B show two possible versions of two-dimensional codes.

In a version of a two-dimensional code shown in FIG. 12A, the two-dimensional code is generally in a circular shape, and includes an image region in a middle part and a code region surrounding the image region. The code region of the two-dimensional code includes at least two concentric circles formed by gathering code elements of the two-dimensional code, and the code elements include a dot-shaped code element. Radii of dot-shaped code elements in a same concentric circle region are the same, and radii of dot-shaped code elements in different concentric circle regions are different. A radius of a dot-shaped code element in an innermost concentric circle region is the smallest, and a radius of a dot-shaped code element in an outer concentric circle region is larger.

For example, FIG. 12A further includes three primary locators and three auxiliary locators, and the three primary locators and the one auxiliary locator are all circular regions. Quantities and patterns of primary locators and auxiliary locators are not limited in this embodiment of this application.

In FIG. 12A, the code region of the two-dimensional code includes five concentric circle regions. In this embodiment of this application, a quantity of concentric circle regions included in the code region may be adjusted based on a data volume of the two-dimensional code. An information capacity of the two-dimensional code may be expanded by increasing the quantity of concentric circle regions in the code region.

In a version of a two-dimensional code shown in FIG. 12B, the two-dimensional code is generally in a circular shape, and includes an image region in a middle part and a code region surrounding the image region. The code region of the two-dimensional code includes at least two concentric circles formed by gathering code elements of the two-dimensional code, and the code elements include a dot-shaped code element. Radii of all dot-shaped code elements are the same. Different from FIG. 3A, the version of the two-dimensional code shown in FIG. 12B does not include an arc-shaped code element.

For example, FIG. 12B further includes three primary locators and three auxiliary locators, and the three primary locators and the one auxiliary locator are all circular regions. Quantities and patterns of primary locators and auxiliary locators are not limited in this embodiment of this application.

In FIG. 12B, the code region of the two-dimensional code includes four concentric circle regions. In this embodiment of this application, a quantity of concentric circle regions included in the code region may be adjusted based on a data volume of the two-dimensional code. An information capacity of the two-dimensional code may be expanded by increasing the quantity of concentric circle regions in the code region.

In embodiments of this application, a new two-dimensional code structure is used. A two-dimensional code is in a circular shape, and the two-dimensional code includes an image region in a middle part and a code region surrounding the image region. The code region includes at least two concentric circle regions formed by gathering code elements of the two-dimensional code. The code elements include a dot-shaped code element and an arc-shaped code element. An information capacity of the two-dimensional code may be expanded by increasing a quantity of concentric circle regions in the code region. Further, a region of the two-dimensional code other than the image region further includes a primary locator and an auxiliary locator. During recognition of the two-dimensional code, the two-dimensional code can be accurately and quickly located in a combination of a plurality of manners based on locating of the primary locator and the auxiliary locator in an input image, to improve accuracy and efficiency of recognizing the two-dimensional code.

An embodiment of this application further provides a computer-readable storage medium. All or some of the processes in the foregoing method embodiments may be implemented by a computer program instructing related hardware. The program may be stored in the computer storage medium. When the program is executed, the processes of the foregoing method embodiments may be included. The computer-readable storage medium includes any medium that can store program code, for example, a read-only memory (read-only memory, ROM), a random access memory (random access memory, RAM), a magnetic disk, or an optical disc.

All or some of the foregoing embodiments may be implemented by software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of processes or functions according to embodiments of this application are generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible to the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

A sequence of the steps in the method in embodiments of this application may be adjusted, or the steps may be combined or removed according to an actual requirement.

The modules in the apparatus in embodiments of this application may be combined, divided, or deleted according to an actual requirement.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A method for recognizing a two-dimensional code, comprising:
    identifying, by an electronic device, a two-dimensional code, wherein the two-dimensional code comprises an image region in the center and a ring region surrounding the image region, wherein the ring region comprises a code region including a first code region, a second code region, a first spacing region, and a second spacing region, wherein the first spacing region and the second spacing region are arranged between the first code region and the second code region;

determining, by the electronic device, values corresponding to a plurality of code elements in the code region, wherein the plurality of code elements are a plurality of dot-shaped code elements; and recognizing, by the electronic device based on the values, first information corresponding to the two-dimensional code.

2. The method according to claim 1, wherein the first spacing region and the second spacing region are partial rings with a same width.

3. The method according to claim 1, wherein areas occupied by the first code region and the second code region are same.

4. The method according to claim 1, wherein a ratio between a width of the image region in a horizontal direction and a width of the two-dimensional code in the horizontal direction is 1:3.

5. The method according to claim 1, wherein the plurality of code elements in the code region are distributed on at least two concentric circles.

6. The method according to claim 5, wherein an arc distance between centers of adjacent dot-shaped code elements on a same concentric circle of the code region is (2r+b)×k, wherein k is a positive integer, r is a radius of the dot-shaped code element, and b is a fixed value, wherein a circumference of the same concentric circle is N×(2r+b), and wherein N is a positive integer greater than k.

7. The method according to claim 6, wherein an arc distance between centers of three consecutive dot-shaped code elements on a same concentric circle of the code region is greater than (2r+b)×2.

8. The method according to claim 5, wherein dot-shaped code elements a and b located on two different concentric circles of the two-dimensional code, and a connection line between a center of the dot-shaped code element a and a center of the dot-shaped code element b passes through the center of the two-dimensional code.

9. The method according to claim 5, wherein radii of dot-shaped code elements on different ones of the at least two concentric circles of the two-dimensional code are different.

10. The method according to claim 9, wherein a radius of a dot-shaped code element on an outer concentric circle of the two-dimensional code is greater than a radius of a dot-shaped code element on an inner concentric circle of the two-dimensional code.

11. The method according to claim 5, wherein the code elements further comprise an arc-shaped code element, an arc length of the arc-shaped code element on a concentric circle is (2r+b)×M, and M is a positive integer.

12. The method according to claim 11, wherein an arc distance between an arc-shaped code element and an adjacent code element on a same concentric circle is greater than or equal to (2r+b)×2.

13. The method according to claim 1, wherein the determining values corresponding to a plurality of code elements in a code region of the two-dimensional code comprises:

determining, by the electronic device, a target version of the two-dimensional code, wherein the target version indicates coordinate information of each storage location in the code region of the two-dimensional code; and determining, by the electronic device based on the coordinate information of each storage location, that a storage location occupied by each of the plurality of code elements in the code region of the two-dimensional code is correspondingly a value of the values.

14. The method according to claim 13, wherein each storage location is in a dot shape, and the coordinate information comprises center coordinate information and radius information of the storage location.

15. The method according to claim 13, wherein before the determining, by the electronic device, a target version of the to-be-recognized two-dimensional code, the method comprises:

determining, by the electronic device, a location of a locator in an image to be recognized;

determining, by the electronic device, a vertex location of a two-dimensional code in the image based on the location of the locator; and calibrating, by the electronic device, the two-dimensional code in the image based on the vertex location, to obtain the two-dimensional code.

16. The method according to claim 1, wherein a type of the first information comprises one or more of: a character, text, a picture, audio, a video, or a link address.

17. An electronic device, comprising:
one or more processors; and
one or more memories coupled to the one or more processors and storing instructions for execution by the one or more processors to perform operations comprising:

identifying, by an electronic device, a two-dimensional code, wherein the two-dimensional code comprises an image region in the center and a ring region surrounding the image region, wherein the ring region comprises a code region including a first code region and a second code region, a first spacing region, and a second spacing region, wherein the first spacing region and the second spacing region are arranged between the first code region and the second code region;

determining, by the electronic device, values corresponding to a plurality of code elements in the code region, wherein the plurality of code elements are a plurality of dot-shaped code elements; and recognizing, by the electronic device based on the values, first information corresponding to the two-dimensional code.

18. The electronic device according to claim 17, wherein the plurality of code elements in the code region are distributed on at least two concentric circles.

19. A non-transitory, computer-readable medium storing one or more instructions executable by one or more processors to perform operations comprising:

identifying, by an electronic device, a two-dimensional code, wherein the two-dimensional code comprises an image region in the center and a ring region surrounding the image region, wherein the ring region comprises a code region including a first code region and a second code region, a first spacing region, and a second spacing region, wherein the first spacing region and the second spacing region are arranged between the first code region and the second code region;

determining, by the electronic device, values corresponding to a plurality of code elements in the code region, wherein the plurality of code elements are a plurality of dot-shaped code elements; and recognizing, by the electronic device based on the values, first information corresponding to the two-dimensional code.

20. The non-transitory, computer-readable medium according to claim 19, wherein the plurality of code elements in the code region are distributed on at least two concentric circles.

* * * * *